US008675010B2

(12) United States Patent  
Cho et al.

(10) Patent No.: US 8,675,010 B2  
(45) Date of Patent: Mar. 18, 2014

(54) METHOD AND APPARATUS FOR PROVIDING METADATA FOR SENSORY EFFECT, COMPUTER READABLE RECORD MEDIUM ON WHICH METADATA FOR SENSORY EFFECT IS RECORDED, METHOD AND APPARATUS FOR REPRESENTATING SENSORY EFFECT

(75) Inventors: Maeng-Sub Cho, Daejeon (KR); Jin-Seo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 514 days.

(21) Appl. No.: 13/078,459

(22) Filed: Apr. 1, 2011

(65) Prior Publication Data  
US 2011/0243524 A1 Oct. 6, 2011

(30) Foreign Application Priority Data  
Apr. 2, 2010 (KR) .......................... 10-2010-0030633

(51) Int. Cl.  
*G09G 5/02* (2006.01)

(52) U.S. Cl.  
USPC .......................................... 345/597; 345/589

(58) Field of Classification Search  
USPC .................................................. 345/418, 589  
See application file for complete search history.

(56) References Cited

PUBLICATIONS

Jin-Seo Kim et al., "Validation Rules for Color Correction Parameter of MPEG-V Part 3 Sensory Information", ISO/IEC JTC1/SC29/WG11, MPEG2009/M17715, Jul. 2010, 10pgs.  
Jin-Seo Kim et al., "Modified Validation Rules and Schematron of Group of Effects", ISO/IEC JTC1/SC29/WG11, MPEG2009/m17716, Jul. 2010, 7pgs.  
Jin-Seo Kim et al., "Modified Validation Rules and Schematron of Effect", ISO/IEC JTC1/SC29/WG11, MPEG2009/M17717, Jul. 2010, 9pgs.  
Jin-Seo Kim et al., "Additional Validation Rules and Schematron of Reference Effect", ISO/IEC JTC1/SC29/WG11, MPEG2009/M17718, Jul. 2010, 8pgs.

*Primary Examiner* — Jacinta M Crawford  
(74) *Attorney, Agent, or Firm* — Staas & Halsey LLP

(57) ABSTRACT

Disclosed are a method and apparatus for providing metadata for a sensory effect, a computer-readable recording medium on which metadata for a sensory effect are recorded, and a method and apparatus for reproducing a sensory effect. A method for providing metadata for a sensory effect includes generating Sensory Effect Metadata (SEM) including sensory effect information on contents using binary representation syntax; and analyzing the SEM and transmitting the SEM to a sensory reproduction apparatus engine unit that generates control information on a sensory reproduction apparatus. In the method, the sensory effect information includes color correction effect information on the contents.

15 Claims, 36 Drawing Sheets

METHOD AND APPARATUS FOR PROVIDING METADATA FOR SENSORY EFFECT, COMPUTER READABLE RECORD MEDIUM ON WHICH METADATA FOR SENSORY EFFECT IS RECORDED, METHOD AND APPARATUS FOR REPRESENTATING SENSORY EFFECT

CROSS-REFERENCE(S) TO RELATED APPLICATIONS

The present application claims priority of Korean Patent Application No. 10-2010-0030633, filed on Apr. 2, 2010, which is incorporated herein by reference in its entirety.

BACKGROUND OF THE INVENTION

1. Field of the Invention

Exemplary embodiments of the present invention relate to a method and apparatus for providing metadata for a sensory effect, a computer-readable recording medium on which metadata for a sensory effect are recorded, and a method and apparatus for reproducing a sensory effect.

2. Description of Related Art

In general, contents may be provided to a user through a computing device or optical disk player capable of reproducing the contents. When the contents are recorded on an optical disk such as a CD, DVD or Blue-ray disk, moving picture contents are reproduced through the computing device or optical disk player, and the reproduced contents may be displayed through a monitor or television connected to the computing device or optical disk player.

As the moving picture experts group (MPEG) is extended from MPEG-1 to MPEG-21 via MPEG-2, MPEG-4 and MPEG-7 related to media technologies such as audio (including voice and sound) or video (including still pictures and moving pictures) contents, media concepts and multimedia processing technologies have been developed. A format for storing audio and video is defined in the MPEG-1, and media transmission is focused in the MPEG-2. The MPEG-4 deals with metadata related to media, and the MPEG-21 deals with a distribution framework technology of media.

In order to more develop the contents reproduction technology, studies on a sensory effect have recently been conducted to provide more realistic pictures to a user in reproduction of moving pictures. That is, studies on a peripheral sensory reproduction apparatus for controlling a sensory effect and a signal processing system for controlling the peripheral sensory reproduction apparatus have been actively conducted so as to provide the sensory effect such as fog, wind, temperature, smell, light, lightning or movement of a chair according to contents.

SUMMARY OF THE INVENTION

An embodiment of the present invention is directed to a method and apparatus for providing metadata for a sensory effect, a computer-readable recording medium on which metadata for a sensory effect are recorded, and a method and apparatus for reproducing a sensory effect, which provides the sensory effect according to contents reproduction (consumption).

Another embodiment of the present invention is directed to a method and apparatus for providing metadata for a sensory effect, a computer-readable recording medium on which metadata for a sensory effect are recorded, and a method and apparatus for reproducing a sensory effect, which provide a color correction effect for contents.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for providing metadata for a sensory effect includes generating Sensory Effect Metadata (SEM) including sensory effect information on contents using binary representation syntax, and analyzing the SEM and transmitting the SEM to a sensory reproduction apparatus engine unit that generates control information on a sensory reproduction apparatus. In the method, the sensory effect information includes color correction effect information on the contents.

In accordance with another embodiment of the present invention, a method for providing metadata for a sensory effect includes generating User Sensory Preference (USP) metadata including consumer preference information on a sensory effect using binary representation syntax, and analyzing the USP metadata and transmitting the USP metadata to a sensory reproduction apparatus engine unit that generates control information on a sensory reproduction apparatus. In the method, the preference information includes preference information on a color correction effect of contents.

In accordance with another embodiment of the present invention, a method for providing metadata for a sensory effect includes generating Sensory Device Capabilities (SDCap) metadata including reproduction capability information on a sensory effect of a sensory reproduction apparatus using binary representation syntax, and analyzing the SDCap metadata and transmitting the SDCap metadata to a sensory reproduction apparatus engine unit that generates control information on the sensory reproduction apparatus. In the method, the reproduction capability information includes reproduction capability information on a color correction effect of contents.

In accordance with another embodiment of the present invention, a method for providing metadata for a sensory effect includes receiving SEM comprising sensory effect information, analyzing the SEM and generating Sensory Device Commands (SDCmd) metadata including control information on a sensory effect of a sensory reproduction apparatus, and transmitting the SDCmd metadata to a control device that controls the sensory reproduction apparatus. In the method, the SEM are generated using binary representation syntax, and the sensory effect information includes color correction effect information on contents.

In accordance with another embodiment of the present invention, a sensory effect representing method of a sensory reproduction apparatus for representing a sensory effect includes receiving control information on a sensory effect on a sensory reproduction apparatus, and representing the sensory effect based on the control information on the sensory effect. In the method, the control information on the sensory effect includes control information on a color correction effect of contents.

In accordance with another embodiment of the present invention, a computer-readable recording medium on which metadata are recorded includes SEM including sensory effect information on contents. In the computer-readable recording medium, the sensory effect information includes color correction information on the contents.

In the computer-readable recording medium on which the metadata are recorded, the metadata may include USP metadata including consumer preference information on a sensory effect, and the preference information may include preference information on a color correction effect of the contents.

In the computer-readable recording medium on which the metadata are recorded, the metadata may include SDCap metadata including reproduction capability information on the sensory effect of a sensory reproduction apparatus, and the reproduction capability information may include reproduction capability information on the color correction effect of the contents.

In the computer-readable recording medium on which the metadata are recorded, the metadata may include SDCmd metadata including control information on the sensory effect of the sensory reproduction apparatus, and the control information on the sensory effect may include control information on the color correction effect of the contents.

DESCRIPTION OF SPECIFIC EMBODIMENTS

Figure 1:
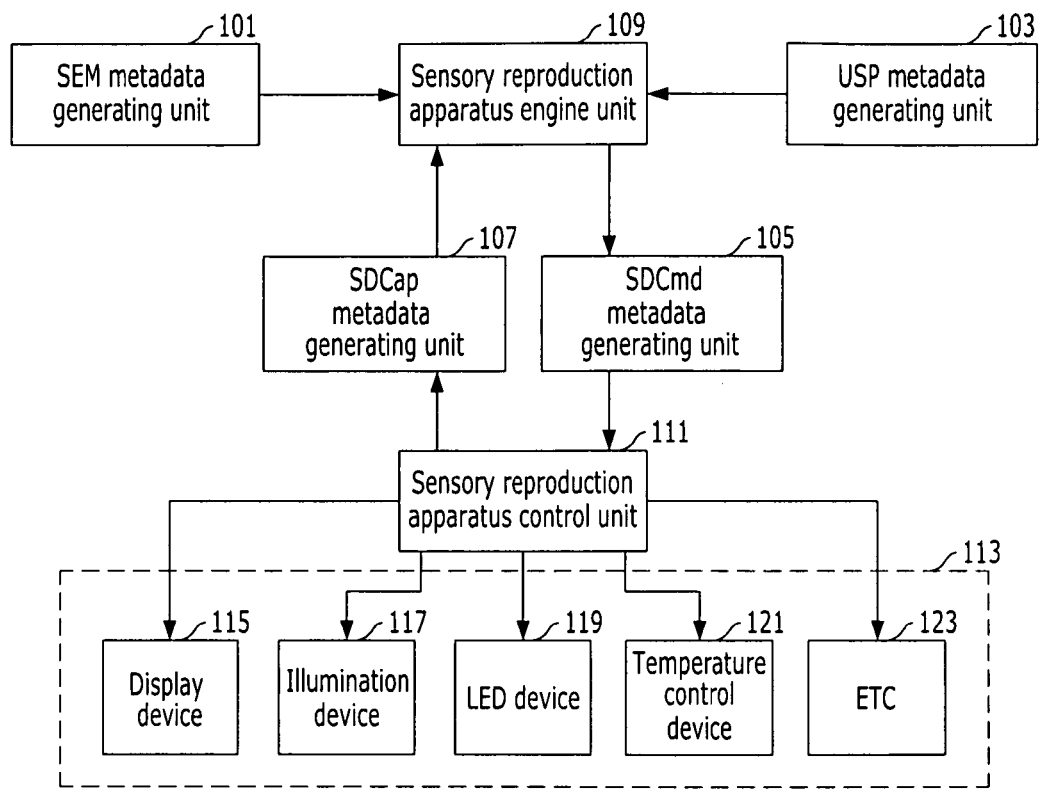
FIG. 1 a block diagram illustrating a multimedia system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In general, when a contents consumer consumes contents, a sensory effect may be reproduced by a corresponding sensory reproduction apparatus according to the consumed contents. Since relations and compatibilities between the consumed contents and the sensory reproduction apparatuses may be different, a sensory reproduction apparatus compatible with contents is required to reproduce sensory effects for the contents.

Meanwhile, the sensory effect is used as a means that enables a contents consumer to more realistically experience contents, but the sensory effect for reproducing colors intended by a contents provider in a sensory reproduction apparatus is not provided. That is, since contents providing environment and characteristics of the sensory reproduction apparatus are different, it is difficult to reproduce pictures identical to original pictures of the contents in the sensory reproduction apparatus.

In accordance with the present invention, color correction effect information on contents is provided to a sensory reproduction apparatus, so that colors intended by a contents provider can be reproduced in the sensory reproduction apparatus. That is, in accordance with the present invention, color information on original pictures of contents and information on a target for color correction are provided to a sensory reproduction apparatus, so that pictures intended by a contents provider or pictures identical to the original pictures of the contents can be reproduced in the sensory reproduction apparatus.

FIG. 1 a block diagram illustrating a multimedia system in accordance with an embodiment of the present invention.

As illustrated in FIG. 1, the multimedia system in accordance to the embodiment of the present invention may include an SEM generating unit 101, a USP metadata generating unit 103, an SDCmd metadata generating unit 105, an SDCap metadata generating unit 107, a sensory reproduction apparatus engine unit 109, a sensory reproduction apparatus control unit 111 and a sensory reproduction apparatus 113. The sensory reproduction apparatus 113 may include a display device 115, an illumination device 117, an LED apparatus 119, a temperature control device 121 and other reproduction apparatuses 123.

First, metadata will be described as follows.

Sensory Effect Metadata (SEM) are metadata including sensory effect information on metadata contents. User Sensory Preferences (USP) metadata are metadata including user preference information of a sensory effect for contents. Sensory Device Commands (SDCmd) metadata are metadata including information for controlling a sensory reproduction apparatus that represents a sensory effect. Sensory Device Capabilities (SDCap) metadata are metadata including sensory effect reproduction capability information of the sensory reproduction apparatus.

The SEM generating unit 101 SEM including sensory effect information on contents. The sensory effect information on the contents may be provided by a contents provider. Here, the sensory effect information may be wind effect information, vibration information, temperature information, main illumination information and color correction effect information on the contents.

The USP metadata generating unit 103 generates USP metadata including consumer preference information on a sensory effect. The consumer preference information may be provided by a consumer that consumes contents. For example, the consumer preference information may include information that the consumer prefers a wind effect in the sensory effects and does not prefer a vibration effect in the sensory effects.

The SDCmd metadata generating unit 105 generates SDCmd metadata including control information for controlling the sensory reproduction apparatus 113 to represent a sensory effect. That is, the sensory reproduction apparatus 113 may represent the sensory effect according to the SDCmd metadata.

The SDCap metadata generating unit 107 generates SDCap metadata including sensory effect reproduction capability information of the sensory reproduction apparatus 113. For example, the sensory effect reproduction capability information may include temperature control capability information of the temperature control device 121 in the sensory reproduction apparatus 113.

The sensory reproduction apparatus engine unit 109 receives SEM metadata inputted from the SEM generating unit 101 and analyzes the received SEM. The sensory reproduction apparatus engine unit 109 may analyze at least one of the USP metadata and the SDCap metadata. That is, the sensory reproduction apparatus engine unit 109 analyzes the SEM, the USP metadata and the SDCap metadata and provides the analyzed result to the SDCmd metadata generating unit 105, so that SDCmd metadata generating unit 105 can generate SDCmd metadata.

Meanwhile, the SDCmd metadata generating unit 105 may be included in the sensory reproduction apparatus engine unit 109, and the sensory reproduction apparatus engine unit 109 may generate the SDCmd metadata. That is, the sensory reproduction apparatus engine unit 109 may generate the SDCmd metadata using sensory effect information, user preference information and reproduction capability information.

The sensory reproduction apparatus control unit 111 receives SDCmd metadata inputted from the SDCmd metadata generating unit 105 and analyzes the received SDCmd metadata. The sensory reproduction apparatus control unit 111 may control the sensory reproduction apparatus 113 using the control information on the sensory reproduction apparatus 113. The sensory reproduction apparatus control unit 111 may include the SDCap metadata generating unit 107, and the SDCap metadata generating unit 107 may generate SDCap metadata of the sensory reproduction apparatus 113 connected to the sensory reproduction apparatus control unit 111.

The sensory reproduction apparatus 113 reproduces or represents a sensory effect under a control of the sensory reproduction apparatus control unit 111. For example, the sensory reproduction apparatus 113 may represent a wind effect for contents, a vibration effect, a temperature effect, a main illumination effect, a peripheral illumination effect and a color correction effect for contents. That is, the illumination device 117 and the LED device 119 may represent the main illumination effect and the peripheral illumination effect, and the temperature control device 121 may represent the temperature effect. The display device 115 may represent the color correction effect together with the reproduction of contents. Other reproduction apparatuses 123 may represent the wind effect and the vibration effect.

Particularly, the sensory reproduction apparatus 113 in accordance with the embodiment of the present invention may represent the color correction effect for the contents as described above. The color correction effect is, for example, a color effect intended by the contents provider. The sensory reproduction apparatus 113 may reproduce the contents by representing the color effect intended by the contents provider in the contents, or may reproduce the contents by maximally reflecting original color pictures of the contents.

The multimedia system in accordance with the embodiment of the present invention generates SEM, USP metadata, SDCap metadata and SDCmd metadata for the color correction effect so as to implement the color correction effect, and reproduces contents using these metadata.

Meanwhile, the sensory reproduction apparatus 113 in accordance with the embodiment of the present invention may receive the SDCmd metadata directly inputted from the sensory reproduction apparatus engine unit 109 so as to represent the sensory effect, or may include the SDCap metadata generating unit 107 so as to transmit the SDCap metadata to the sensory reproduction apparatus engine unit 109.

In the multimedia system in accordance with the embodiment of the present invention, each of the metadata may be transmitted/received through a communication channel (not shown). The communication channel is a wired network, and may transmit/receive data through specific communication regulations. Alternatively, the communication channel may be a communication channel using a mobile communication scheme such as CDMA, WCDMA or FDMA or a wireless communication scheme such as Bluetooth, WiBro or wireless LAN.

In accordance with the embodiment of the present invention, a method for describing metadata according to the standardized format and structure may be based on the MPEG-7 multimedia description scheme (MDS) or the MPEG-21 digital item adaptation (DIA) MDS.

Figure 2:
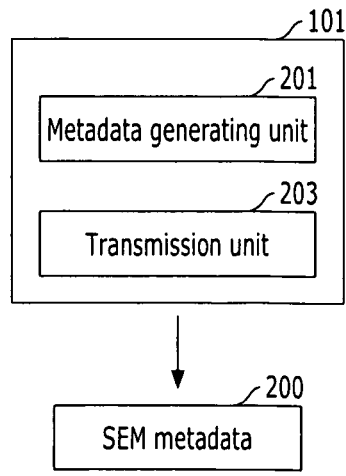
FIG. 2 is a block diagram illustrating sensory effect metadata (SEM) generating unit 101 in accordance with the embodiment of the present invention.

FIG. 2 is a block diagram illustrating the SEM generating unit 101 in accordance with the embodiment of the present invention.

As illustrated in FIG. 2, the SEM generating unit 101 in accordance with the embodiment of the present invention includes a metadata generating unit 201 and a transmission unit 203.

The metadata generating unit 201 generates SEM metadata 200 including sensory effect information. The transmission unit 203 transmits the SEM to the sensory reproduction apparatus engine unit 109 that generates control information on the sensory reproduction apparatus 113 that analyzes metadata and reproduces a sensory effect.

Here, the sensory effect information may include at least one of color correction effect information, wind effect information, vibration information, temperature information, main illumination information and peripheral illumination information.

Figure 3:
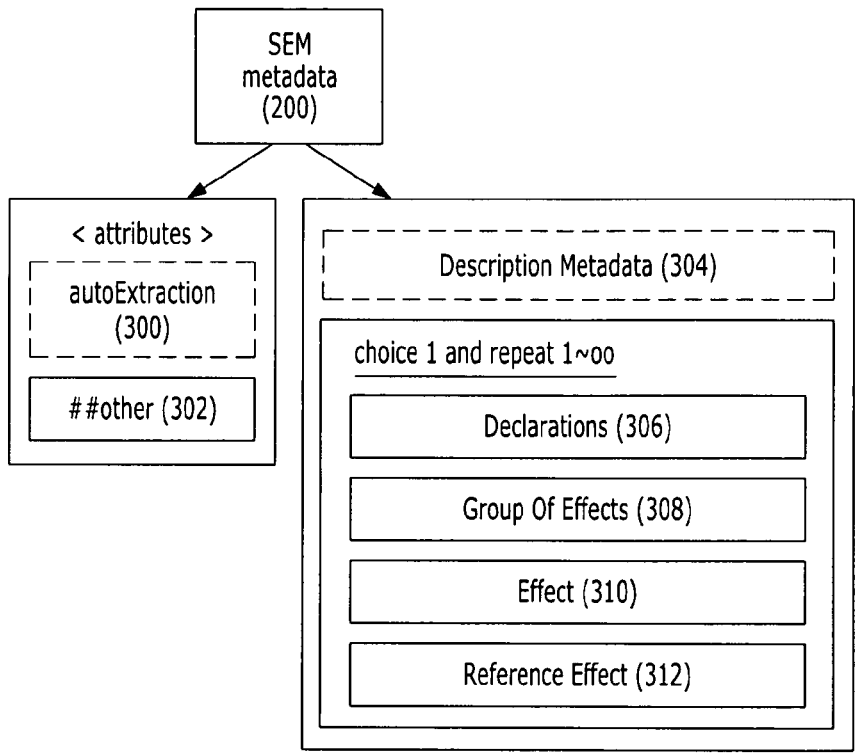
FIG. 3 is a block diagram illustrating elements of SEM 200 in accordance with the embodiment of the present invention.

FIG. 3 is a block diagram illustrating elements of the SEM 200 in accordance with the embodiment of the present invention.

As illustrated in FIG. 3, the SEM 200 in accordance with the embodiment of the present invention includes a metadata (autoExtraction) 300 for describing automatic extraction attribute information, metadata (##other) 302 for describing extendible attribute information, metadata (Description Metadata) 304 for describing general information on metadata, metadata (Declarations) 306 for describing previously declared metadata (Group Of Effects, Effect, Parameter), metadata (Group Of Effects) 308 for describing two or more sensory effect information, metadata (Effect) 310 for describing one sensory effect information, and metadata (Reference Effect) 312 for describing referable sensory effect information.

Specifically, information on whether or not the sensory effect described in the SEM 200 from media including the SEM 200 and contents is described in the automatic extraction attribute information. General explanation information on the SEM or the like may be described in the form of an appendix in the Description metadata 304. The Declarations metadata 306 are metadata for previously declaring sensory effect information included in the SEM 200 and referring the previously declared sensory effect information (Group Of Effects, Effect) and parameter information (Parameter) for reference in the reproduction of a sensory effect, if necessary. The Reference Effect metadata 312 are metadata for referable sensory effect information in the reproduction of the previously declared sensory effect.

Here, any one of the Declarations metadata 306, the Group Of Effects metadata 308, the Effect metadata 310 and the Reference Effect metadata 312 may be repeatedly described in the SEM 200.

Figure 4:
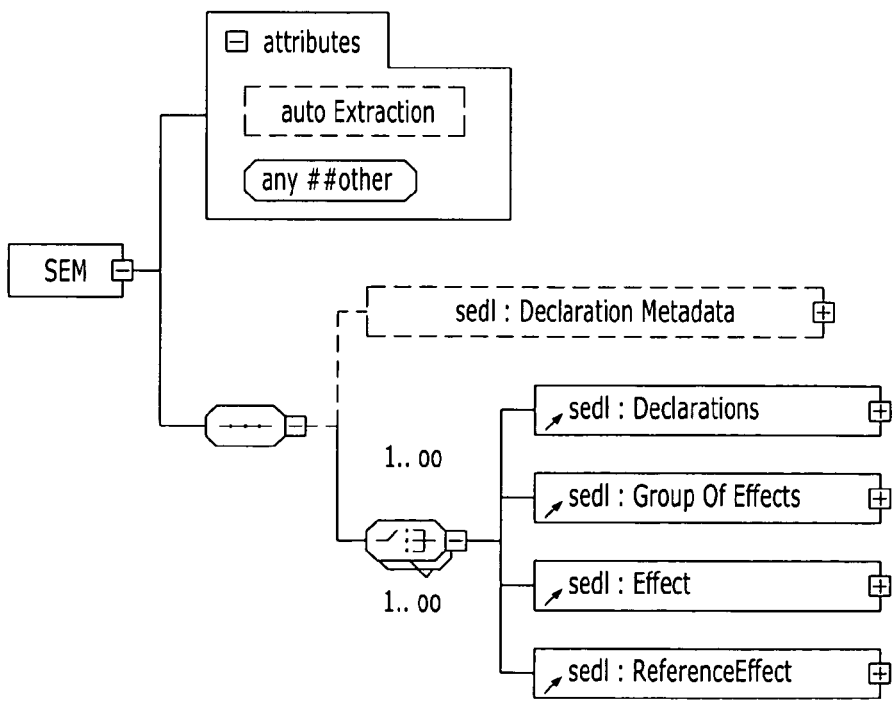
FIG. 4 is a block diagram illustrating a schema type of the SEM in accordance with the embodiment of the present invention.

FIG. 4 is a block diagram illustrating a schema type of the SEM in accordance with the embodiment of the present invention. In FIG. 4, the SEM and elements of the SEM, described in FIG. 3, are shown in the form of a schema.

In Table 1, the description structure of the SEM 200 is shown in the form of an eXtension Markup Language (XML) schema.

TABLE 1

```
<element name="SEM">
    <complexType>
        <sequence>
            <element                    name="DescriptionMetadata"
```

TABLE 1-continued

```
type="sedl:DescriptionMetadataType"
            minOccurs="0"/>
        <choice maxOccurs="unbounded">
            <element ref="sedl:Declarations"/>
            <element ref="sedl:GroupOfEffects"/>
            <element ref="sedl:Effect"/>
            <element ref="sedl:ReferenceEffect"/>
        </choice>
    </sequence>
    <attribute name="autoExtraction" type="sedl:autoExtractionType"/>
    <anyAttribute namespace="# #other" processContents="lax"/>
    </complexType>
</element>
<simpleType name="autoExtractionType">
    <restriction base="string">
        <enumeration value="audio"/>
        <enumeration value="visual"/>
        <enumeration value="both"/>
    </restriction>
</simpleType>
```

Figure 5:
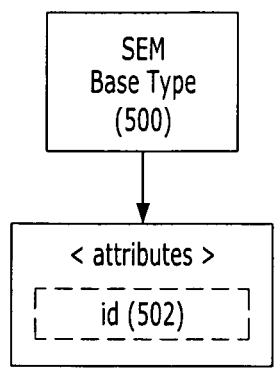
FIG. 5 is a block diagram illustrating a data type of the schema of the SEM in accordance with the embodiment of the present invention.

FIG. 5 is a block diagram illustrating a data type of the schema of the SEM in accordance with the embodiment of the present invention.

As illustrated in FIG. 5, the data type of the schema of the SEM is a SEM Base Type 500 provided as a high-level base type. The SEM Base Type metadata 500 includes identifier information metadata (id) 502 including identifiable attribute information. That is, the information included in the SEM may be identified based on the Identifier Information metadata (ID) 502.

The SEM Base Type 500 becomes a base type for a plurality of metadata included in the SEM, and the plurality of metadata included in the SEM may use a data type extended from the SEM Base Type 500. The data type extended from the SEM base type 500 includes all the attributes or information of the SEM base type 500.

Figure 6:
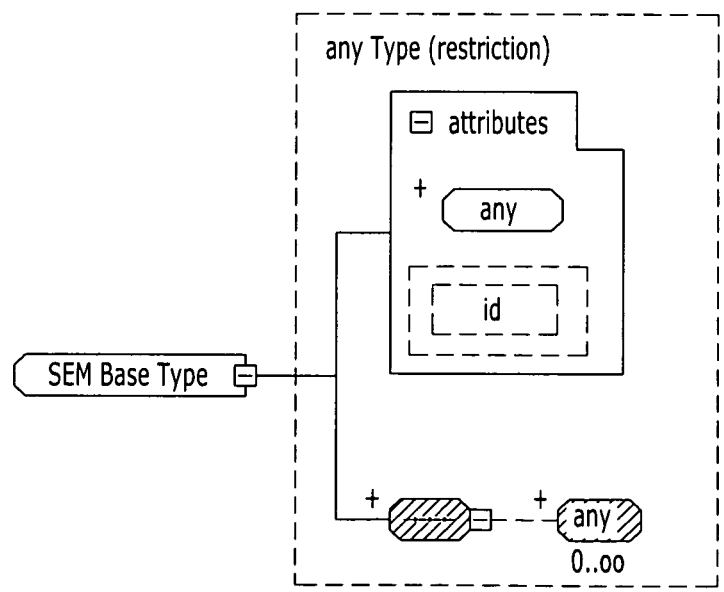
FIG. 6 is a block diagram illustrating a schema type of SEM Base Type metadata 500 in accordance with the embodiment of the present invention.

FIG. 6 is a block diagram illustrating a schema type of the SEM Base Type metadata 500 in accordance with the embodiment of the present invention. In FIG. 6, the SEM Base Type metadata and elements of the SEM Base Type metadata, described in FIG. 5, are shown in the form of a schema.

In Table 2, the description structure of the SEM Base Type metadata 500 is shown in the form of an XML schema.

TABLE 2

```
<complexType name="SEMBaseType" abstract="true">
    <complexContent>
        <restriction base="anyType">
            <attribute name="id" type="ID" use="optional"/>
        </restriction>
    </complexContent>
</complexType>
```

Figure 7:
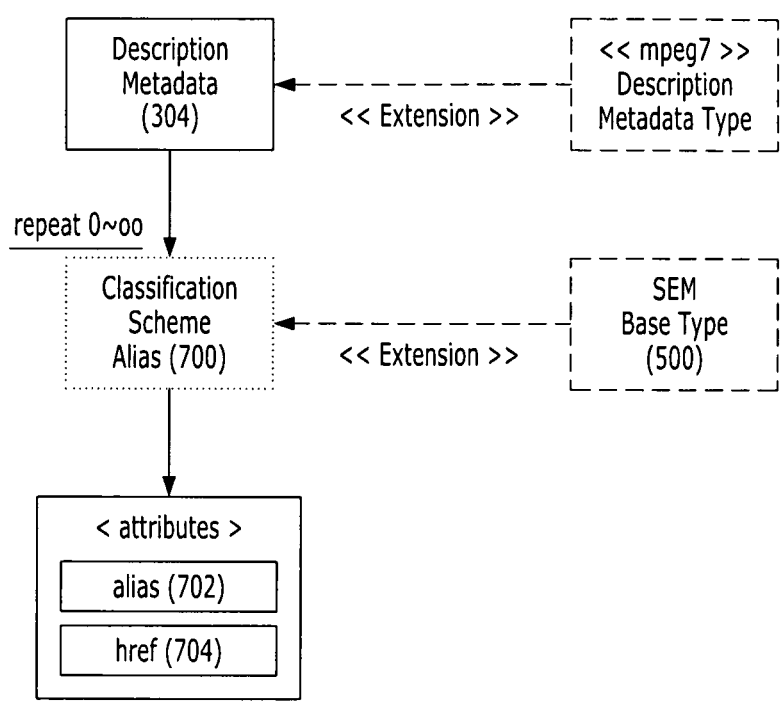
FIG. 7 is a block diagram illustrating elements of Description metadata 304 in accordance with the embodiment of the present invention.

FIG. 7 is a block diagram illustrating elements of the Description metadata 304 in accordance with the embodiment of the present invention.

As illustrated in FIG. 7, the Description metadata 304 may be extended from, for example, the description metadata type of MPEG-7 MDS. The Description metadata 304 includes metadata (Classification Scheme Alias) 700 for describing alias information for a classification schema referred by a uniform resource identifier (URI).

The Classification Scheme Alias metadata 700 may be extended from, for example, the SEM Base Type 500. The classification Scheme Alias metadata 700 includes metadata (Alias) 702 for describing attribute information for another name assigned to the classification schema and metadata (HREF) 704 for describing attribute information for referring the classification schema assigned by another name using the URI. That is, another classification schema may be referred by the classification scheme alias metadata 700.

Specifically, the Alias metadata 702 are metadata for assigning a separate name to the name of the classification schema. The URI refers to path information for referring a file in which the classification schema is defined on the Web. The URI is defined as attribute information of the href metadata 704.

Figure 8:
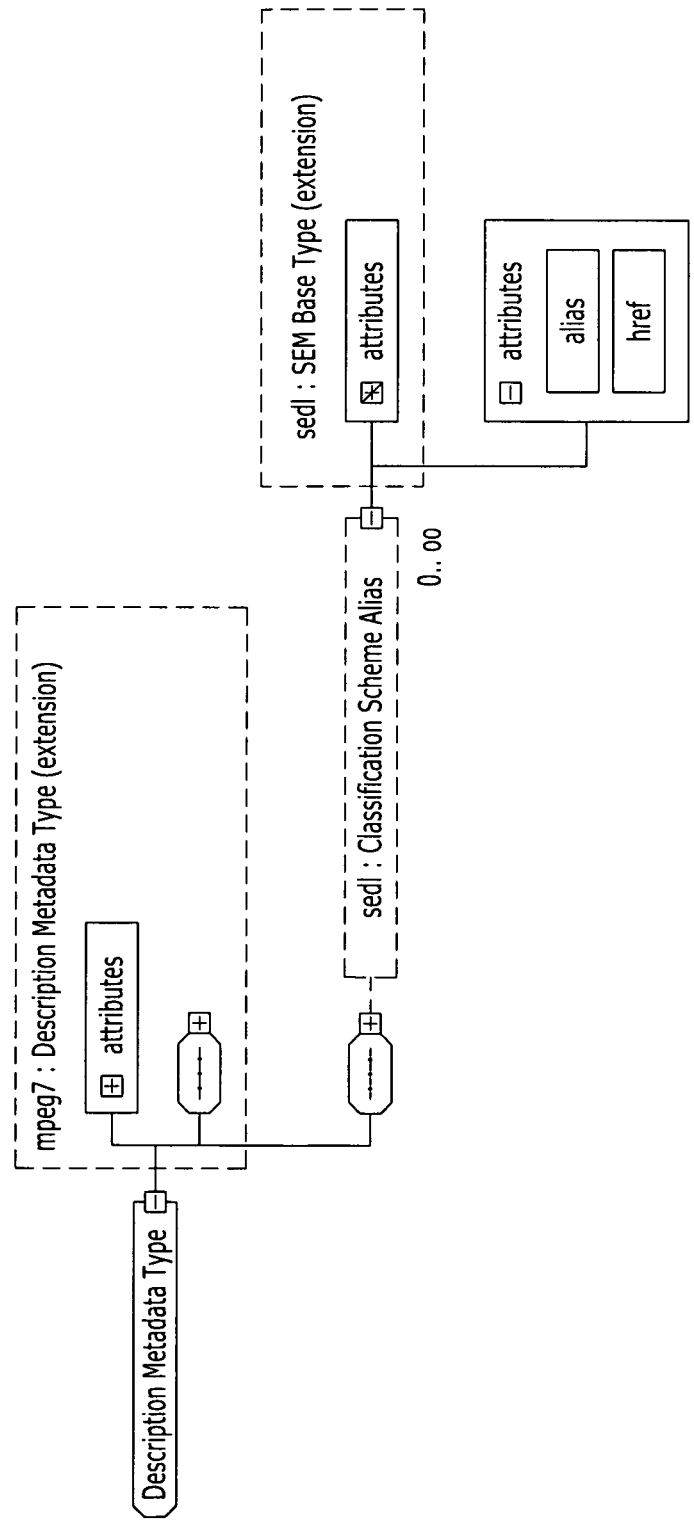
FIG. 8 is a block diagram illustrating a schema type of the Description metadata 304 in accordance with the embodiment of the present invention.

FIG. 8 is a block diagram illustrating a schema type of the Description metadata 304 in accordance with the embodiment of the present invention. In FIG. 8, elements of the Description metadata 304, the Classification Scheme Alias metadata 700 and elements of the Description metadata 304, the Classification Scheme Alias metadata 700, described in FIG. 7, are shown in the form of a schema.

In Table 3, the description structure of the Description metadata 304 is shown in the form of an XML schema.

TABLE 3

```
<complexType name="DescriptionMetadataType">
  <complexContent>
    <extension base="mpeg7:DescriptionMetadataType">
      <sequence>
        <element name="ClassificationSchemeAlias" minOccurs="0" maxOccurs="unbounded">
          <complexType>
            <complexContent>
              <extension base="sedl:SEMBaseType">
                <attribute name="alias" type="NMTOKEN" use="required"/>
                <attribute name="href" type="anyURI" use="required"/>
              </extension>
            </complexContent>
          </complexType>
        </element>
      </sequence>
    </extension>
  </complexContent>
</complexType>
```

Figure 9:
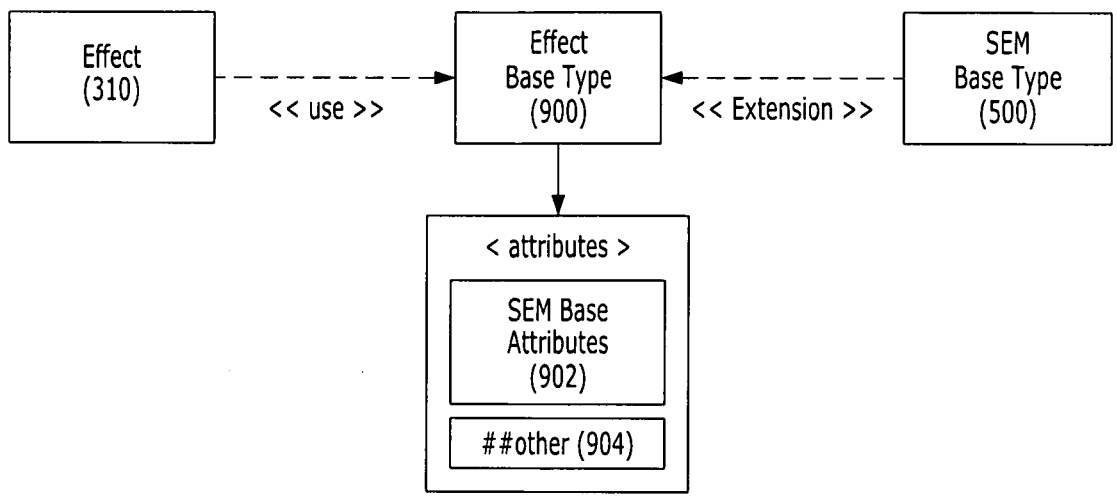
FIG. 9 is a block diagram illustrating elements of Effect metadata 310 in accordance with the embodiment of the present invention.

FIG. 9 is a block diagram illustrating elements of the Effect metadata 310 in accordance with the embodiment of the present invention.

As illustrated in FIG. 9, the Effect metadata 310 uses Effect Base Type metadata 900, and the Effect Base Type metadata 900 may be extended from the SEM Base Type 500.

The Effect Base Type metadata 900 includes SEM Base Attributes metadata 902 for describing a group of attributes including attributes necessary for sensory effect description and metadata (###other) 904 for describing extendible attribute information.

Figure 10:
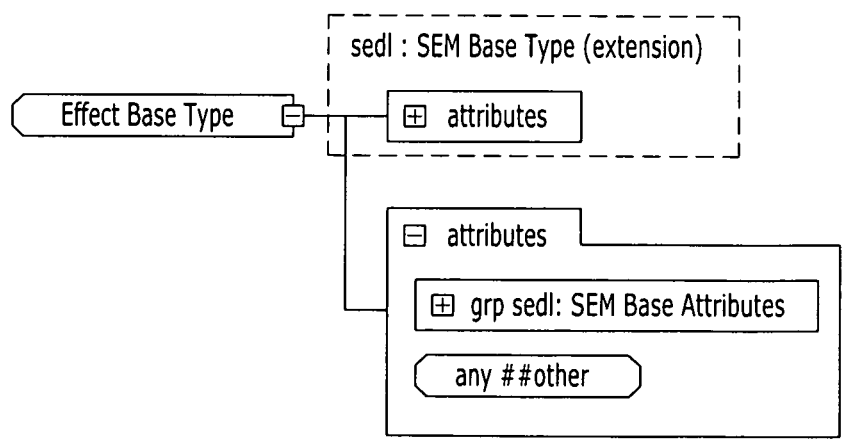
FIG. 10 is a block diagram illustrating a schema type of Effect Base Type metadata 900 in accordance with the embodiment of the present invention.

FIG. 10 is a block diagram illustrating a schema type of the Effect Base Type metadata 900 in accordance with the embodiment of the present invention. In FIG. 10, the Effect Base Type metadata 900 and elements of the Effect Base Type metadata 900, described in FIG. 9, are shown in the form of a schema.

In Table 4, the description structure of the Effect Base Type metadata 900 is shown in the form of an XML schema.

TABLE 4

```
<complexType name="EffectBaseType" abstract="true">
  <complexContent>
    <extension base="sedl:SEMBaseType">
```

TABLE 4-continued

```
      <attributeGroup ref="sedl:SEMBaseAttributes"/>
      <anyAttribute namespace="##other" processContents="lax"/>
    </extension>
  </complexContent>
</complexType>
```

Figure 11:
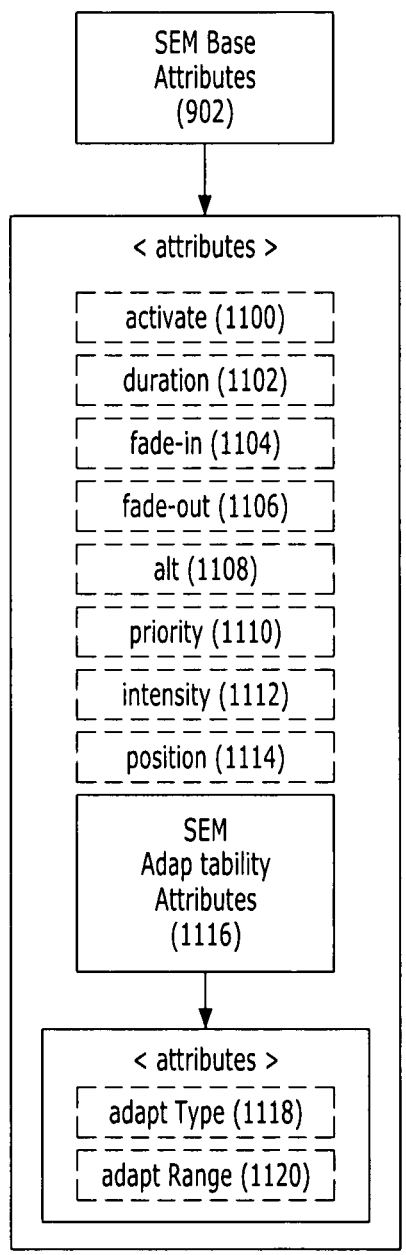
FIG. 11 is a block diagram illustrating elements of SEM Base Attributes metadata 902 in accordance with the embodiment of the present invention.

FIG. 11 is a block diagram illustrating elements of the SEM Base Attributes metadata 902 in accordance with the embodiment of the present invention.

As illustrated in FIG. 11, the SEM Base Attributes metadata 902 includes metadata (activate) 1100 for describing attribute information showing activation of a sensory effect, metadata (duration) 1102 for describing attribute information showing duration in which the sensory effect is constantly reproduced, metadata (fade-in) 1104 for describing attribute information showing time at which a fade-in is applied to the sensory effect when the reproduction of the sensory effect is started, metadata (fade-out) 1106 for describing attribute information showing time at which a fade-out is applied to the sensory effect when the reproduction of the sensory effect is ended, metadata (alt) 1108 for describing attribute information showing URI of an effect substitutable for the sensory effect, metadata (priority) 1110 for describing attribute information showing reproduction priority of the sensory effect, metadata (intensity) 1112 for describing attribute information showing reproduction intensity of the sensory effect, metadata (position) 1114 for describing attribute information showing information on the position at which the sensory effect is represented, and metadata (SEMAdaptabilityAttributes) 1116 for describing attribute information showing adaptation for the reproduction intensity in the reproduction of the sensory effect.

The SEMAdaptablilityAttributes metadata 1116 includes metadata (adaptType) 1118 for describing attribute information showing preference for adaptation and metadata (adaptRange) 1120 for describing attribute information showing a range for the adaptation.

Specifically, alt metadata 1108 shows position information on a substitutable sensory effect when it is necessary to substitute another sensory effect for a predetermined sensory effect. The position metadata 1114 shows position information on a position at which the sensory effect is represented, e.g., a position at which the wind effect is represented at a left side.

The SEMAdaptablilityAttributes metadata 1116 shows a degree of adaptation for the reproduction intensity in the reproduction of the sensory effect. For example, when the predetermined reproduction intensity is 100%, the SEMAdaptablilityAttributes metadata 1116 shows information on whether the sensory effect is reproduced by strictly applying the reproduction intensity of 100% or by flexibly applying the reproduction intensity of 100%. That is, attribute information related to adaptation is described so that the sensory effect can be reduced in the adaptType metadata 1118. If the reproduction intensity is described as 10% in the adaptRange metadata 1120, a wind effect of 90% may be represented in the sensory reproduction apparatus 113.

In Table 5, the description structure of the SEM Base Attributes metadata 902 is shown in the form of an XML schema.

TABLE 5

```
<attributeGroup name="SEMBaseAttributes">
  <attribute name="activate" type="boolean" use="optional"/>
  <attribute name="duration" type="nonNegativeInteger"
    use="optional"/>
  <attribute name="fade-in" type="nonNegativeInteger"
    use="optional"/>
  <attribute name="fade-out" type="nonNegativeInteger"
    use="optional"/>
  <attribute name="alt" type="anyURI" use="optional"/>
  <attribute name="priority" type="nonNegativeInteger"
    use="optional"/>
  <attribute name="intensity" type="integer" use="optional"/>
  <attribute name="position" type="mpeg7:termReferenceType"
    use="optional"/>
  <attributeGroup ref="sedl:SEMAdaptabilityAttributes"/>
</attributeGroup>
<attributeGroup name="SEMAdaptabilityAttributes">
  <attribute name="adaptType" type="sedl:adaptTypeType"
    use="optional"/>
  <attribute name="adaptRange" type="sedl:adaptRangeType"
    use="optional"
    default="10"/>
</attributeGroup>
<simpleType name="adaptTypeType">
  <restriction base="NMTOKEN">
    <enumeration value="Strict"/>
    <enumeration value="Under"/>
    <enumeration value="Over"/>
    <enumeration value="Both"/>
  </restriction>
</simpleType>
<simpleType name="adaptRangeType">
  <restriction base="unsignedInt">
    <minInclusive value="0"/>
    <maxInclusive value="100"/>
  </restriction>
</simpleType>
```

Figure 12:
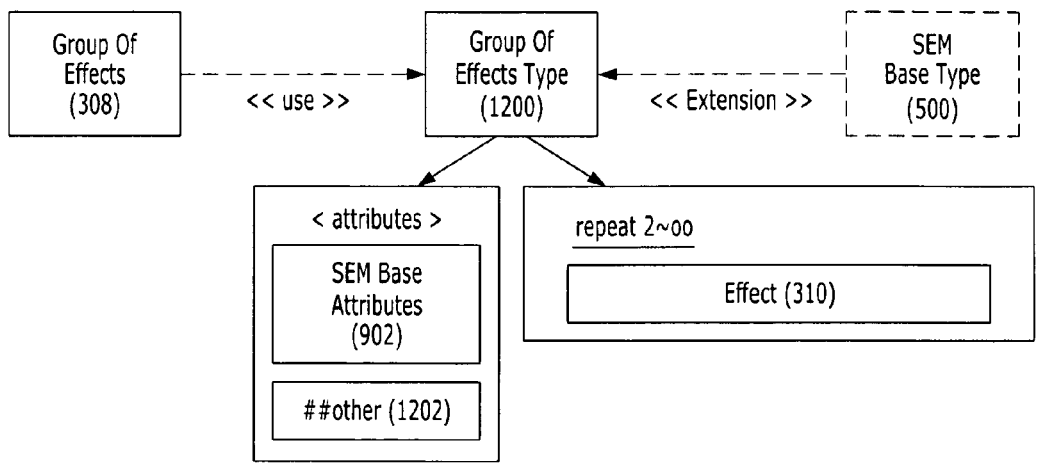
FIG. 12 is a block diagram illustrating elements of Group Of Effects metadata 308 in accordance with the embodiment of the present invention.

FIG. 12 is a block diagram illustrating elements of the Group Of Effects metadata 308 in accordance with the embodiment of the present invention.

As illustrated in FIG. 12, the Group Of Effects metadata 308 uses Group Of Effects Type metadata 1200, and the Group Of Effects Type metadata 1200 may be extended from the SEM Base Type 500.

The Group Of Effects metadata 308 includes the SEM Base Attributes metadata 902 for describing a group of attributes including attributes necessary for sensory effect description, the metadata (##other) 904 for describing extendible attribute information, and the Effect metadata 310 for describing one sensory effect information. The Group Of Effects metadata 308 may include two or more Effect metadata 310.

Figure 13:
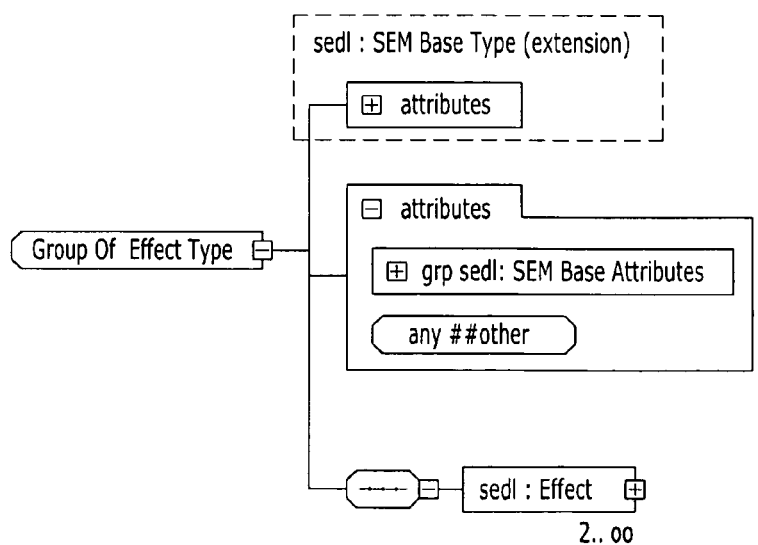
FIG. 13 is a block diagram illustrating a schema type of the group of Effects metadata 308 in accordance with the embodiment of the present invention.

FIG. 13 is a block diagram illustrating a schema type of the Group Of Effects metadata 308 in accordance with the embodiment of the present invention. In FIG. 13, the Group Of Effects Type metadata and elements of the Group Of Effects Type metadata, described in FIG. 12, are shown in the form of a schema.

In Table 6, the description structure of the Group Of Effects Type metadata 1200 is shown in the form of an XML schema.

TABLE 6

```
<complexType name="GroupOfEffectsType">
  <complexContent>
    <extension base="sedl:SEMBaseType">
      <sequence>
        <element ref="sedl:Effect" minOccurs="2"
          maxOccurs="unbounded"/>
      </sequence>
      <attributeGroup ref="sedl:SEMBaseAttributes"/>
      <anyAttribute namespace="##other" processContents="lax"/>
    </extension>
  </complexContent>
</complexType>
```

Figure 14:
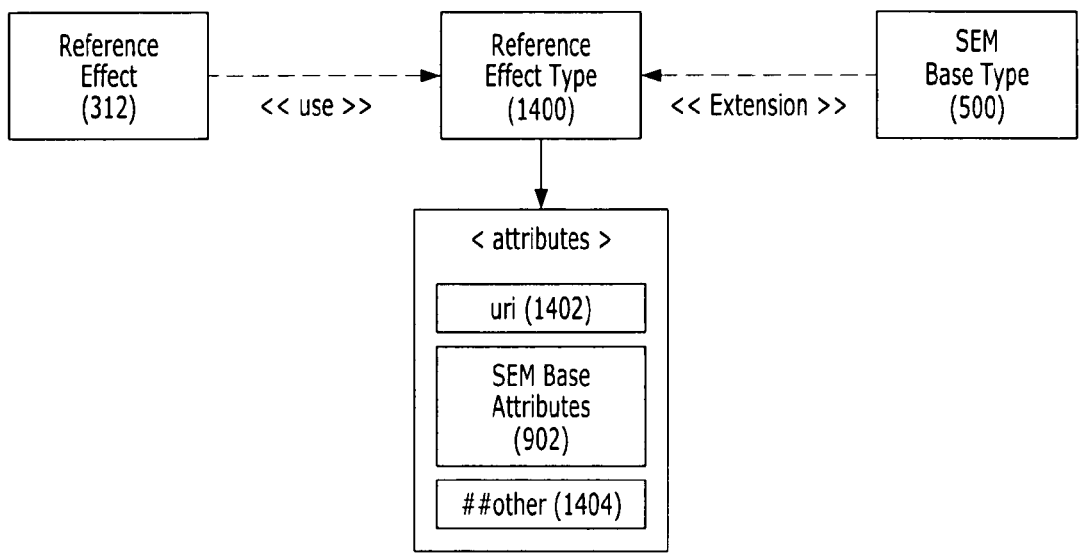
FIG. 14 is a block diagram illustrating elements of Reference Effect metadata 312 in accordance with the embodiment of the present invention.

FIG. 14 is a block diagram illustrating elements of the Reference Effect metadata 312 in accordance with the embodiment of the present invention.

As illustrated in FIG. 14, the Reference Effect metadata 312 uses Reference Effect Type metadata 1400, and the Reference Effect Type metadata 1400 may be extended from the SEM Base Type 500.

The reference effect metadata 312 includes metadata (uri) 1402 for describing attribute information showing a position of a sensory effect to be referred, the SEM Base Attributes metadata 902 for describing a group of attributes including attributes necessary for sensory effect description, and metadata (##other) 1404 for describing extendible attribute information.

Figure 15:
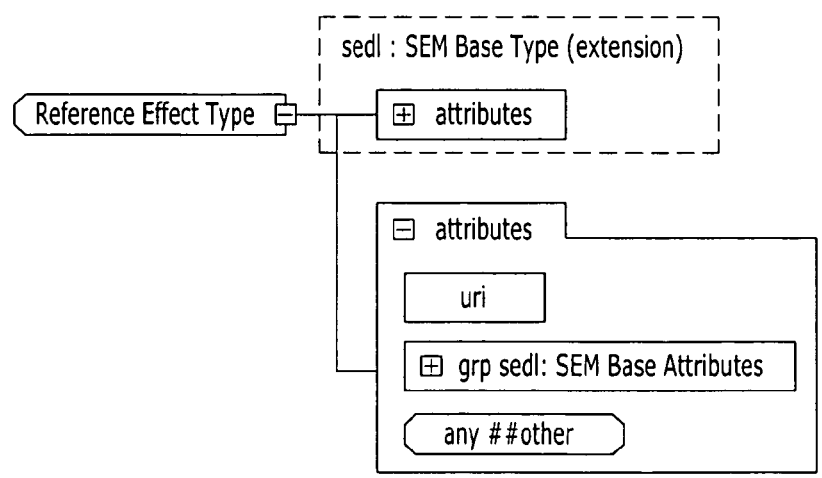
FIG. 15 is a block diagram illustrating a schema type of the Reference Effect metadata 312 in accordance with the embodiment of the present invention.

FIG. 15 is a block diagram illustrating a schema type of the Reference Effect metadata 312 in accordance with the embodiment of the present invention. In FIG. 15, the Reference Effect Type metadata and elements of the Reference Effect Type metadata, described in FIG. 14, are shown in the form of a schema.

In Table 7, the description structure of the Reference Effect Type metadata 1400 is shown in the form of an XML schema.

TABLE 7

```
<complexType name="ReferenceEffectType">
  <complexContent>
    <extension base="sedl:SEMBaseType">
      <attribute name="uri" type="anyURI" use="required"/>
      <attributeGroup ref="sedl:SEMBaseAttributes"/>
      <anyAttribute namespace="##other" processContents="lax"/>
    </extension>
  </complexContent>
</complexType>
```

Figure 16:
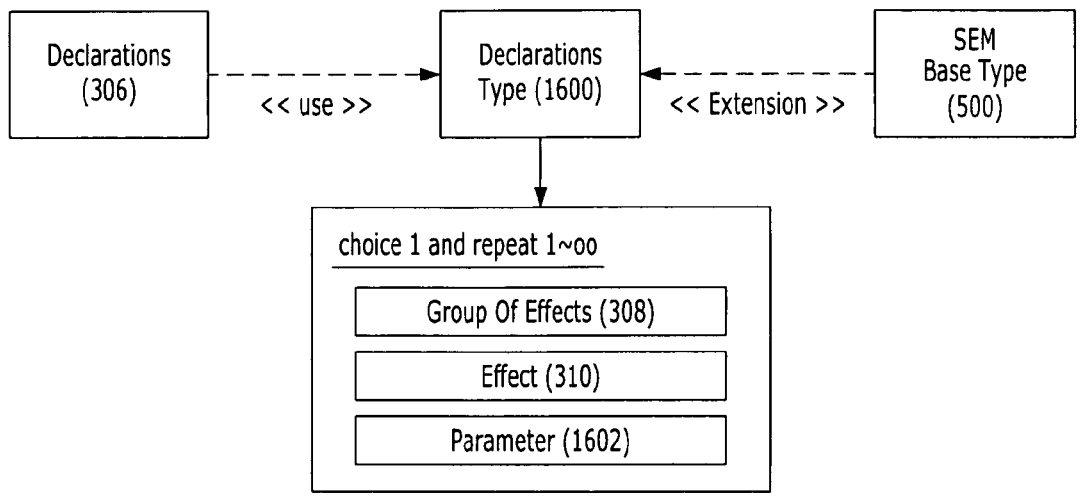
FIG. 16 is a block diagram illustrating elements of Declarations metadata 306 in accordance with the embodiment of the present invention.

FIG. 16 is a block diagram illustrating elements of the Declarations metadata 306 in accordance with the embodiment of the present invention.

As illustrated in FIG. 16, the Declarations metadata 306 uses Declarations Type metadata 1600, and the Declarations Type metadata 1600 may be extended from the SEM Base Type 500.

The Declarations metadata 306 includes the Group Of Effects metadata 308, the Effect metadata 310, and Parameter metadata 1602 for describing parameter information referred to the sensory effect. Any one of the Group Of Effects metadata 308, the Effect metadata 310 and the Parameter metadata 1602 may be repeatedly described in the Declarations metadata 306.

The Group Of Effects metadata 308 and the Effect metadata 310 may be included in the Declarations metadata 306, or may be included in the SEM. In a case where the Group Of Effects metadata 308 and the Effect metadata 310 are used in the Declarations metadata 306, they are used as data previously defined in a dictionary. In a case where the Group Of Effects metadata 308 and the Effect metadata 310 are used in the SEM, they are used as data according to contents of media. For example, when a temperature effect for the media is continuously represented, the temperature effect may be defined in the Declarations metadata. When a temperature effect is represented depending on a situation, the temperature effect may be defined in the SEM.

Figure 17:
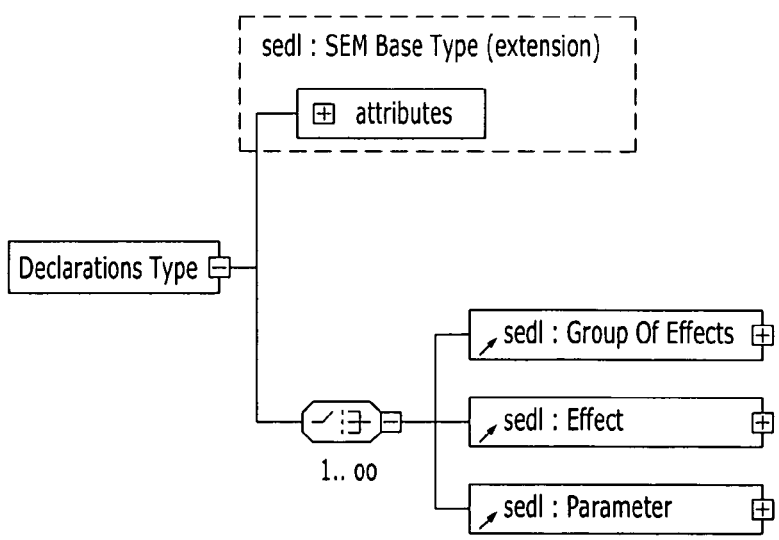
FIG. 17 is a block diagram illustrating a schema type of the Declarations metadata 306 in accordance with the embodiment of the present invention.

FIG. 17 is a block diagram illustrating a schema type of the Declarations metadata 306 in accordance with the embodiment of the present invention. In FIG. 17, the Declarations metadata and elements of the Declarations metadata, described in FIG. 16, are shown in the form of a schema.

In Table 8, the description structure of the Declarations Type metadata 1600 is shown in the form of an XML schema.

TABLE 8

```
<complexType name="DeclarationsType">
  <complexContent>
    <extension base="sedl:SEMBaseType">
      <choice maxOccurs="unbounded">
        <element ref="sedl:GroupOfEffects"/>
        <element ref="sedl:Effect"/>
        <element ref="sedl:Parameter"/>
      </choice>
    </extension>
  </complexContent>
</complexType>
```

Figure 18:
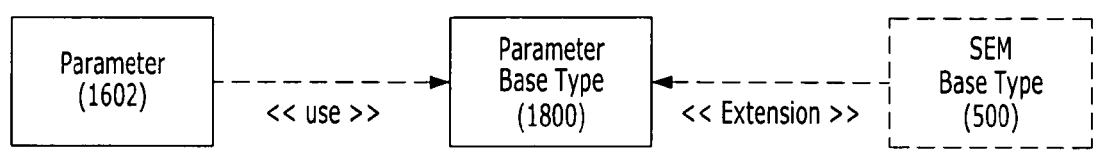
FIG. 18 is a block diagram illustrating elements of Parameter metadata 1602 in accordance with the embodiment of the present invention.

FIG. 18 is a block diagram illustrating elements of the Parameter metadata 1602 in accordance with the embodiment of the present invention.

As illustrated in FIG. 18, the Parameter metadata 1062 uses Parameter Base Type metadata 1800, and the Parameter Base Type metadata 1800 may be extended from the SEM Base Type 500.

Figure 19:
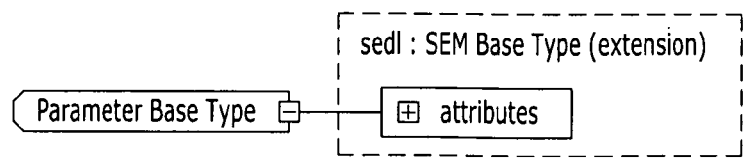
FIG. 19 is a block diagram illustrating a schema type of the Parameter metadata 1602 in accordance with the embodiment of the present invention.

FIG. 19 is a block diagram illustrating a schema type of the Parameter metadata 1602 in accordance with the embodiment of the present invention. In FIG. 19, the Parameter metadata, the Declaration Type metadata and elements of the Parameter metadata and the Declaration Type metadata are shown in the form of a schema.

In Table 9, the description structure of the Parameter Base Type metadata 1800 is shown in the form of an XML schema.

TABLE 9

```
<complexType name="ParameterBaseType" abstract="true">
  <complexContent>
    <extension base="sedl:SEMBaseType"/>
  </complexContent>
</complexType>
```

Figure 20:
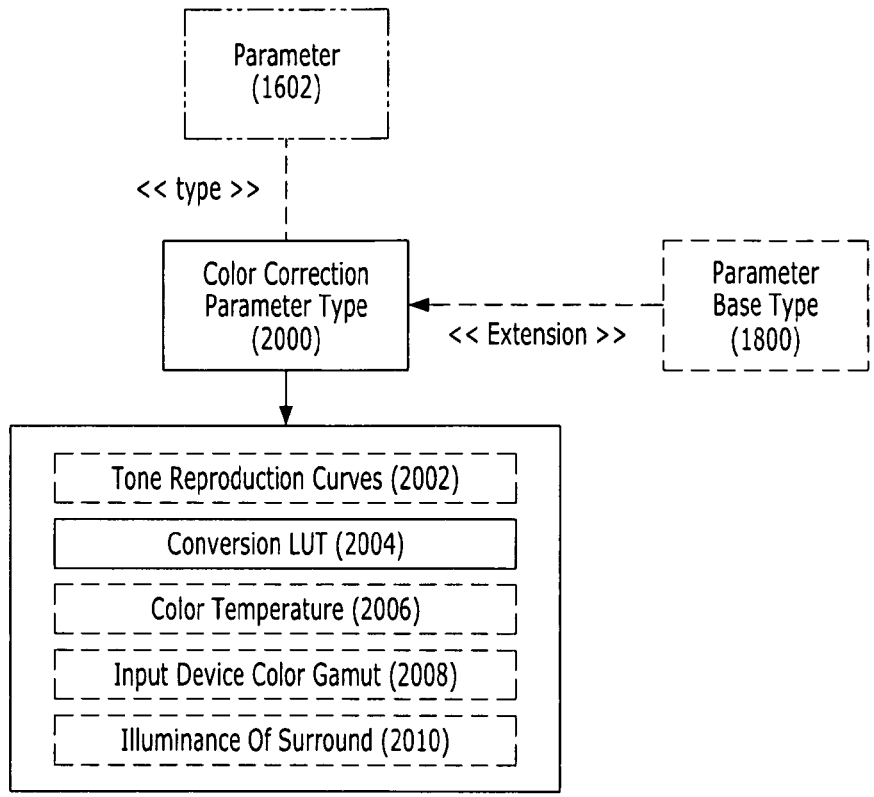
FIG. 20 is a block diagram illustrating elements of Color Correction Parameter Type metadata 2000 in accordance with the embodiment of the present invention.

FIG. 20 is a block diagram illustrating elements of Color Correction Parameter Type metadata 2000 in accordance with the embodiment of the present invention.

As illustrated in FIG. 20, the Color Correction Parameter Type metadata 2000 uses as one type of the Parameter metadata 1602, and may be extended from the Parameter Base Type metadata 1800.

The Color Correction Parameter Type metadata 2000 includes at least one of Tone Reproduction Curves 2002, Conversion LUT 2004, Color Temperature 2006, Input Device Color Gamut 2008 and Illumination Of Surround 2010.

Since contents providing environment and characteristics of the sensory reproduction apparatus are different as described above, it is difficult to reproduce pictures identical to the original pictures of contents in the sensory reproduction apparatus. That is, since the apparatus used to generate contents and the sensory reproduction apparatus have a difference in color property, a difference in color representation occurs when the original pictures of the contents are reproduced in the sensory reproduction apparatus as they are. Thus, in the embodiment of the present invention, color correction effect information on the original pictures of the contents is provided to the sensory reproduction apparatus, so that the original pictures of the contents can be reproduced in the sensory reproduction apparatus. Here, the color correction effect information may include color correction parameters and Color Correction Type metadata 3000 of FIG. 30, which will be described later.

That is, the sensory reproduction apparatus engine unit 109 analyzes color correction parameters from the SEM and generates SDCmd metadata so that the sensory reproduction apparatus can restore the original pictures of the contents or display pictures intended by the contents provider. Alternatively, the sensory reproduction apparatus may represent a color correction effect intended by the contents provider with reference to the color correction parameters.

The Tone Reproduction Curves 2002 show characteristics of an original picture display device for the original pictures of the contents. That is, the Tone Reproduction Curves 2002 for describing tone reproduction curves showing the characteristics of the original picture display device used in production of the contents are provided as color correction parameters so as to perform successful color restoration in the sensory reproduction apparatus 113.

The Conversion LUT 2004 includes information for converting a color space for the original pictures into a standard color space. Since the color space of the original pictures and the color space in the sensory reproduction apparatus 113 are different, the Conversion LUT 2004 is provided as a color correction parameter. Here, the Conversion LUT 2004 includes an LUT for how the color space of the original pictures is converted in the standard color space and parameter information.

The Color Temperature 2006 shows color temperature information of illumination used in a production space of the original pictures. That is, the Color Temperature 2006 includes color temperature information on an illumination source used in the production space of the original pictures.

The Input Device Color Gamut 2008 shows input device color gamut information on the original picture display device. Since the input device color gamut of the original picture display unit and the input device color gamut of the sensory reproduction apparatus 113 are different, the Input Device Color Gamut 2008 including input device color gamut information on the original picture display device is provided as a color correction parameter.

The illuminance Of Surround 2010 shows illuminance information on the consumer that reproduces contents.

In the embodiment of the present invention, although a gain offset gamma (GOG) model is used as the method for converting the color space, another conversion model such as a polynomial or PLCC model may be used as the method for converting the color space.

Figure 21:
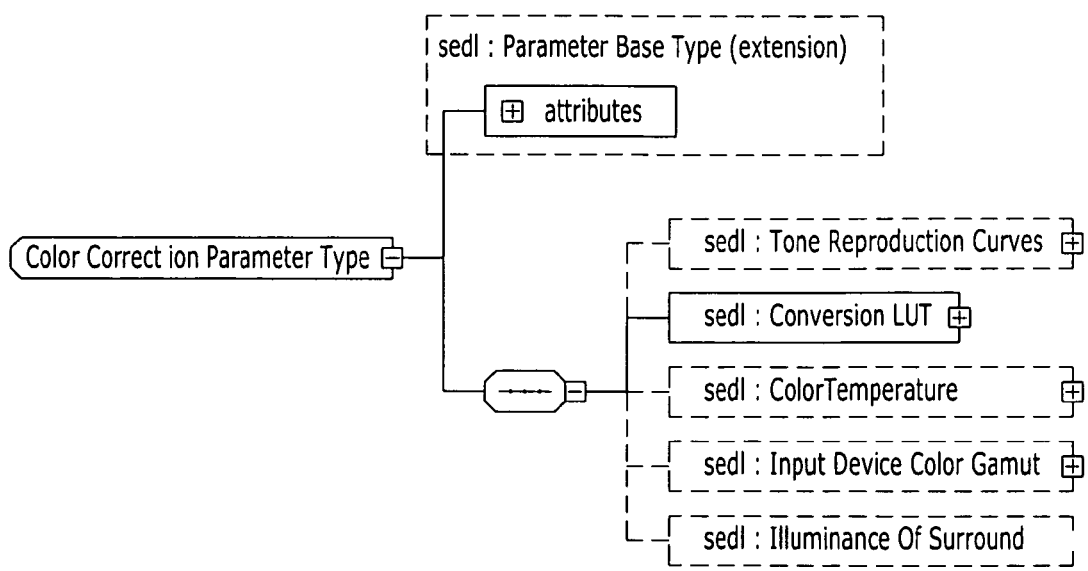
FIG. 21 is a block diagram illustrating a schema type of the Color Correction Parameter Type metadata 2000 in accordance with the embodiment of the present invention.

FIG. 21 is a block diagram illustrating a schema type of the Color Correction Parameter Type metadata 2000 in accordance with the embodiment of the present invention. In FIG.

21, the Color Correction Parameter metadata and elements of the Color Correction Parameter metadata are shown in the form of a schema.

In Table 10, the description structure of the Color Correction Parameter metadata 2000 is shown in the form of an XML schema.

TABLE 10

```
<complexType name="ColorCorrectionParameterType">
  <complexContent>
    <extension base="sedl:ParameterBaseType">
      <sequence>
        <element         name="ToneReproductionCurves"
type="sedl:ToneReproductionCurvesType"
        minOccurs="0"/>
        <element name="ConversionLUT" type="sedl:ConversionLUT-
Type"/>
        <element    name="ColorTemperature"    type="sedl:Illuminant-
Type"
minOccurs="0"/>
        <element         name="InputDeviceColorGamut"
type="sedl:InputDeviceColorGamutType"
        minOccurs="0"/>
        <element name="IlluminanceOfSurround" type="mpeg7:un-
signed12"
minOccurs="0"/>
      </sequence>
    </extension>
  </complexContent>
</complexType>
```

Figure 22:
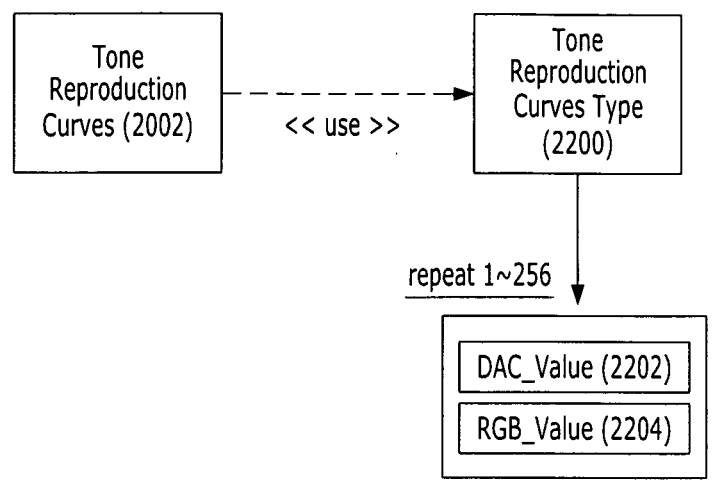
FIG. 22 is a block diagram illustrating elements of Tone Reproduction Curves metadata 2002 in accordance with the embodiment of the present invention.

FIG. 22 is a block diagram illustrating elements of the Tone Reproduction Curves metadata 2002 in accordance with the embodiment of the present invention.

As illustrated in FIG. 22, the Tone Reproduction Curves metadata 2002 uses Tone Reproduction Curves Type metadata 2200.

The Tone Reproduction Curves Type metadata 2200 includes a digital to analog conversion (DAC) value for an RGB channel of the original picture display device and an RGB value (RGB_value) 2204 of the RGB channel according to the DAC value (DAC_value) 2202. The DAC value and the RGB value are used to evaluate a gamma value, i.e., a tone reproduction curve. The gamma value is a numerical value showing correlation between the input and output of the display device. The gamma value shows a ratio of input voltage to brightness.

That is, the gamma value may be evaluated through the DAC value that is a digital value outputted from the RGB channel according to an input voltage and the RGB value measured through a spectrometer. The sensory reproduction apparatus 113 may reproduce the contents or represent the color correction effect with reference to the gamma value evaluated using the DAC value and the RGB value.

The DAC_Value metadata 2202 and the RGB_value metadata 2204 may be repeatedly described in the Tone Reproduction Curves metadata 2002 from once to 256 times in pair (described in sequence).

Figure 23:
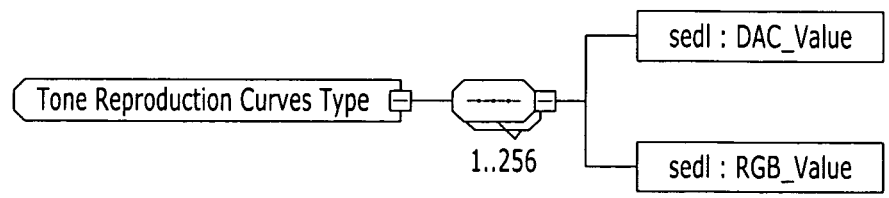
FIG. 23 is a block diagram illustrating a schema type of Tone Reproduction Curves Type metadata 2200 in accordance with the embodiment of the present invention.

FIG. 23 is a block diagram illustrating a schema type of the Tone Reproduction Curves Type metadata 2200 in accordance with the embodiment of the present invention. In FIG. 23, the Tone Reproduction Curves Type metadata and elements of the Tone Reproduction Curves Type metadata are shown in the form of a schema.

In Table 11, the description structure of the Tone Reproduction Curves Type metadata 2200 is shown in the form of an XML schema.

TABLE 11

```
<complexType name="ToneReproductionCurvesType">
  <sequence maxOccurs="256">
    <element name="DAC_Value" type="mpeg7:unsigned8"/>
    <element name="RGB_Value" type="mpeg7:doubleVector"/>
  </sequence>
</complexType>
```

Figure 24:
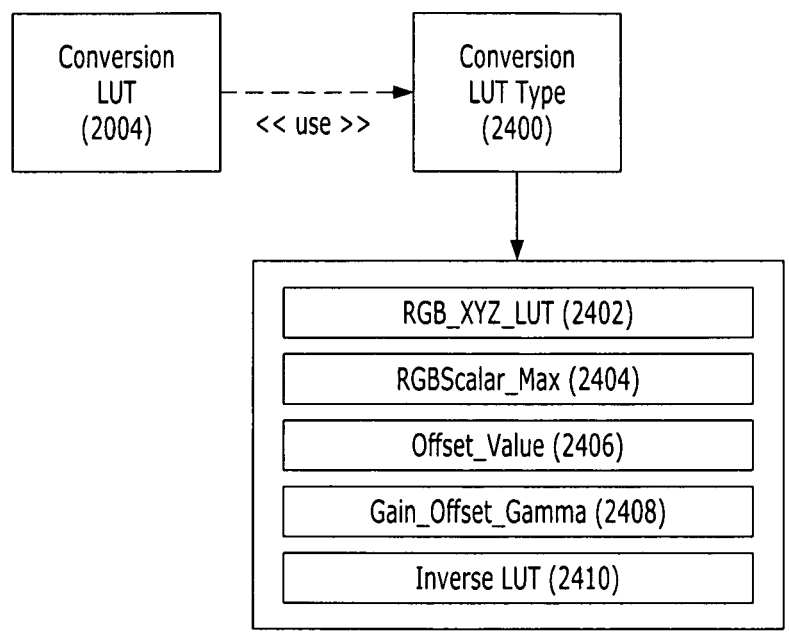
FIG. 24 is a block diagram illustrating elements of Conversion LUT metadata 2004 in accordance with the embodiment of the present invention.

FIG. 24 is a block diagram illustrating elements of the Conversion LUT metadata 2004 in accordance with the embodiment of the present invention. In FIG. 24, the Conversion LUT metadata 2004 corresponds to the aforementioned conversion information.

As illustrated in FIG. 24, the Conversion LUT metadata 2004 uses Conversion LUT Type metadata 2400.

The Conversion LUT metadata 2004 includes RGB_XYZ_LUT 2402, Parameter information and Inverse LUT 2410.

The RGB_XYZ_LUT 2402 is information for converting the RGB color space into the XYZ color space. The Inverse LUT 2410 is information for the XYZ color space into the RGB color space.

The parameter information describes a gain, offset and gamma value of the original picture display device for GOG conversion and an RGB scalar maximum value for the RGB channel. That is, the parameter information includes RGB-Scalar_Max 2404 for describing the RGB scalar maximum value for each channel, which is necessary for the GOG conversion, Offset_Value 2406 for describing the offset value of the original picture display device, and Gain_Offset_Gamma 2408 for describing the gain, offset and gamma value of the original picture display device, that are parameters necessary for the GOG conversion.

That is, according to conversion information, the RGB color space that is a color space of the original pictures may be converted into the XYZ color space that is a standard color space. The sensory reproduction apparatus 113 may reproduce the contents or represent the color correction effect with reference to the conversion information.

Figure 25:
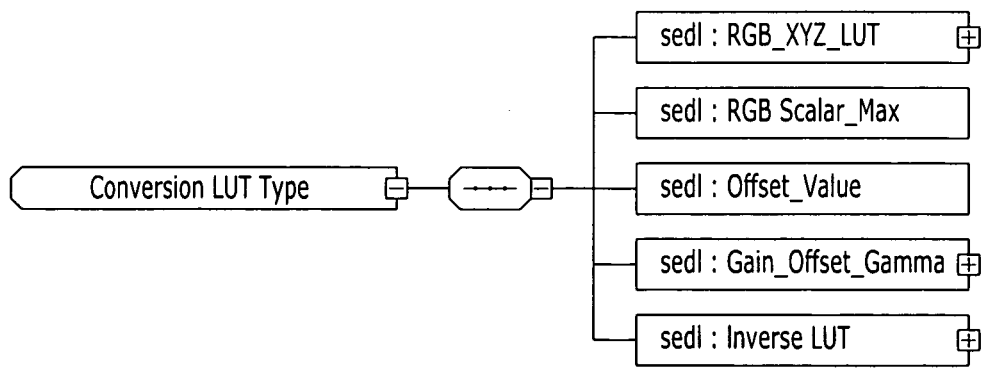
FIG. 25 is a block diagram illustrating a schema type of Conversion LUT Type metadata 2400 in accordance with the embodiment of the present invention.

FIG. 25 is a block diagram illustrating a schema type of the Conversion LUT Type metadata 2400 in accordance with the embodiment of the present invention. In FIG. 25, the ToneConversion LUT Type metadata and elements of the Conversion LUT Type metadata, described in FIG. 24, are shown in the form of a schema.

In Table 12, the description structure of the Conversion LUT Type metadata 2400 is shown in the form of an XML schema.

TABLE 12

```
<complexType name="ConversionLUTType">
  <sequence>
    <element name="RGB_XYZ_LUT"
    type="mpeg7:DoubleMatrixType"/>
    <element name="RGBScalar_Max" type="mpeg7:doubleVector"/>
    <element name="Offset_Value" type="mpeg7:doubleVector"/>
    <element name="Gain_Offset_Gamma"
    type="mpeg7:DoubleMatrixType"/>
    <element name="InverseLUT" type="mpeg7:DoubleMatrixType"/>
  </sequence>
</complexType>
```

Figure 26:
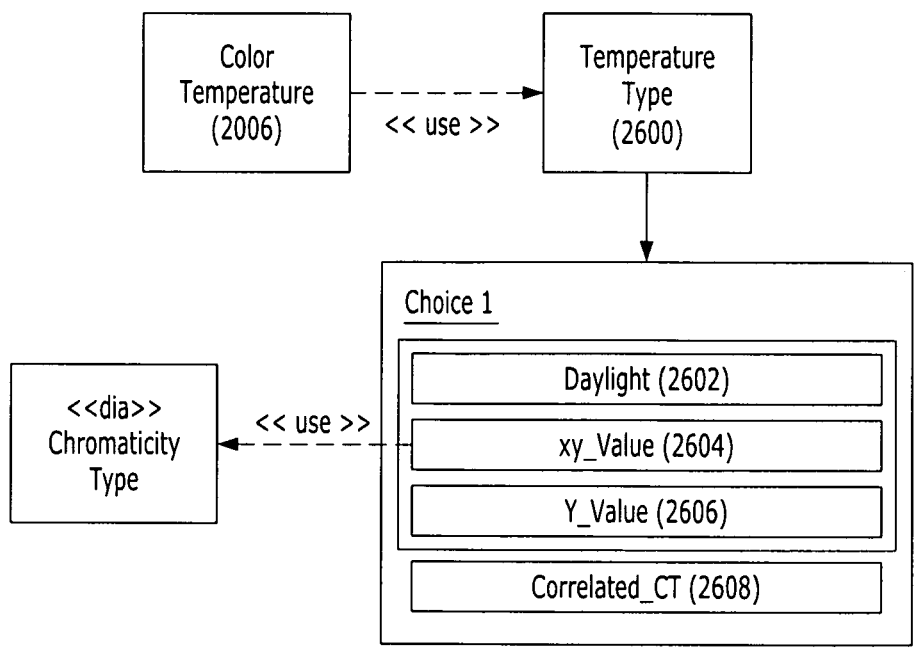
FIG. 26 is a block diagram illustrating elements of Color Temperature metadata 2006 of an illuminant in accordance with the embodiment of the present invention.

FIG. 26 is a block diagram illustrating elements of the Color Temperature metadata 2006 of an illuminant in accordance with the embodiment of the present invention.

As illustrated in FIG. 26, the Color Temperature metadata 2006 uses Illuminant Type metadata 2600.

The Color Temperature 2006 may include type information of the illuminant (Daylight) 2602, white point chromaticity value (xy_Value) 2604 and brightness of the illuminant (Y_Value) 2606. Alternatively, the Color Temperature 2006 may include correlated color temperature information (Correlated_CT) 2608. That is, the Daylight 2602, the xy_Value 2604 and the Y_Value 2606 are necessarily described together with the Color Temperature metadata 2006. Selectively, only the Correlated_CT 2608 may be described in the Color Temperature metadata 2006.

Here, the Daylight metadata 2602 may be an illumination type according to the name (type) of commission internationale de l'Eclairage (CIE) standard illuminant. The xy_Value metadata 2604 may use Chromaticity Type metadata of MPEG-21 DIA.

The sensory reproduction apparatus 113 may reproduce the contents or represent the color correction effect with reference to the Color Temperature 2006.

Figure 27:
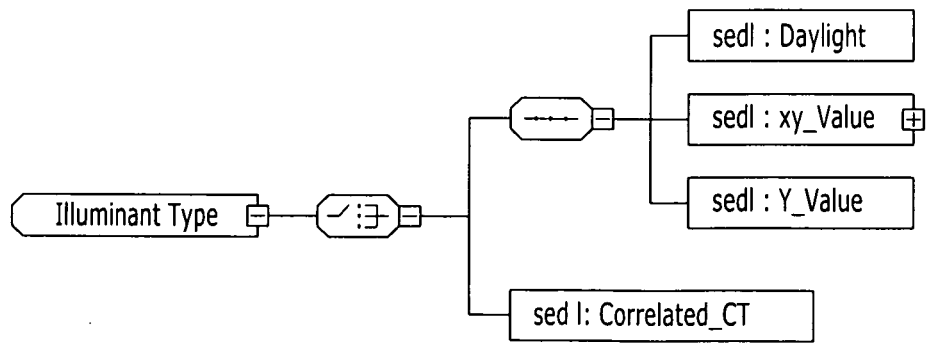
FIG. 27 is a block diagram illustrating a schema type of Illuminant Type metadata 2600 in accordance with the embodiment of the present invention.

FIG. 27 is a block diagram illustrating a schema type of the Illuminant Type metadata 2600 in accordance with the embodiment of the present invention. In FIG. 27, the Illuminant Type metadata and elements of the Illuminant Type metadata are shown in the form of a schema.

In Table 13, the description structure of the Illuminant Type metadata 2600 is shown in the form of an XML schema.

TABLE 13

```
<complexType name="IlluminantType">
    <choice>
      <sequence>
        <element name="Daylight" type="string"/>
        <element name="xy_Value" type="dia:ChromaticityType"/>
        <element name="Y_Value" type="mpeg7:unsigned7"/>
      </sequence>
      <element name="Correlated_CT" type="mpeg7:unsigned8"/>
    </choice>
</complexType>
```

Figure 28:
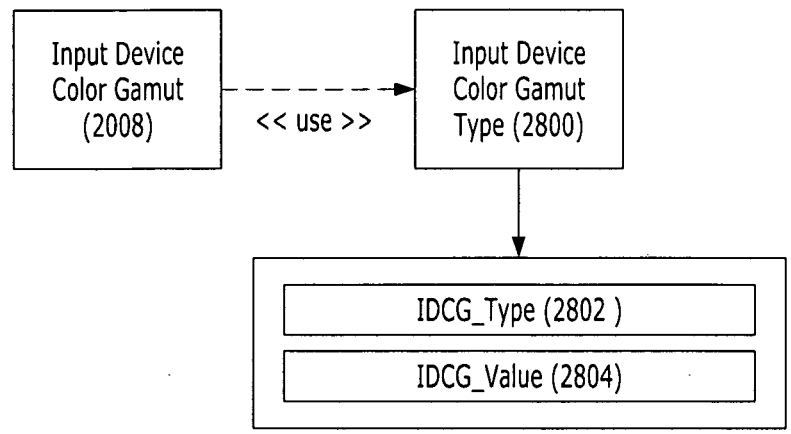
FIG. 28 is a block diagram illustrating elements of Input Device Color Gamut metadata 2008 in accordance with the embodiment of the present invention.

FIG. 28 is a block diagram illustrating elements of the Input Device Color Gamut metadata 2008 in accordance with the embodiment of the present invention.

As illustrated in FIG. 28, the Input Device Color Gamut metadata 2008 uses Input Device Color Gamut Type metadata 2800.

The Input Device Color Gamut 2008 includes kind information of the original picture display device (IDCG_Type) 2802 and input device color gamut value according to the maximum DAC value of the original picture display device (IDCG_Value) 2804. That is, the IDCG_Type 2802 describes the kind of an input device that receives the original pictures of the contents, and the IDCG_Value 2804 describes the input device color gamut value in the maximum DAC value of the input device as a value on x and y coordinates.

The sensory reproduction apparatus 113 may reproduce the contents or represent the color correction effect with reference to the Input Device Color Gamut 2008.

Figure 29:
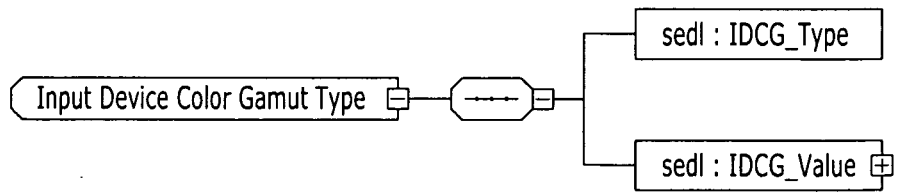
FIG. 29 is a block diagram illustrating a schema type of Input Device Color Gamut Type metadata 2800 in accordance with the embodiment of the present invention.

FIG. 29 is a block diagram illustrating a schema type of the Input Device Color Gamut Type metadata 2800 in accordance with the embodiment of the present invention. In FIG. 29, the Input Device Color Gamut Type metadata and elements of the Input Device Color Gamut Type metadata, described in FIG. 28, are shown in the form of a schema.

In Table 14, the description structure of the Input Device Color Gamut Type metadata 2800 is shown in the form of an XML schema.

TABLE 14

```
<complexType name="InputDeviceColorGamutType">
    <sequence>
      <element name="IDCG_Type" type="string"/>
      <element name="IDCG_Value" type="mpeg7:DoubleMatrixType"/>
    </sequence>
</complexType>
```

Figure 30:
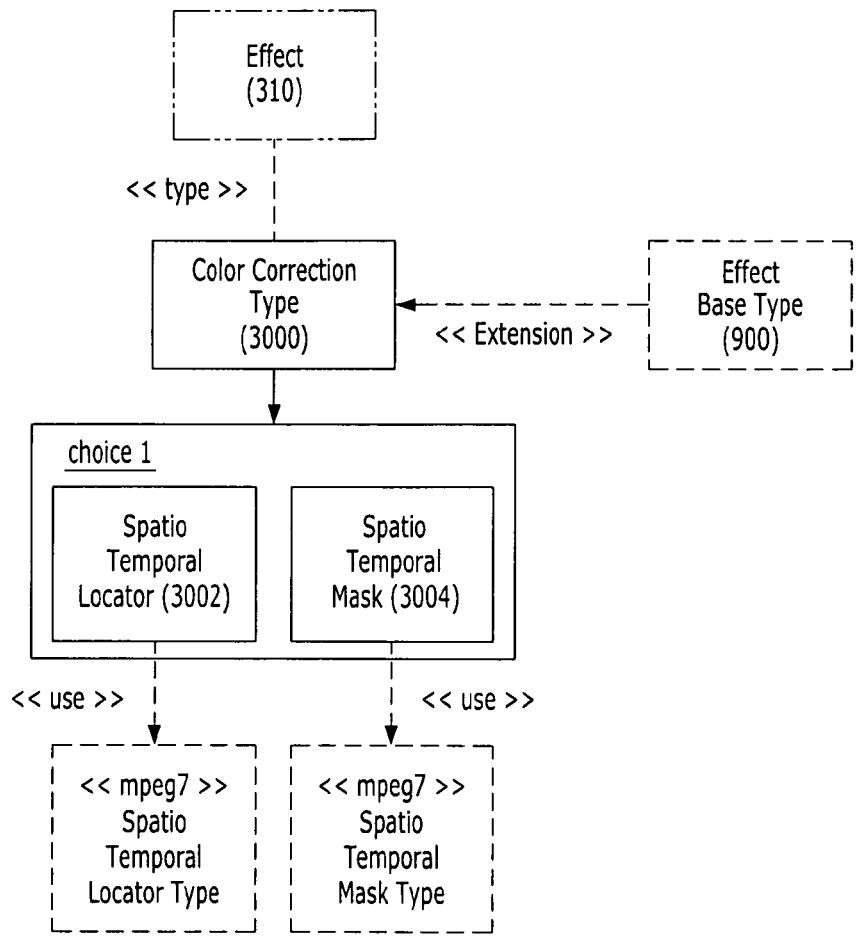
FIG. 30 is a block diagram illustrating elements of Color Correction Type metadata 3000 in accordance with the embodiment of the present invention.

FIG. 30 is a block diagram illustrating elements of the Color Correction Type metadata 3000 in accordance with the embodiment of the present invention. In FIG. 30, the Color Correction Type 3000 is described as an embodiment of the sensory effect information.

As illustrated in FIG. 30, the Color Correction Type metadata 3000 is used as one type of the Effect metadata 310, and may be extended from the Effect Base Type 900.

The Color Correction Type metadata 3000 may include at least one of a Spatio Temporal Locator 3002 and a Spatio Temporal Mask 3004. The Spatio Temporal Locator 3002 and the Spatio Temporal Mask 3004 are elements used to trace and interpolate a range (or object) subjected to color correction depending on a color correction range and a change in position for the purpose of applying partial color correction. The Spatio Temporal Locator 3002 shows the position of a color correction object using a coordinate, and the Spatio Temporal Mask 3004 shows the position of the color correction object using a mask.

The sensory reproduction apparatus 113 may represent the color correction effect using the Color Correction Type metadata 3000 with reference to the Color Correction Parameter metadata 2000.

The Spatio Temporal Locator Type of MPEG-7 MDS may be used as the Spatio Temporal Locator 3002, and the Spatio Temporal Mask Type of MPEG-7 MDS may be used as the Spatio Temporal Mask 3004.

Figure 31:
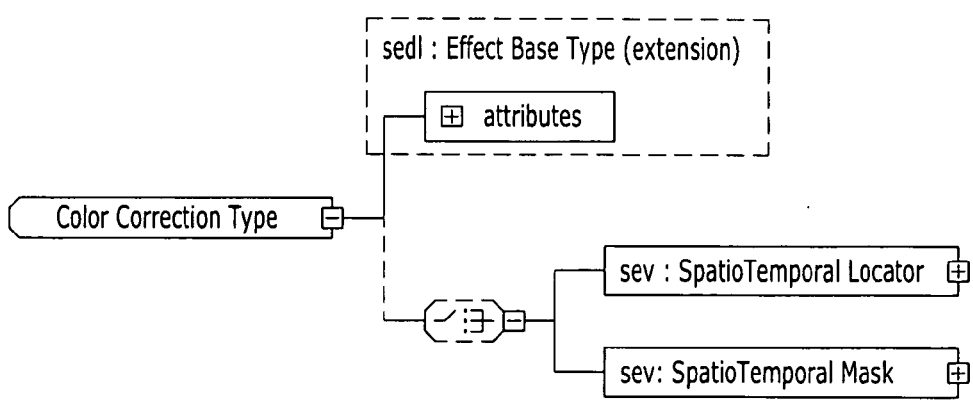
FIG. 31 is a block diagram illustrating a schema type of the Color Correction Type metadata 3000 in accordance with the embodiment of the present invention.

FIG. 31 is a block diagram illustrating a schema type of the Color Correction Type metadata 3000 in accordance with the embodiment of the present invention. In FIG. 31, the Color Correction Type metadata and elements of the Color Correction Type metadata, described in FIG. 30, are shown in the form of a schema.

In Table 15, the description structure of the Color Correction Type metadata 3000 is shown in the form of an XML schema.

TABLE 15

```
<complexType name="ColorCorrectionType">
    <complexContent>
      <extension base="sedl:EffectBaseType">
        <choice minOccurs="0">
          <element            name="SpatioTemporalLocator"
type="mpeg7:SpatioTemporalLocatorType"/>
          <element            name="SpatioTemporalMask"
type="mpeg7:SpatioTemporalMaskType"/>
        </choice>
      </extension>
    </complexContent>
</complexType>
```

Figure 32:
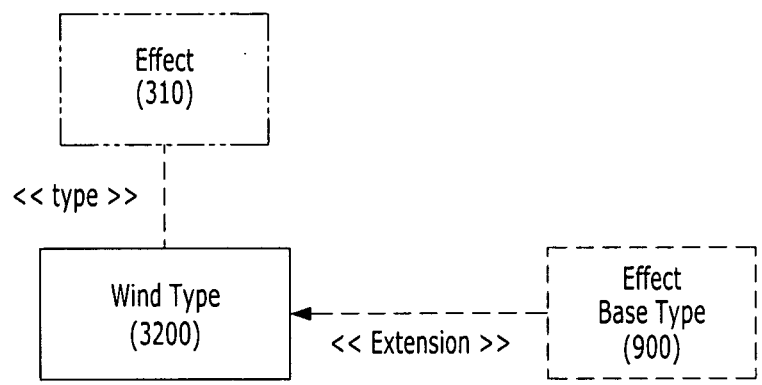
FIG. 32 is a block diagram illustrating elements of Wind Type metadata 3200 in accordance with the embodiment of the present invention.

FIG. 32 is a block diagram illustrating elements of Wind Type metadata 3200 in accordance with the embodiment of the present invention. In FIG. 32, the Wind Type metadata 3200 is described as an embodiment of the sensory effect information.

As illustrated in FIG. 32, the Wind Type metadata 3200 is used as one type of the Effect metadata 310, and may be extended from the Effect Base Type 900.

Figure 33:
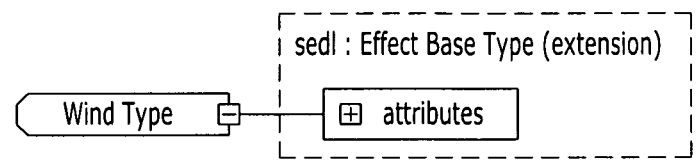
FIG. 33 is a block diagram illustrating a schema type of the Wind Type metadata 3200 in accordance with the embodiment of the present invention.

FIG. 33 is a block diagram illustrating a schema type of the Wind Type metadata 3200 in accordance with the embodiment of the present invention. In FIG. 33, the Wind Type metadata and elements of the Wind Type metadata are shown in the form of a schema.

In Table 16, the description structure of the Wind Type metadata 3200 is shown in the form of an XML schema.

TABLE 16

```
<complexType name="WindType">
    <complexContent>
        <extension base="sedl:EffectBaseType"/>
    </complexContent>
</complexType>
```

Figure 34:
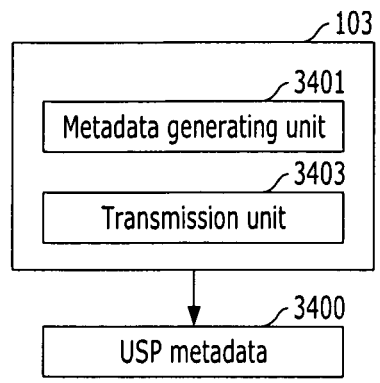
FIG. 34 is a block diagram illustrating User Sensory Preferences (USP) metadata generating unit 103 in accordance with the embodiment of the present invention.

FIG. 34 is a block diagram illustrating the USP metadata generating unit 103 in accordance with the embodiment of the present invention.

As illustrated in FIG. 34, the USP metadata generating unit 103 in accordance with the embodiment of the present invention includes a metadata generating unit 3401 and a transmission unit 3403.

The metadata generating unit 3401 generates USP metadata 3400 including consumer preference information on a sensory effect. The transmission unit 3403 analyzes the USP metadata 3400 and transmits the USP metadata 3400 to the sensory reproduction apparatus engine unit 109 for generating control information on the sensory reproduction apparatus 113 that reproduces the sensory effect.

Here, the sensory effect information may include at least one of color correction effect information, wind effect information, vibration information, temperature information, main illumination information and peripheral illumination information. For example, the USP metadata 3400 may include consumer preference information on the color correction effect.

Figure 35:
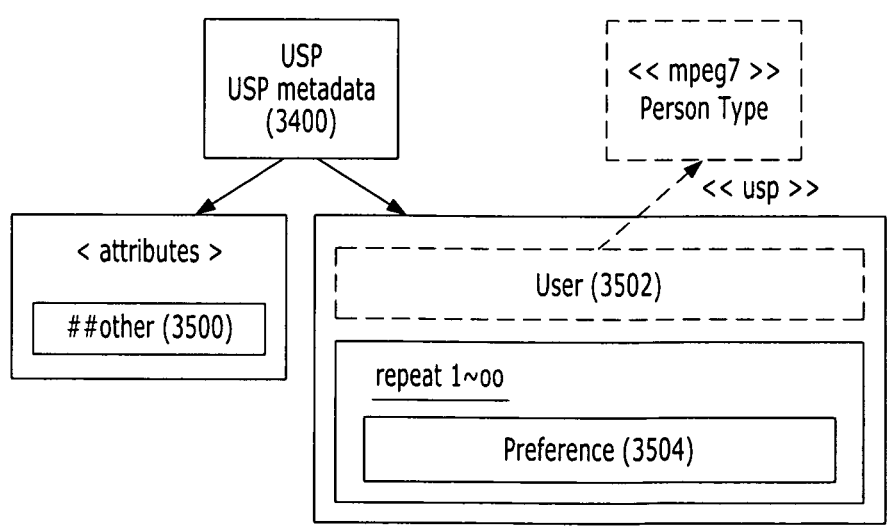
FIG. 35 is a block diagram illustrating elements of USP metadata 3400 in accordance with the embodiment of the present invention.

FIG. 35 is a block diagram illustrating elements of the USP metadata 3400 in accordance with the embodiment of the present invention.

As illustrated in FIG. 35, the USP metadata 3400 includes metadata (##other) 3500 for describing extendible attribute information, metadata (User) 3502 for describing personal information of a final user, and metadata (Preference) 3504 for describing preference information on a sensory effect.

Here, the preference information on the sensory effect may be preference information on the color correction effect, and the Preference metadata 3504 is necessarily described at least once. The sensory reproduction apparatus engine unit 109 may generate SDCmd metadata based on the present of user preference for the color correction effect using the USP metadata 3400.

Figure 36:
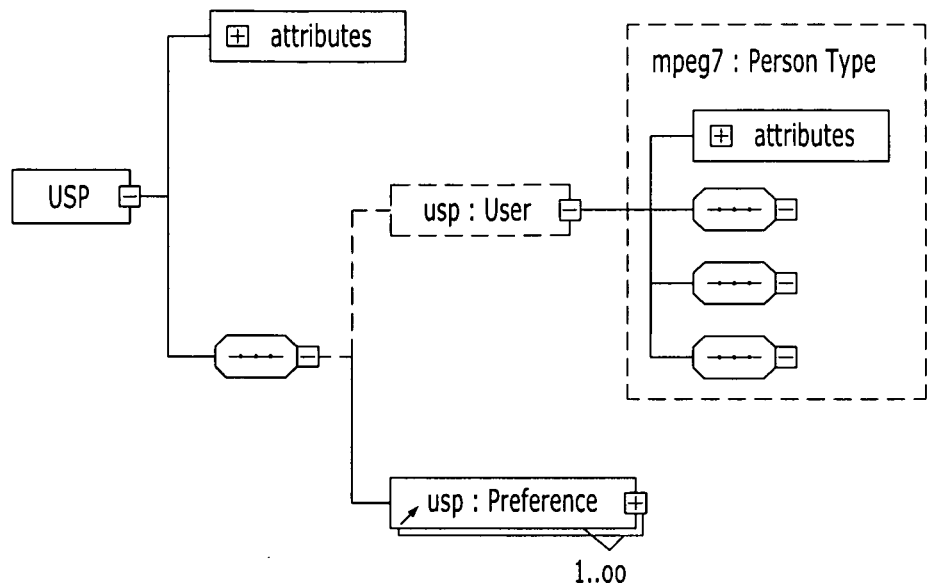
FIG. 36 is a block diagram illustrating a schema type of the USP metadata 3400 in accordance with the embodiment of the present invention.

FIG. 36 is a block diagram illustrating a schema type of the USP metadata 3400 in accordance with the embodiment of the present invention. In FIG. 36, the USP metadata and elements of the USP metadata, described in FIG. 35, are shown in the form of a schema.

In Table 17, the description structure of the USP metadata 3400 is shown in the form of an XML schema.

TABLE 17

```
<element name="USP">
    <complexType>
        <sequence>
            <element ref="usp:User" minOccurs="0"/>
            <element ref="usp:Preference" maxOccurs="unbounded"/>
        </sequence>
        <anyAttribute namespace="##other" processContents="lax"/>
    </complexType>
</element>
```

Figure 37:
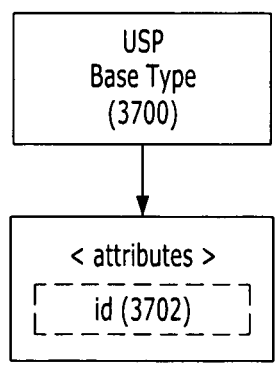
FIG. 37 is a block diagram illustrating a data type of the schema of the USP metadata in accordance with the embodiment of the present invention.

FIG. 37 is a block diagram illustrating a data type of the schema of the USP metadata in accordance with the embodiment of the present invention.

As illustrated in FIG. 37, the schema type of the USP metadata is USP Base Type 3700 provided as a high-level base type. The USP Base Type metadata 3700 includes Identifier Information metadata (id) 3702 including identifiable attribute information. That is, the information included in the USP metadata may be identified based on the Identifier Information metadata (id) 3702.

The USP base type 3700 becomes a base type for a plurality of metadata included in the USP metadata, and the plurality of metadata included in the USP metadata may use a data type extended from the SEM Base Type 500. For example, the plurality of metadata included in the USP metadata may be used as the preference base type of the Preference metadata 3504. The data type extended from the UPS Base Type 3700 includes all the attributes or information of the USP Base Type 3700.

Figure 38:
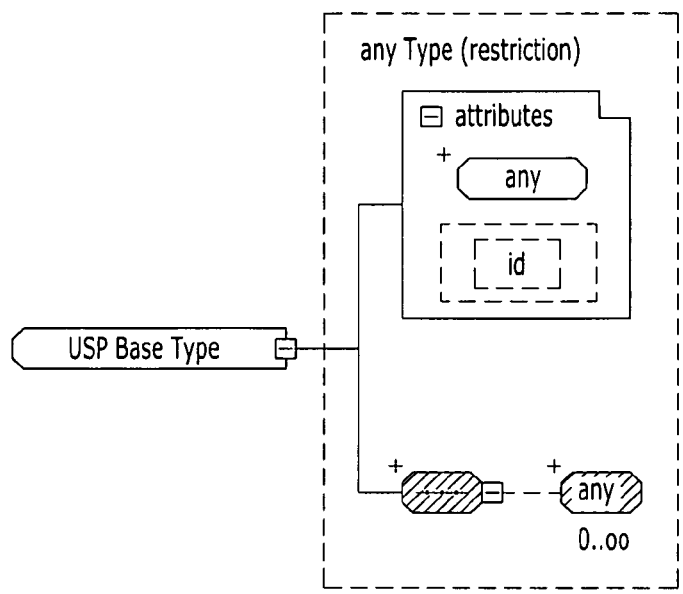
FIG. 38 is a block diagram illustrating a schema type of USP Base Type metadata 3700 in accordance with the embodiment of the present invention.

FIG. 38 is a block diagram illustrating a schema type of the USP Base Type metadata 3700 in accordance with the embodiment of the present invention. In FIG. 38, the USP Base Type metadata and elements of the USP Base Type metadata, described in FIG. 37, are shown in the form of a schema.

In Table 18, the description structure of the USP Base Type metadata 3700 is shown in the form of an XML schema.

TABLE 18

```
<complexType name="USPBaseType" abstract="true">
    <complexContent>
        <restriction base="anyType">
            <attribute name="id" type="ID" use="optional"/>
        </restriction>
    </complexContent>
</complexType>
```

Figure 39:
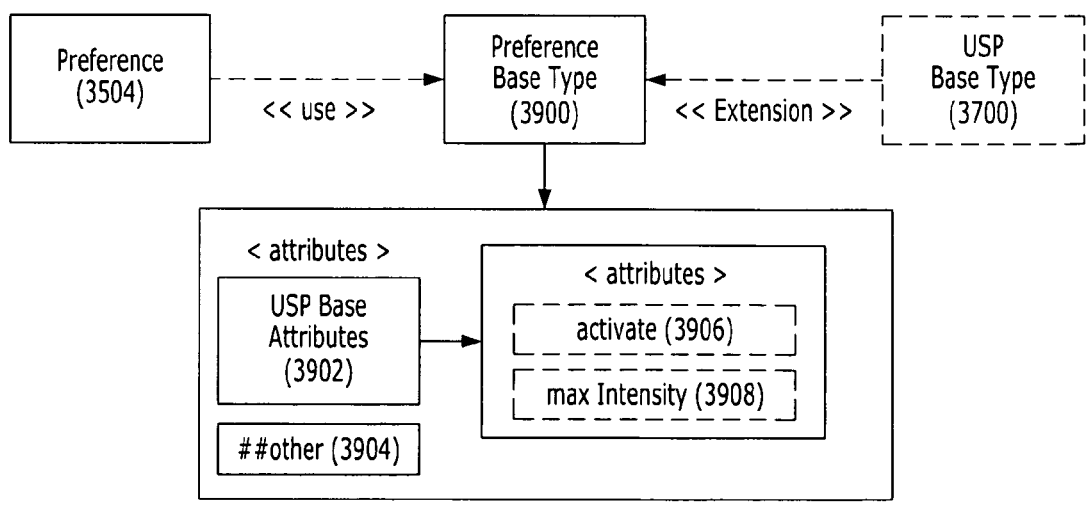
FIG. 39 is a block diagram illustrating elements of Preference metadata 3504 in accordance with the embodiment of the present invention.

FIG. 39 is a block diagram illustrating elements of the Preference metadata 3504 in accordance with the embodiment of the present invention.

As illustrated in FIG. 39, the Preference metadata 3504 uses Preference Base Type metadata 3900, and the Preference Base Type metadata 3900 may be extended from the USP Base Type 3700.

The Preference Base Type metadata 3900 includes metadata 3902 for describing a group of attributes including attributes necessary for description of the sensory effect information and metadata (##other) 3904 for describing extendible attribute information. The USP base attributes metadata 3902 includes metadata (activate) 3906 for describing attribute information showing activation of the reproduction effect and metadata (maxIntensity) 3908 for describing attribute information showing the maximum reproduction intensity.

Figure 40:
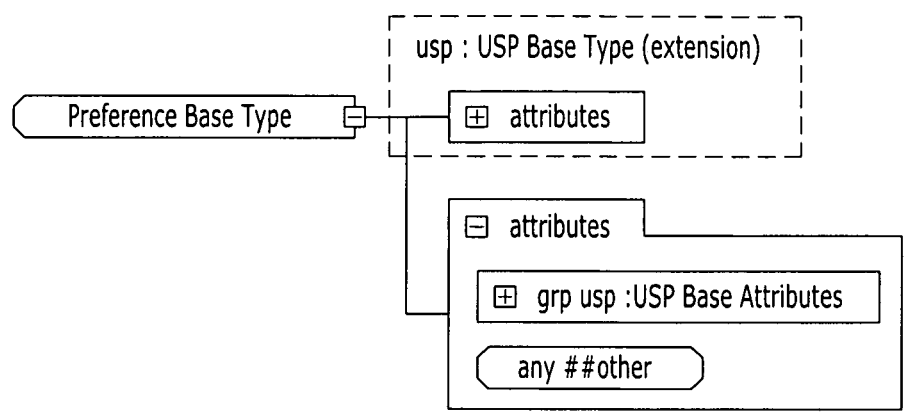
FIG. 40 is a block diagram illustrating a schema type of Preference Base Type metadata 3900 in accordance with the embodiment of the present invention.

FIG. 40 is a block diagram illustrating a schema type of the Preference Base Type metadata 3900 in accordance with the embodiment of the present invention. In FIG. 40, the Preference Base Type metadata and elements of the Preference Base Type metadata are shown in the form of a schema.

In Table 19, the description structure of the Preference Base Type metadata 3900 is shown in the form of an XML schema.

TABLE 19

```
<complexType name="PreferenceBaseType" abstract="true">
    <complexContent>
        <extension base="usp:USPBaseType">
            <attributeGroup ref="usp:USPBaseAttributes"/>
            <anyAttribute namespace="##other" processContents="lax"/>
        </extension>
    </complexContent>
</complexType>
<attributeGroup name="USPBaseAttributes">
    <attribute name="activate" type="boolean" use="optional"/>
    <attribute name="maxIntensity" type="integer" use="optional"/>
</attributeGroup>
```

Figure 41:
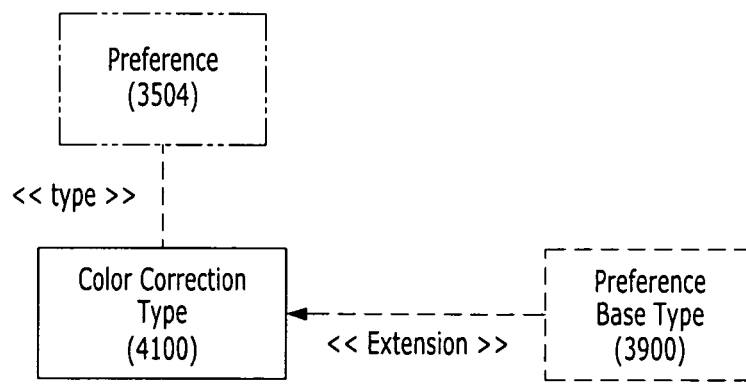
FIG. 41 is a block diagram illustrating elements of Color Correction Preference metadata 4100 in accordance with the embodiment of the present invention.

FIG. 41 is a block diagram illustrating elements of Color Correction Preference metadata 4100 in accordance with the embodiment of the present invention. In FIG. 41, the Color Correction Preference metadata 4100 is used as one type of the Preference metadata 3504.

As illustrated in FIG. 41, the Color Correction Preference metadata 4100 may be extended from the Preference Base Type metadata 3900.

Figure 42:
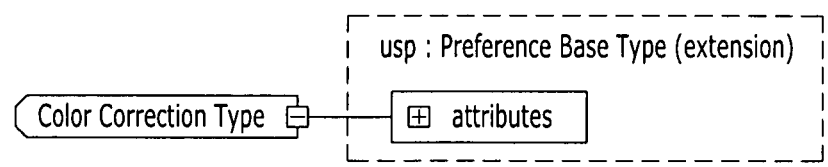
FIG. 42 is a block diagram illustrating a schema type of the Color Correction Preference metadata 4100 in accordance with the embodiment of the present invention.

FIG. 42 is a block diagram illustrating a schema type of the Color Correction Preference metadata 4100 for the color correction effect in accordance with the embodiment of the present invention. In FIG. 42, the Color Correction Preference metadata and elements of the Color Correction Preference metadata are shown in the form of a schema.

In Table 20, the description structure of the Color Correction Preference metadata 4100 is shown in the form of an XML schema.

TABLE 20

```
<complexType name="ColorCorrectionType">
    <complexContent>
        <extension base="usp:PreferenceBaseType"/>
    </complexContent>
</complexType>
```

Figure 43:
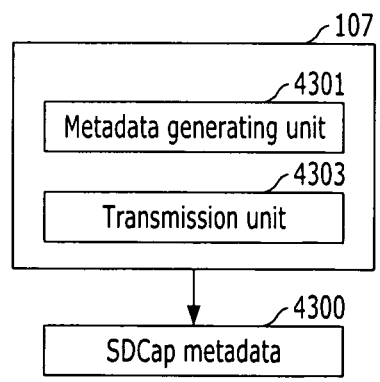
FIG. 43 is a block diagram illustrating Sensory Device Capabilities (SDCap) metadata generating unit 107 in accordance with the embodiment of the present invention.

FIG. 43 is a block diagram illustrating the SDCap metadata generating unit 107 in accordance with the embodiment of the present invention.

As illustrated in FIG. 43, the SDCap metadata generating unit 107 in accordance with the embodiment of the present invention includes a metadata generating unit 4301 and a transmission unit 4303.

The metadata generating unit 4301 generates SDCap metadata 4300 including reproduction capability information of the sensory reproduction apparatus for a sensory effect. The transmission unit 4303 analyzes the SDCap metadata 4300 and transmits the SDCap metadata 4300 to the sensory reproduction apparatus engine unit 109 for generating control information on the sensory reproduction apparatus 113 that reproduces the sensory effect.

Here, the sensory effect information may include at least one of color correction effect information, wind effect information, vibration information, temperature information, main illumination information and peripheral illumination information. For example, the SDCap metadata 4300 may include reproduction capability information on the sensory reproduction apparatus 113 for the color correction effect.

Figure 44:
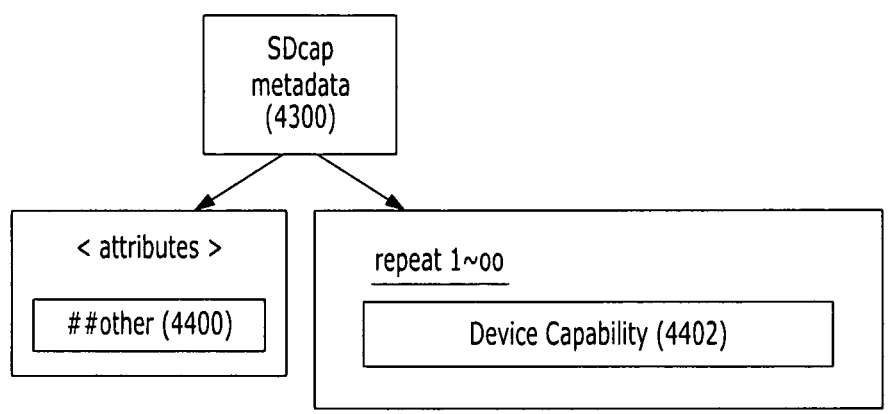
FIG. 44 is a block diagram illustrating elements of SDCap metadata 4300 in accordance with the embodiment of the present invention.

FIG. 44 is a block diagram illustrating elements of the SDCap metadata 4300 in accordance with the embodiment of the present invention.

As illustrated in FIG. 44, the SDCap metadata 4300 includes metadata (##other) 4400 for describing extendible attribute information and metadata (Device Capability) 4402 for describing reproduction capability information on the sensory reproduction apparatus.

Here, the Device Capability metadata 4402 is necessarily described at least once.

Figure 45:
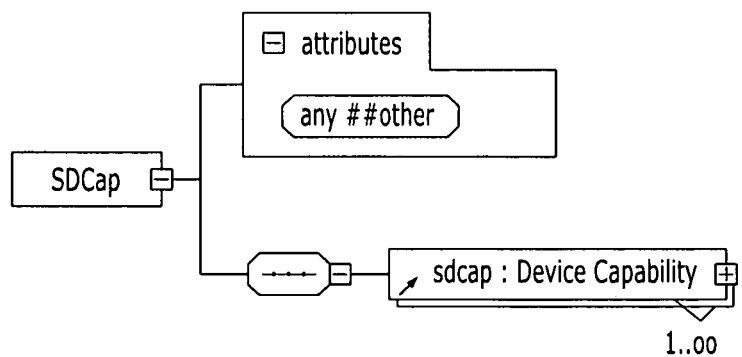
FIG. 45 is a block diagram illustrating a schema type of the SDCap metadata 4300 in accordance with the embodiment of the present invention.

FIG. 45 is a block diagram illustrating a schema type of the SDCap metadata 4300 in accordance with the embodiment of the present invention. In FIG. 45, the SDCap metadata and elements of the SDCap metadata, described in FIG. 44, are shown in the form of a schema.

In Table 21, the description structure of the SDCap metadata 4300 is shown in the form of an XML schema.

TABLE 21

```
<element name="SDCap">
    <complexType>
        <sequence>
            <element ref="sdcap:DeviceCapability" maxOccurs="unbounded"/>
        </sequence>
        <anyAttribute namespace="##other" processContents="lax"/>
    </complexType>
</element>
```

Figure 46:
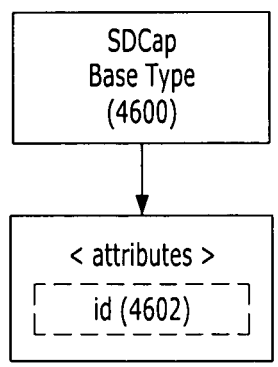
FIG. 46 is a block diagram illustrating a data type of the schema of the SDCap metadata 4300 in accordance with the embodiment of the present invention.

FIG. 46 is a block diagram illustrating a data type of the schema of the SDCap metadata 4300 in accordance with the embodiment of the present invention.

As illustrated in FIG. 46, the schema type of the SDCap metadata 4300 is SDCap Base Type 4600 provided as a high-level base type. The SDCap Base Type metadata 4600 includes Identifier Information metadata (id) 4602 including identifiable attribute information. That is, the information included in the SDCap metadata may be identified based on the Identifier Information metadata (id) 4602.

The SDCap base type 4600 becomes a base type for a plurality of metadata included in the SDCap metadata, the plurality of metadata included in the SDCap metadata may use a data type extended from the SDCap Base Type 4600. For example, the SDCap Base Type 4600 may be used as the device capability base type of the Device Capability metadata 4402. The data type extended from the SDCap Base Type 4600 includes all the attributes or information of the SDCap Base Type 4600.

Figure 47:
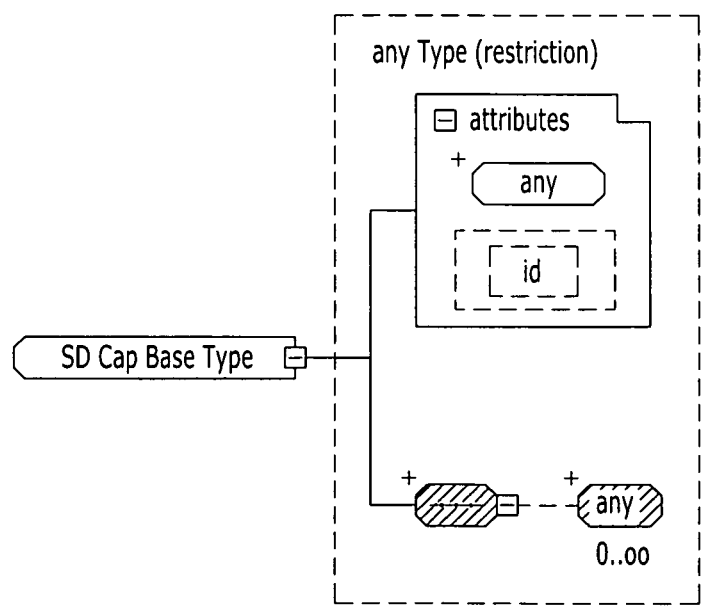
FIG. 47 is a block diagram illustrating a schema type of SDCap Base Type metadata 4600 in accordance with the embodiment of the present invention.

FIG. 47 is a block diagram illustrating a schema type of the SDCap Base Type metadata 4600 in accordance with the embodiment of the present invention. In FIG. 47, the SDCap Base Type metadata and elements of the SDCap Base Type metadata, described in FIG. 46, are shown in the form of a schema.

In Table 22, the description structure of the SDCap Base Type metadata 4600 is shown in the form of an XML schema.

TABLE 22

```
<complexType name="SDCapBaseType" abstract="true">
    <complexContent>
        <restriction base="anyType">
            <attribute name="id" type="ID" use="optional"/>
        </restriction>
    </complexContent>
</complexType>
```

Figure 48:
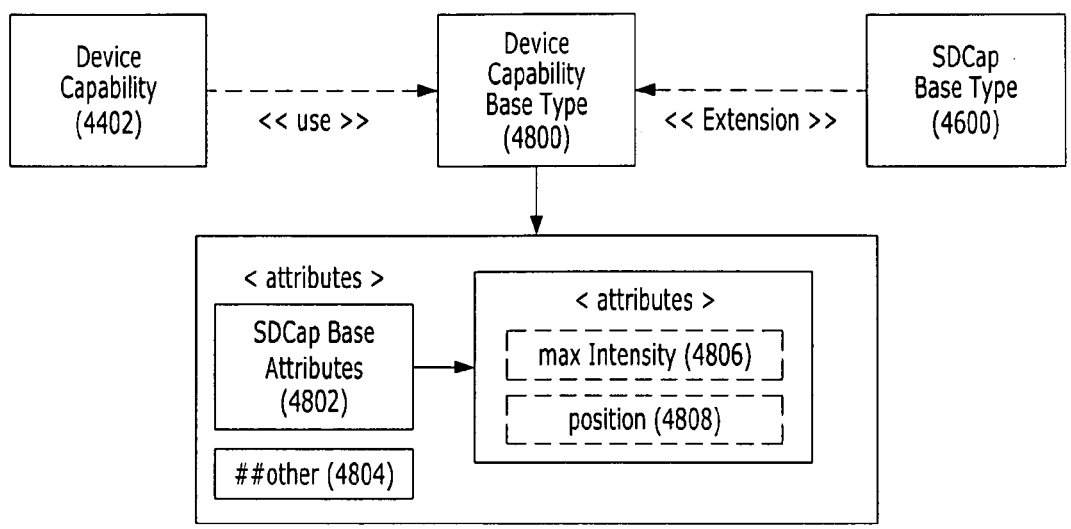
FIG. 48 is a block diagram illustrating elements of Device Capability metadata 4402 in accordance with the embodiment of the present invention.

FIG. 48 is a block diagram illustrating elements of the Device Capability metadata 4402 in accordance with the embodiment of the present invention.

As illustrated in FIG. 48, the Device Capability metadata 4402 uses Device Capability Base Type metadata 4800, and the Device Capability Base Type metadata 4800 may be extended from the SDCap Base Type 4600.

The Device Capability Base Type metadata 4800 includes SDCap Base Attributes metadata 4802 for describing a group of attributes including attributes necessary for description of sensory reproduction apparatus capability and metadata (##other) 4804 for describing extendible attribute information. The SDCap Base Attributes metadata 4802 includes metadata (maxIntensity) 4806 for describing attribute information showing the maximum reproduction capability and metadata (position) 4808 for describing attribute information showing position information of the sensory reproduction apparatus.

Figure 49:
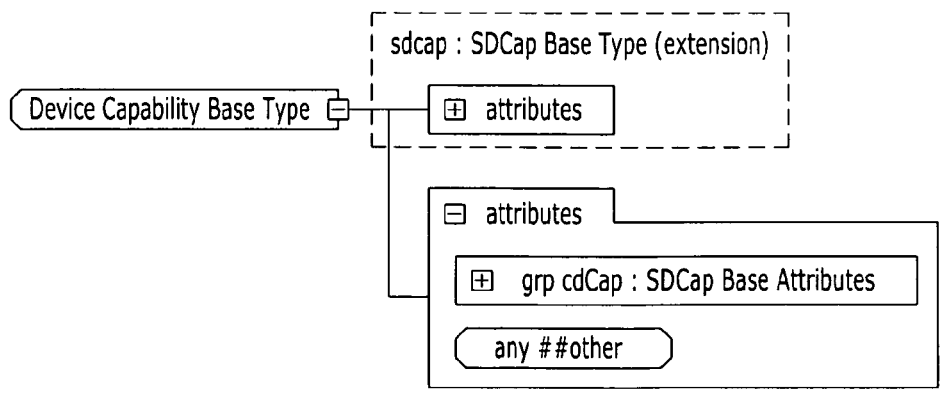
FIG. 49 is a block diagram illustrating a schema type of Device Capability Base Type metadata 4800 in accordance with the embodiment of the present invention.

FIG. 49 is a block diagram illustrating a schema type of the Device Capability Base Type metadata 4800 in accordance with the embodiment of the present invention. In FIG. 49, the Device Capability Base Type metadata and elements of the Device Capability Base Type metadata are shown in the form of a schema.

In Table 23, the description structure of the Device Capability Base Type metadata 4800 is shown in the form of an XML schema.

TABLE 23

```
<complexType name="DeviceCapabilityBaseType" abstract="true">
    <complexContent>
        <extension base="sdcap:SDCapBaseType">
            <attributeGroup ref="sdcap:SDCapBaseAttributes"/>
            <anyAttribute namespace="##other" processContents="lax"/>
        </extension>
    </complexContent>
</complexType>
<attributeGroup name="SDCapBaseAttributes">
    <attribute name="maxIntensity" type="integer" use="optional"/>
    <attribute name="position" type="mpeg7:termReferenceType" use="optional"/>
</attributeGroup>
```

Figure 50:
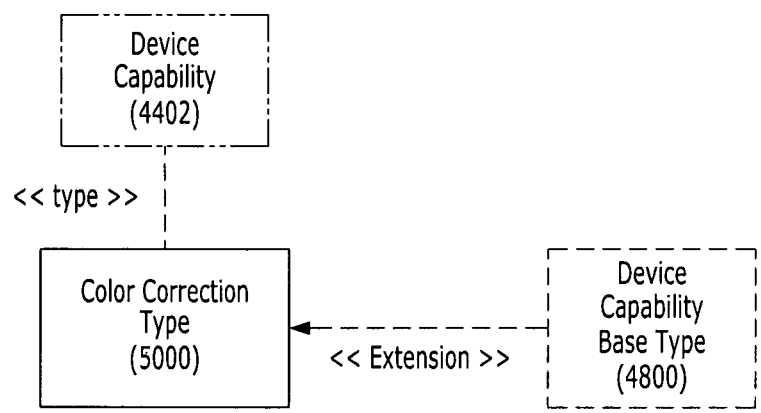
FIG. 50 is a block diagram illustrating elements of Color Correction Device Capability metadata 5000 for representing reproduction capability information of a sensory reproduction apparatus for the color correction effect in accordance with the embodiment of the present invention.

FIG. 50 is a block diagram illustrating elements of Color Correction Device Capability metadata 5000 for representing reproduction capability information of the sensory reproduction apparatus 113 for the color correction effect in accordance with the embodiment of the present invention.

As illustrated in FIG. 50, the Color Correction Device Capability metadata 5000 may be extended from the Device Capability Base Type metadata 4800. The Color Correction Device Capability metadata 5000 is used as one type of the Device Capability metadata 4402.

Figure 51:
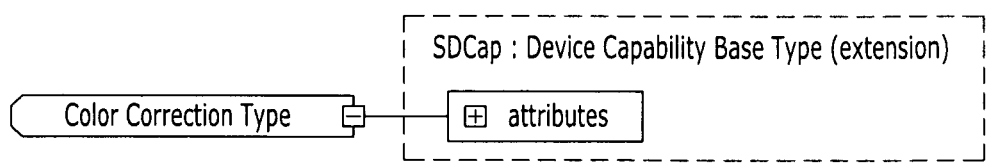
FIG. 51 is a block diagram illustrating a schema type of Color Correction Device Capability metadata 5000 in accordance with the embodiment of the present invention.

FIG. 51 is a block diagram illustrating a schema type of the Color Correction Device Capability metadata 5000 in accordance with the embodiment of the present invention. In FIG. 51, the Color Correction Device Capability metadata and elements of the Color Correction Device Capability metadata are shown in the form of a schema.

In Table 24, the description structure of the Color Correction Device Capability metadata 5000 is shown in the form of an XML schema.

TABLE 24

```
<complexType name="ColorCorrectionType">
    <complexContent>
        <extension base="sdcap:DeviceCapabilityBaseType"/>
    </complexContent>
</complexType>
```

Figure 52:
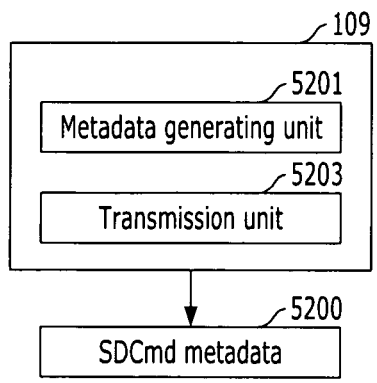
FIG. 52 is a block diagram illustrating a Sensory Device Commands (SDCmd) metadata generating unit 105 in accordance with the embodiment of the present invention.

FIG. 52 is a block diagram illustrating the SDCmd metadata generating unit 105 in accordance with the embodiment of the present invention.

As illustrated in FIG. 52, the SDCap metadata generating unit 105 in accordance with the embodiment of the present invention includes a metadata generating unit 5201 and a transmission unit 5203.

The metadata generating unit 5201 generates SDCmd metadata 5200 including control information on a sensory effect of the sensory reproduction apparatus 113 that reproduces the sensory effect. The metadata generating unit 5201 may generate the SDCmd metadata 5200 by receiving the analyzed result for at least one of the SEM, the USP metadata and the SDCap metadata from the sensory reproduction apparatus engine unit 109.

The transmission unit 5203 transmits the SDCmd metadata 5200 to a control device for controlling the sensory reproduction apparatus 113. For example, the control device may be a control device included in the sensory reproduction apparatus control unit 111 or the sensory reproduction apparatus 113.

Here, the sensory effect information may include at least one of color correction effect information, wind effect information, vibration information, temperature information, main illumination information and peripheral illumination information. For example, the SDCmd metadata 5200 may include control information on the color correction effect.

As described above, the SDCmd metadata generating unit 105 may be included in the sensory reproduction apparatus engine unit 109.

Figure 53:
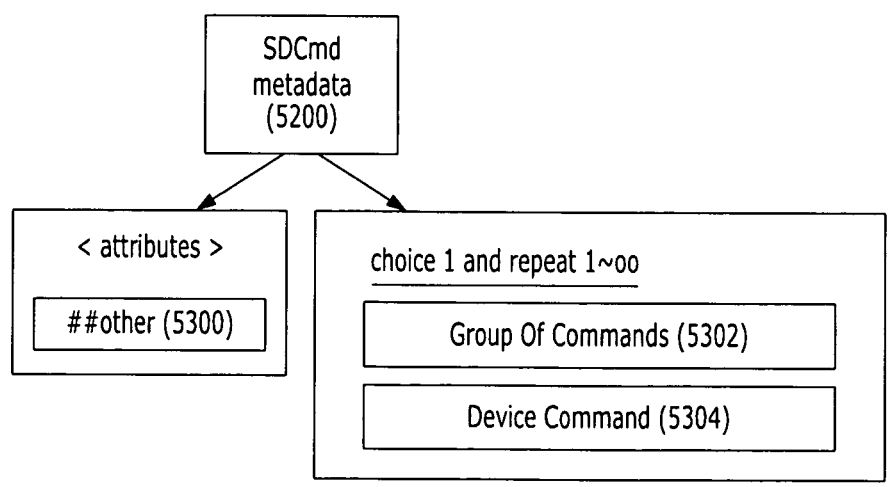
FIG. 53 is a block diagram illustrating elements of SDCmd metadata 5200 in accordance with the embodiment of the present invention.

FIG. 53 is a block diagram illustrating elements of the SDCmd metadata 5200 in accordance with the embodiment of the present invention.

As illustrated in FIG. 53, the SDCmd metadata 5200 includes metadata (##other) 5300 for describing extendible attribute information, metadata (Group Of Commands) 5302 for describing two or more control command information on the sensory reproduction apparatus, and metadata (Device Command) 5304 for describing one control command information on the sensory reproduction apparatus.

One of the Group Of Commands metadata 5302 and the Device Command metadata 5304 is necessarily described at least once.

Figure 54:
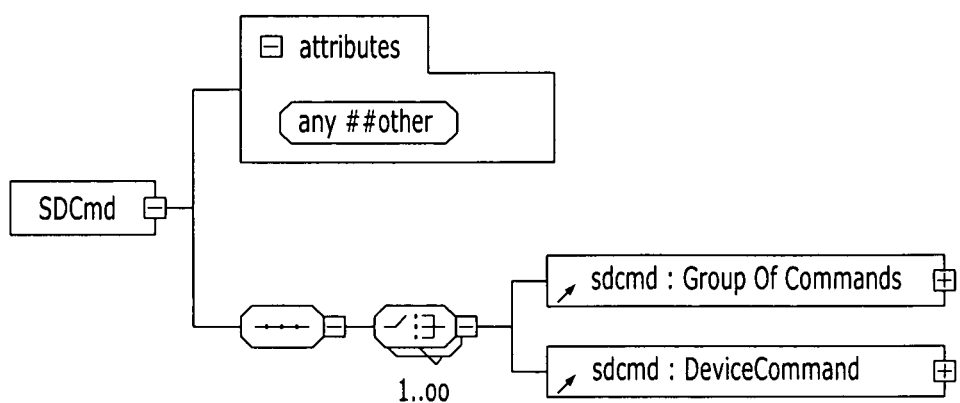
FIG. 54 is a block diagram illustrating a schema type of the SDCmd metadata 5200 in accordance with the embodiment of the present invention.

FIG. 54 is a block diagram illustrating a schema type of the SDCmd metadata 5200 in accordance with the embodiment of the present invention. In FIG. 54, the SDCmd metadata and elements of the SDCmd metadata, described in FIG. 53, are shown in the form of a schema.

In Table 25, the description structure of the SDCmd metadata 5200 is shown in the form of an XML schema.

TABLE 25

```
<element name="SDCmd">
    <complexType>
        <sequence>
            <choice maxOccurs="unbounded">
                <element ref="sdcmd:GroupOfCommands"/>
                <element ref="sdcmd:DeviceCommand"/>
            </choice>
        </sequence>
```

TABLE 25-continued

```
        <anyAttribute namespace="##other" processContents="lax"/>
    </complexType>
</element>
```

Figure 55:
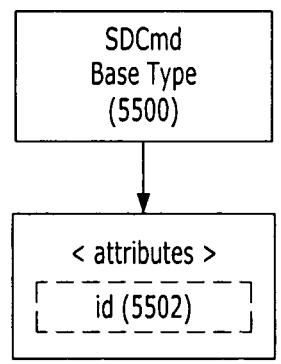
FIG. 55 is a block diagram illustrating a data type of the schema of the SDCmd metadata 5200 in accordance with the embodiment of the present invention.

FIG. 55 is a block diagram illustrating a data type of the schema of the SDCmd metadata 5200 in accordance with the embodiment of the present invention.

As illustrated in FIG. 55, the schema type of the SDCmd metadata 5200 is SDCmd Base Type 5500 provided as a high-level base type. The SDCmd Base Type metadata 5500 includes Identifier Information metadata (id) 5502 including identifiable attribute information. That is, the information included in the SDCmd metadata may be identified based on the Identifier Information metadata (id) 5502.

The SDCmd Base Type 5500 becomes a base type for a plurality of metadata included in the SDCmd metadata, and the plurality of metadata included in the SDCmd metadata may use a data type extended from the SDCmd Base Type 5500. For example, the SDCmd Base Type 5500 may be used as a device command base type of the Device Command metadata 5304. The data type extended from the SDCmd Base Type 5500 includes all the attributes or information of the SDCmd Base Type 5500.

Figure 56:
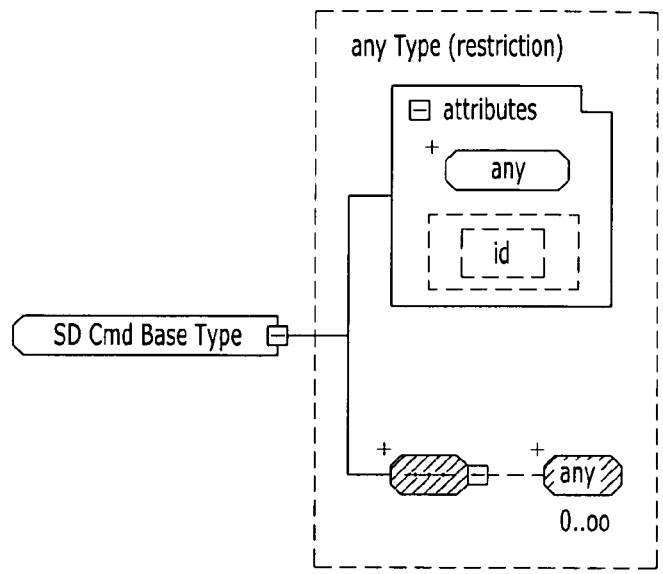
FIG. 56 is a block diagram illustrating a schema type of SDCmd Base Type metadata 5500 in accordance with the embodiment of the present invention.

FIG. 56 is a block diagram illustrating a schema type of the SDCmd Base Type metadata 5500 in accordance with the embodiment of the present invention. In FIG. 56, the SDCmd Base Type metadata and elements of the SDCmd Base Type metadata, described in FIG. 55, are shown in the form of a schema.

In Table 26, the description structure of the SDCmd Base Type metadata 5500 is shown in the form of an XML schema.

TABLE 26

```
<complexType name="SDCmdBaseType" abstract="true">
    <complexContent>
        <restriction base="anyType">
            <attribute name="id" type="ID" use="optional"/>
        </restriction>
    </complexContent>
</complexType>
```

Figure 57:
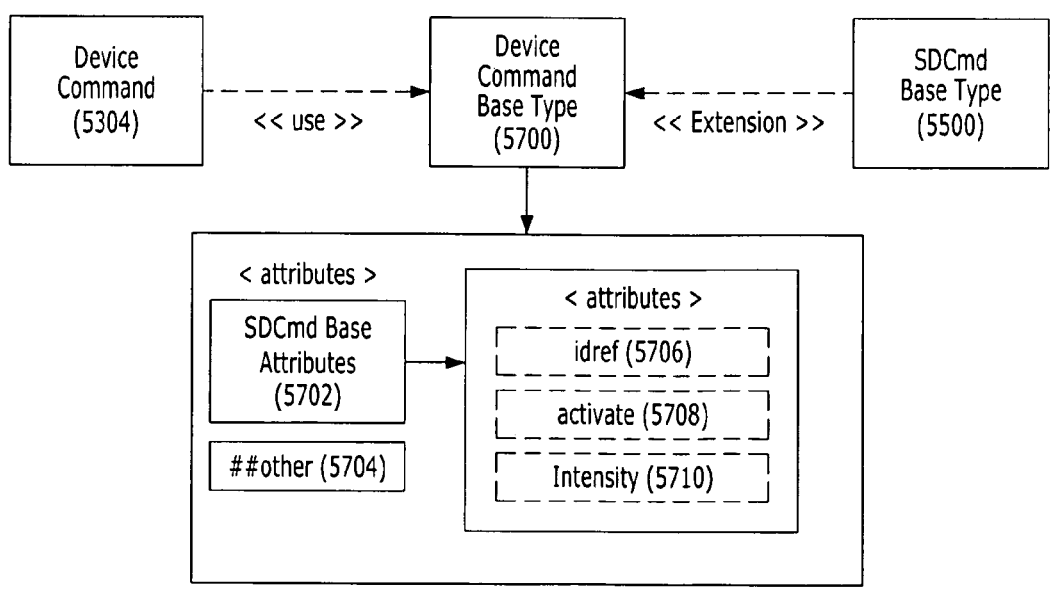
FIG. 57 is a block diagram illustrating elements of Device Command metadata 5304 for reproduction command information of the sensory reproduction apparatus in accordance with the embodiment of the present invention.

FIG. 57 is a block diagram illustrating elements of the Device Command metadata 5304 for reproduction command information of the sensory reproduction apparatus 113 in accordance with the embodiment of the present invention.

As illustrated in FIG. 57, the Device Command 5304 uses Device Command Base Type metadata 5700, and the Device Command Base Type metadata 5700 may be extended from the SDCmd Base Type metadata 5500.

The Device Command Base Type metadata 5700 includes SDCmd Base Attributes metadata 5702 for describing a group of attributes including attributes necessary for description of command information on the sensory reproduction apparatus and metadata (##other) 5704 for describing extendible attribute information.

The SDCmd Base Attributes metadata 5702 includes metadata (idref) 5706 for describing attribute information showing identifier (id) reference of the sensory reproduction apparatus 113, metadata (activate) 5708 for describing attribute information showing activation information of the sensory reproduction apparatus 113, and metadata (intensity) 5710 for describing attribute information showing sensory reproduction intensity information.

Figure 58:
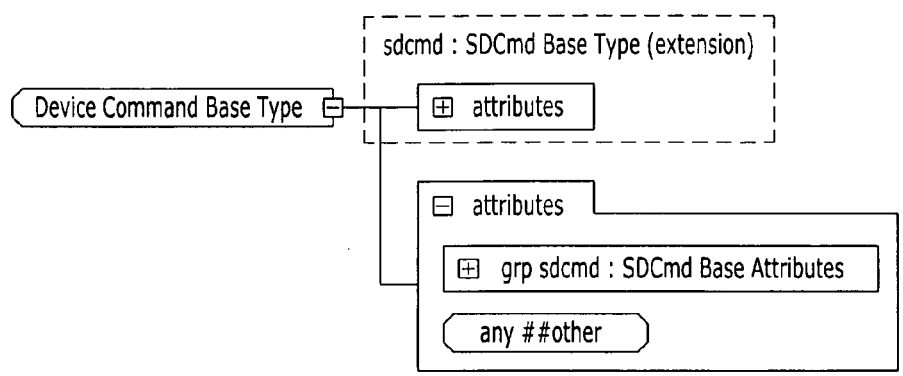
FIG. 58 is a block diagram illustrating a schema type of Device Command Base Type metadata 5700 in accordance with the embodiment of the present invention.

FIG. 58 is a block diagram illustrating a schema type of the Device Command Base Type metadata 5700 in accordance with the embodiment of the present invention. In FIG. 58, the Device Command Base Type metadata and elements of the Device Command Base Type metadata are shown in the form of a schema.

In Table 27, the description structure of the Device Command Base Type metadata 5700 is shown in the form of an XML schema.

TABLE 27

```
<complexType name="DeviceCommandBaseType" abstract="true">
    <complexContent>
        <extension base="sdcmd:SDCmdBaseType">
            <attributeGroup ref="sdcmd:SDCmdBaseAttributes"/>
            <anyAttribute namespace="##other" processContents="lax"/>
        </extension>
    </complexContent>
</complexType>
<attributeGroup name="SDCmdBaseAttributes">
    <attribute name="idref" type="IDREF" use="optional"/>
        <attribute name="activate" type="boolean" use="optional"/>
        <attribute name="intensity" type="integer" use="optional"/>
</attributeGroup>
```

Figure 59:
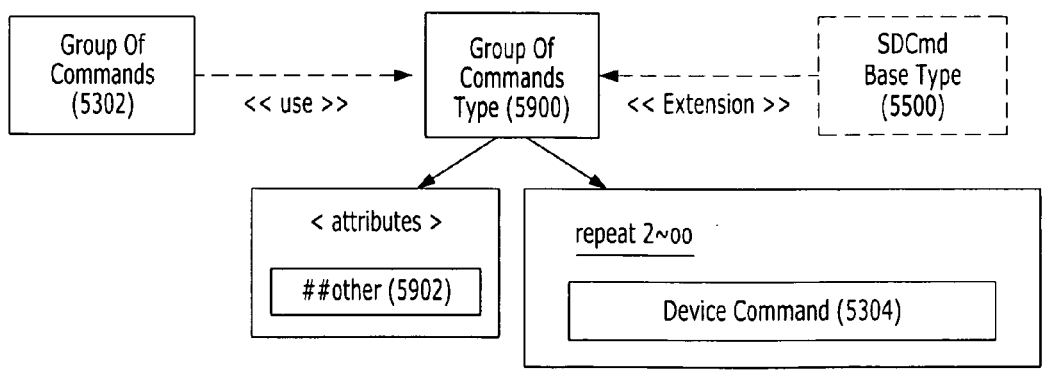
FIG. 59 is a block diagram illustrating elements of Group Of Commands metadata 5302 in accordance with the embodiment of the present invention.

FIG. 59 is a block diagram illustrating elements of the Group Of Commands metadata 5302 in accordance with the embodiment of the present invention.

As illustrated in FIG. 59, the Group Of Commands metadata 5302 uses Commands Type metadata 5900, and the Commands Type metadata 5900 may be extended from the SDCmd Base Type 5500.

The Group Of Commands metadata 5302 includes metadata (##other) 5902 for describing extendible attribute information. The Group Of Commands metadata 5302 includes at lest two or more metadata (Device Command) 5304 for describing one sensory reproduction command information.

Figure 60:
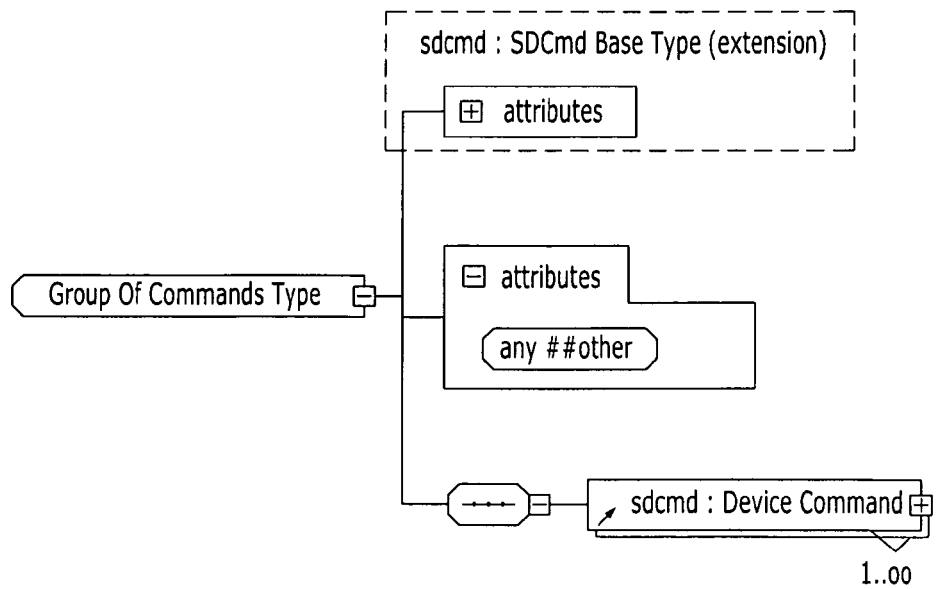
FIG. 60 is a block diagram illustrating a schema type of Group Of Commands Type metadata 5900 in accordance with the embodiment of the present invention.

FIG. 60 is a block diagram illustrating a schema type of the Group Of Commands Type metadata 5900 in accordance with the embodiment of the present invention. In FIG. 60, the Group Of Commands Type metadata and elements of the Group Of Commands Type metadata, described in FIG. 59, are shown in the form of a schema.

In Table 28, the description structure of the Group Of Commands Type metadata 5900 is shown in the form of an XML schema.

TABLE 28

```
<complexType name="GroupOfCommandsType">
    <complexContent>
        <extension base="sdcmd:SDCmdBaseType">
            <sequence>
                <element ref="sdcmd:DeviceCommand" minOccurs="2" maxOccurs="unbounded"/>
            </sequence>
            <anyAttribute namespace="##other" processContents="lax"/>
        </extension>
    </complexContent>
</complexType>
```

Figure 61:
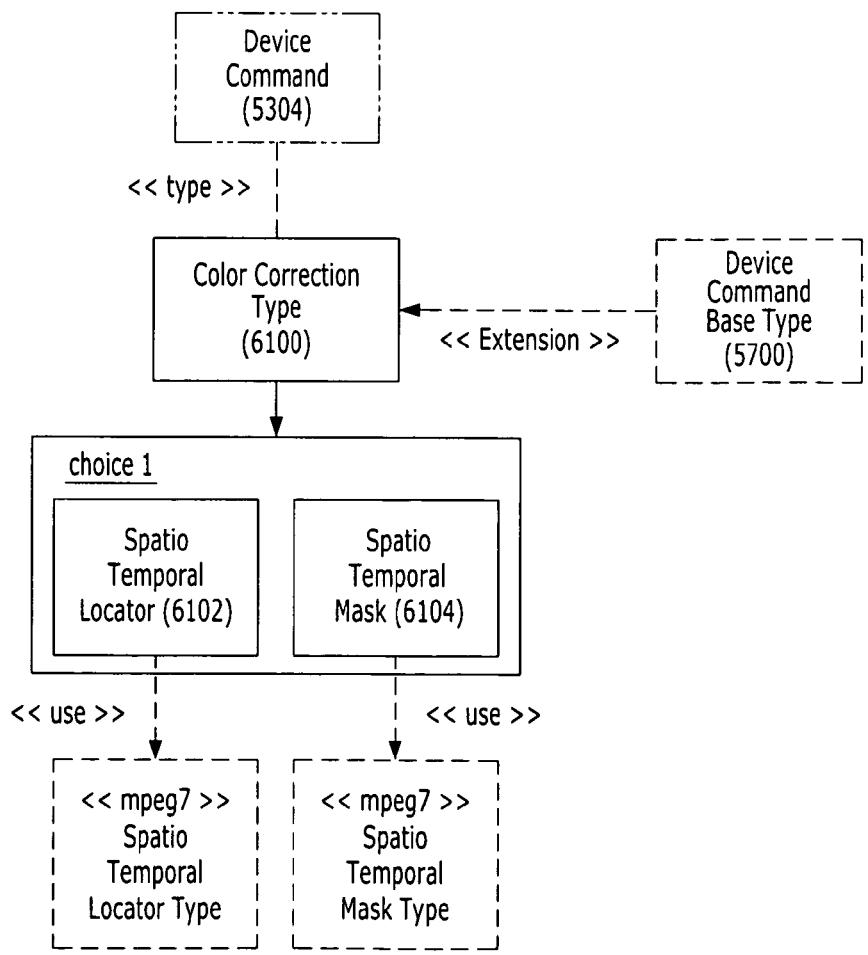
FIG. 61 is a block diagram illustrating Color Correction Device Command metadata 6100 for representing control information on the color correction effect in accordance with the embodiment of the present invention.

FIG. 61 is a block diagram illustrating Color Correction Device Command metadata 6100 for representing control information on the color correction effect in accordance with the embodiment of the present invention.

As illustrated in FIG. 61, the Color Correction Device Command metadata 6100 may be extended from the Device Command Base Type metadata 5700. The Color Correction Device Command metadata 6100 is used as one type of the Device Command metadata 5304.

The Color Correction Device Command metadata 6100 may include at least one of a Spatio Temporal Locator 6102 and a Spatio Temporal Mask 6104. That is, the Spatio Temporal Locator 3002 and the Spatio Temporal Mask 3004 are included in the Color Correction Type metadata 3000, and the Color Correction Device Command metadata 6100 according to the analyzed result of the SEM also includes the Spatio Temporal Locator 6102 and the Spatio Temporal Mask 6104.

The Spatio Temporal Locator 6102 and the Spatio Temporal Mask 6104 are elements used to trace and interpolate a range (or object) subjected to color correction depending on a color correction range and a change in position for the purpose of applying partial color correction. The Spatio Temporal Locator 6102 shows the position of a color correction object using a coordinate, and the Spatio Temporal Mask 6104 shows the position of the color correction object using a mask. The Spatio Temporal Locator Type of MPEG-7 MDS may be used as the Spatio Temporal Locator 6102, and the Spatio Temporal Mask Type of MPEG-7 may be used as the Spatio Temporal Mask 6104.

The sensory reproduction apparatus 113 may represent the color correction effect based on the Color Correction Device Command metadata 6100.

Figure 62:
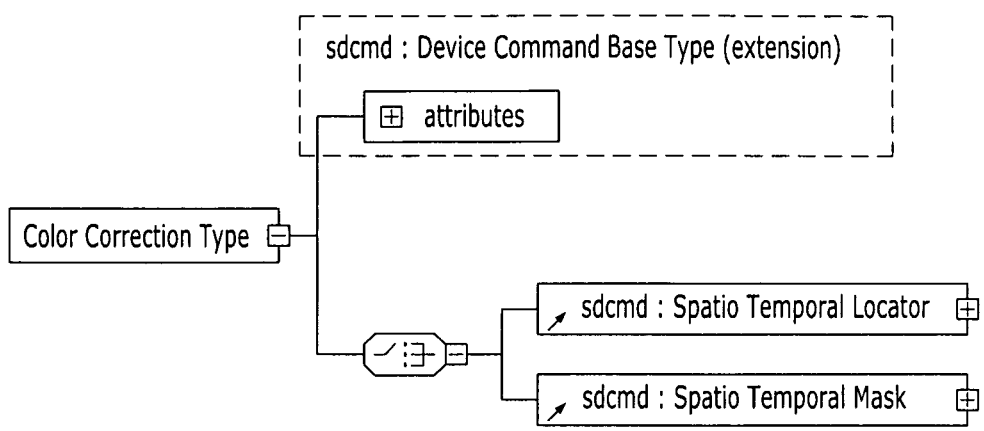
FIG. 62 is a block diagram illustrating a schema type of the Color Correction Device Command metadata 6100 in accordance with the embodiment of the present invention.

FIG. 62 is a block diagram illustrating a schema type of the Color Correction Device Command metadata 6100 in accordance with the embodiment of the present invention. In FIG. 62, the Color Correction Device Command metadata and elements of the Color Correction Device Command metadata are shown in the form of a schema.

In Table 29, the description structure of the Color Correction Device Command metadata 6100 is shown in the form of an XML schema.

TABLE 29

```
<complexType name="ColorCorrectionType">
    <complexContent>
        <extension base="sdcmd:DeviceCommandBaseType">
            <choice minOccurs="0">
                <element     name="SpatioTemporalLocator" type="mpeg7:SpatioTemporalLocatorType"/>
                <element     name="SpatioTemporalMask" type="mpeg7:SpatioTemporalMaskType"/>
            </choice>
        </extension>
    </complexContent>
</complexType>
```

Figure 63:
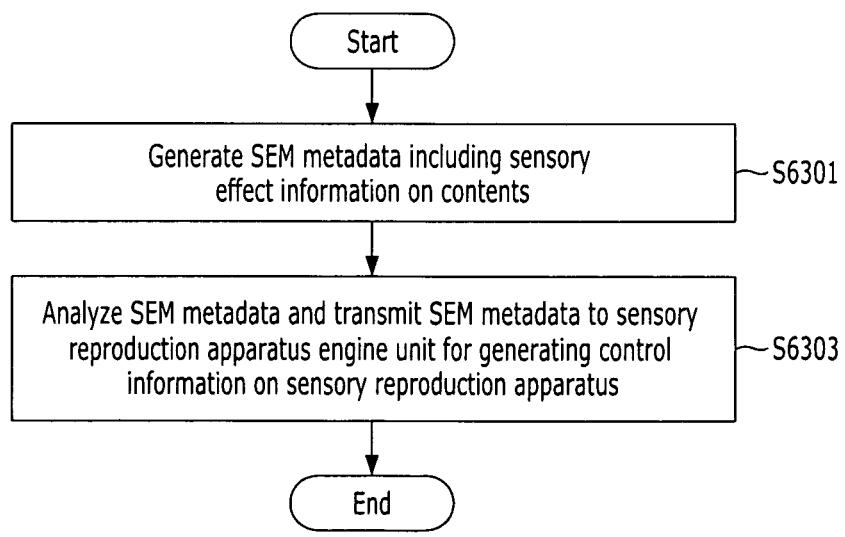
FIG. 63 is a flowchart illustrating a method for providing metadata for a sensory effect in accordance with an embodiment of the present invention.

FIG. 63 is a flowchart illustrating a method for providing metadata for a sensory effect in accordance with an embodiment of the present invention. In FIG. 63, the metadata providing method of the SEM generating unit 101 will be described as an embodiment.

As illustrated in FIG. 63, the method in accordance with the embodiment of the present invention starts from step S6301.

At the step S6301, the SEM generating unit 101 generates SEM including sensory effect information on contents.

At step S6302, the SEM generating unit 101 transmits the SEM to the sensory reproduction apparatus engine unit 109. The sensory reproduction apparatus engine unit 109 receives the SEM transmitted from the SEM generating unit 101 so as to analyze the SEM and generates control information on the sensory reproduction apparatus 113. The sensory effect information may include color correction effect information on the contents.

Specifically, the sensory effect information may include at least one of the Spatio Temporal Locator and the Spatio Temporal Mask as described in FIG. 30. The sensory effect information may further include color correction parameter information referred to color correction.

As described in FIG. 20, the color correction parameter includes at least one of the Tone Reproduction Curves 2002, the Conversion LUT 2004, the Color Temperature 2006, the Input Device Color Gamut 2008 and the Illuminance Of Surround 2010.

The SEM generated by the SEM generating unit 101 is analyzed by the sensory reproduction apparatus engine unit 109, and the analyzed result of the sensory reproduction apparatus engine unit 109 may be used in representation of the color correction effect. That is, the sensor reproduction apparatus 113 may represent the color correction effect intended by a contents provider using the color correction effect information included in the SEM. The sensory reproduction apparatus 113 may represent the color correction effect with reference to the Color Correction Parameter. The sensory reproduction apparatus 113 may represent colors of original pictures for the contents with reference to the Color Correction Parameter.

Figure 64:
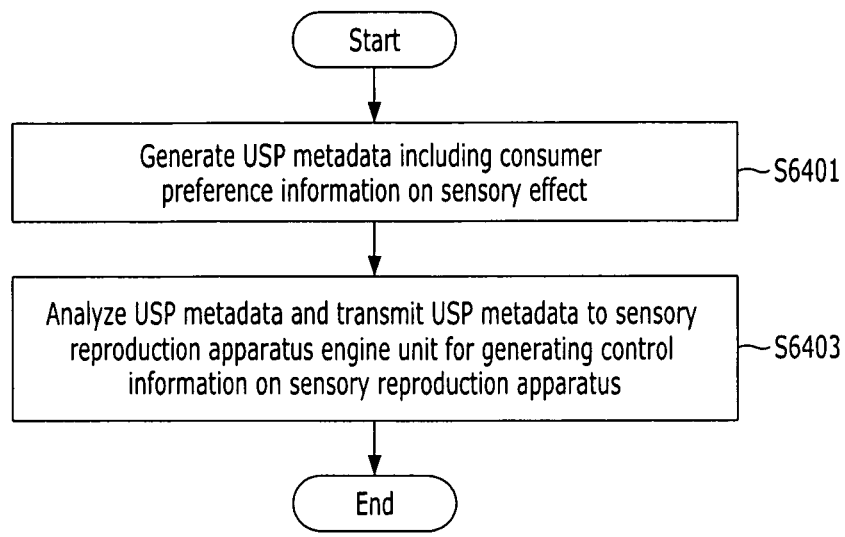
FIG. 64 is a flowchart illustrating a method for providing metadata for a sensory effect in accordance with another embodiment of the present invention.

FIG. 64 is a flowchart illustrating a method for providing metadata for a sensory effect in accordance with another embodiment of the present invention. In FIG. 64, the metadata providing method of the USP metadata generating unit 103 will be described as an embodiment.

As illustrated in FIG. 64, the method in accordance with the embodiment of the present invention starts from step S6401.

At the step S6401, the USP metadata generating unit 103 generates USP metadata including consumer preference information on a sensory effect.

At step S6403, the USP metadata generating unit 103 transmits the USP metadata to the sensory reproduction apparatus engine unit 109. The sensory reproduction apparatus engine unit 109 receives the USP metadata transmitted from the USP metadata generating unit 103 so as to analyze the USP metadata and generate control information on the sensory reproduction apparatus 113.

The consumer preference information on the sensory effect may include preference information on the color correction effect as described in FIG. 41. The preference information on the color correction effect shows the presence of consumer preference for the color correction effect in the reproduction of the contents in the sensory reproduction apparatus 113.

Figure 65:
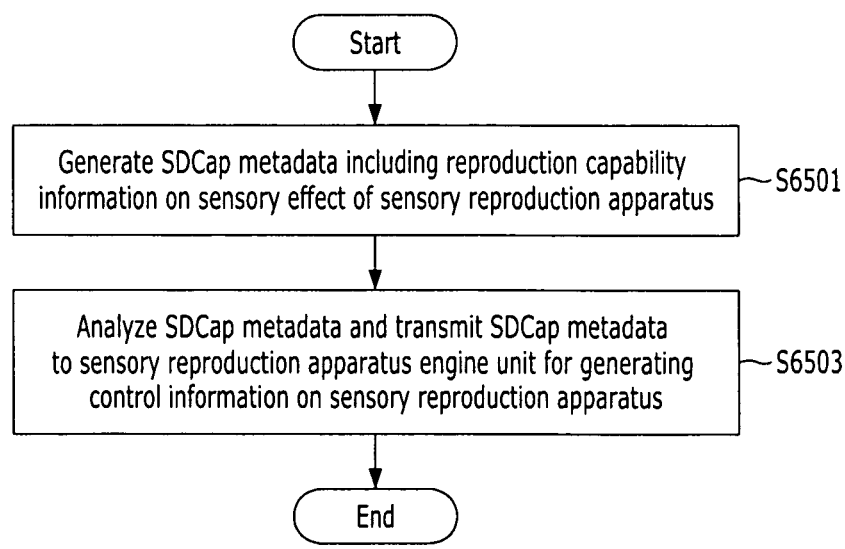
FIG. 65 is a flowchart illustrating a method for providing metadata for a sensory effect in accordance with another embodiment of the present invention.

FIG. 65 is a flowchart illustrating a method for providing metadata for a sensory effect in accordance with another embodiment of the present invention. In FIG. 65, the metadata providing method, of the SDCap metadata generating unit 107 will be described as an embodiment.

As illustrated in FIG. 65, the method in accordance with the embodiment of the present invention starts from step S6501.

At the step S6501, the SDCap metadata generating unit 107 generates SDCap metadata including reproduction capability information on a sensory effect in the sensory reproduction apparatus 113.

At step S6503, the SDCap metadata generating unit 107 transmits the SDCap metadata to the sensory reproduction apparatus engine unit 109. The sensory reproduction apparatus engine unit 109 receives the SDCap metadata transmitted from the SDCap metadata generating unit 107 so as to analyze the SDCap metadata and generate control information on the sensory reproduction apparatus.

The reproduction capability information may include reproduction capability information on the color correction effect for the contents as described in FIG. 50. The reproduction capability information on the color correction effect for the contents shows reproduction capability for the color correction effect of the sensory reproduction apparatus 113.

Figure 66:
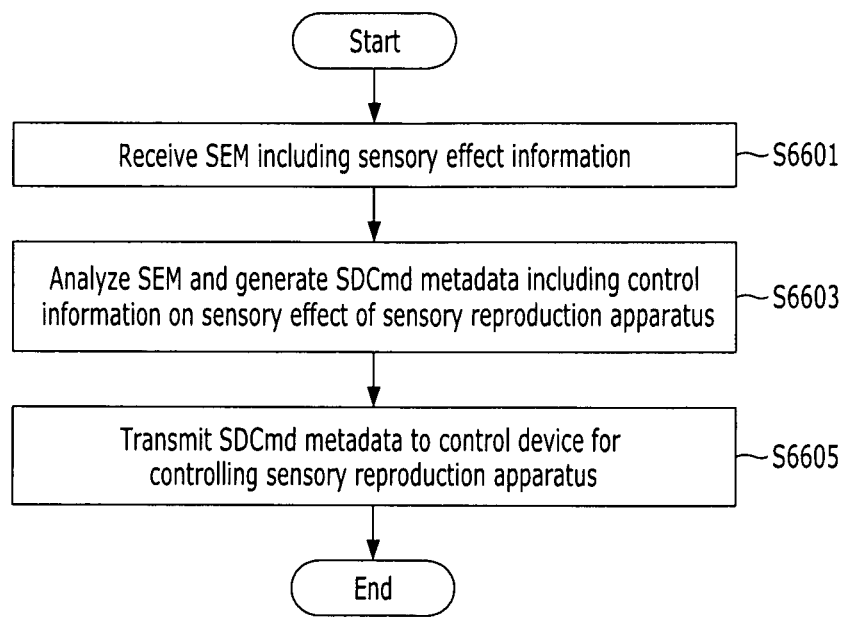
FIG. 66 is a flowchart illustrating a method for providing metadata for a sensory effect in accordance with another embodiment of the present invention.
Figure 67:
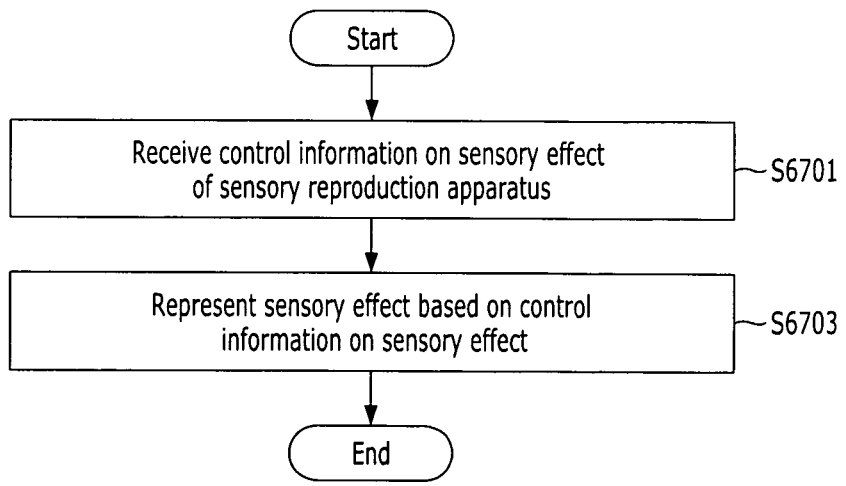
FIG. 67 is a flowchart illustrating a method for representing a sensory effect in accordance with an embodiment of the present invention.
Figure 68:
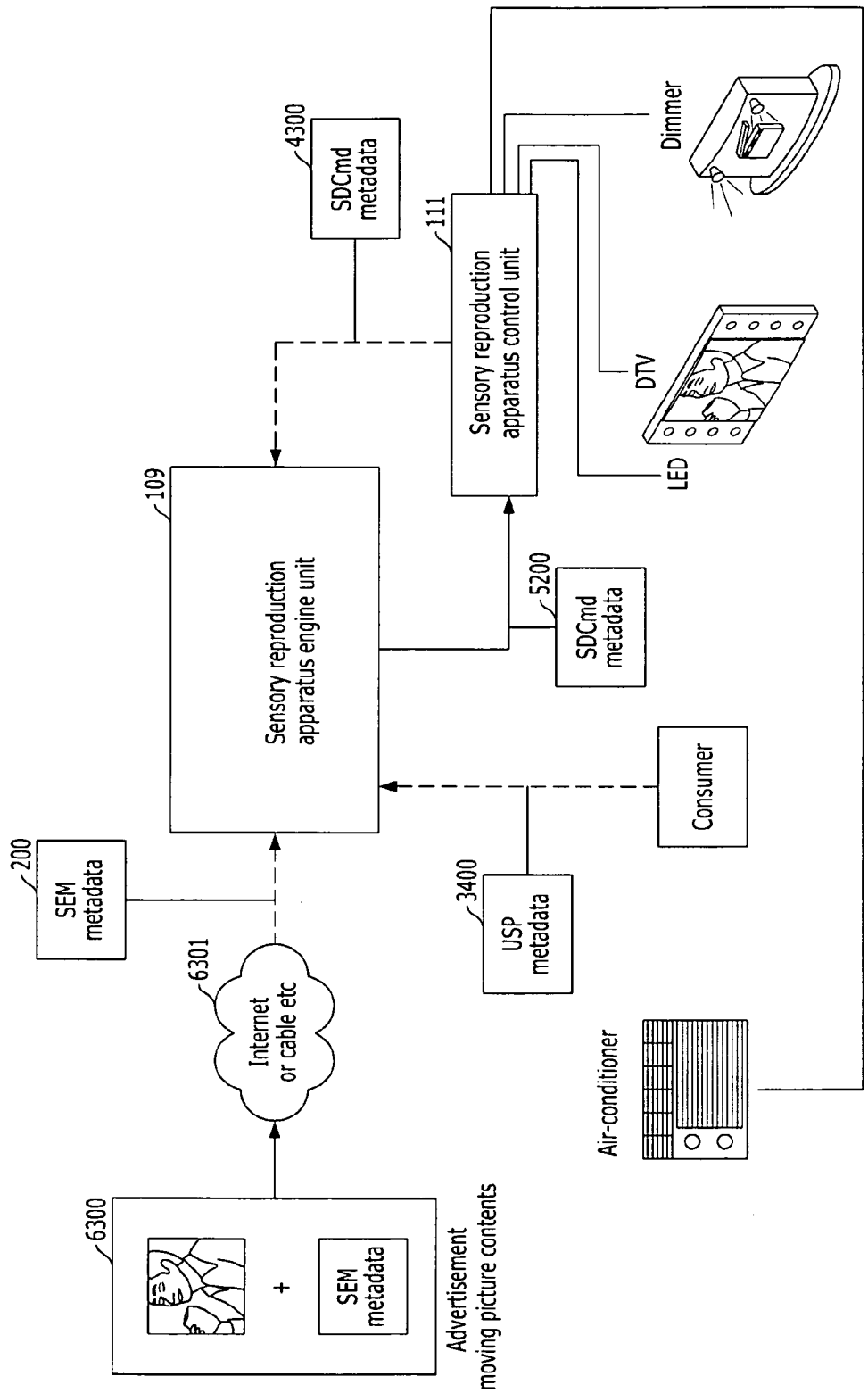
FIG. 68 is a diagram illustrating a specific multimedia system in accordance with an embodiment of the present invention.

FIG. 66 is a flowchart illustrating a method for providing metadata for a sensory effect in accordance with another embodiment of the present invention. In FIG. 66, the metadata providing method of the sensory reproduction apparatus engine unit 109 will be described as an embodiment.

As illustrated in FIG. 66, the method in accordance with the embodiment of the present invention starts from step S6601.

At the step S6601, the sensory reproduction apparatus engine unit 109 receives SEM including sensory effect information. The sensory reproduction apparatus engine unit 109 may receive the SEM inputted from the SEM generating unit 101.

At step S6603, the sensory reproduction apparatus engine unit 109 transmits SDCmd metadata to a control device for controlling the sensory reproduction apparatus 113. The control device for controlling the sensory reproduction apparatus 113 may be a control device included in the sensory reproduction apparatus control unit 111 or the sensory reproduction apparatus 113.

Meanwhile, the method in accordance with the embodiment of the present invention may further include receiving USP metadata including consumer preference information on the color correction effect or receiving SDCap metadata including reproduction capability information on the color correction effect of the sensory reproduction apparatus 113. The sensory reproduction apparatus engine unit 109 may generate and transmit SDCmd metadata by additionally analyzing the USP metadata or SDCap metadata.

The sensory effect may be a color correction effect for contents. Thus, the SEM may include color correction effect information on the contents, and the USP metadata may include consumer preference information on the color correction effect. The SDCap metadata may include reproduction capability information on the color correction effect of the sensory reproduction apparatus 113.

The sensory reproduction apparatus 113 that receives the SDCmd metadata including the color correction effect information on the contents may represent the color correction effect based on the SDCmd metadata. That is, the sensory reproduction apparatus engine unit 109 analyzes the color correction effect information including color correction parameters and generates the SDCmd metadata so that the sensory reproduction apparatus 113 can represent the color correction effect according to the color correction parameters. The sensory reproduction apparatus 113 may represent the color correction effect according to the color correction parameters, or may represent the color correction effect according to the Spatio Temporal Locator and the Spatio Temporal Mask for a color correction range.

FIG. 67 is a flowchart illustrating a method for representing a sensory effect in accordance with an embodiment of the present invention. In FIG. 67, the sensory effect representing method of the sensory reproduction apparatus 113 will be described as an embodiment.

As illustrated in FIG. 67, the method in accordance with the embodiment of the present invention starts from step S6701.

At the step S6701, the sensory reproduction apparatus 113 receives control information on a sensory effect of the sensory reproduction apparatus 113. The control information on the sensory effect may be inputted from the sensory reproduction apparatus control unit 111 that receives SDCmd metadata, or may be inputted in the form of SDCmd metadata from the sensory reproduction apparatus engine unit 109.

At step 6703, the sensory reproduction apparatus 113 represents a sensory effect based on the control information on the sensory effect. The control information on the sensory effect may be control information on the contents color correction effect.

According to the embodiment of the present invention, metadata for various sensory effects may be generated depending on the metadata description structure described above, and the various sensory effects may be represented in the sensory reproduction apparatus. For example, the sensory reproduction apparatus for representing sensory effects has base device command type metadata, and the base type metadata may be extended to metadata for the type of each sensory reproduction apparatus. Various metadata may be included as elements of reproduction apparatus type metadata or sensory effect information of the sensory reproduction apparatus and parameter information related to the sensory effect in the extended metadata. Here, the various metadata includes original color restoration setting information on contents, illuminance reproduction setting information, vibration setting information, temperature reproduction setting information, reproduction intensity setting information of each sensory reproduction apparatus, and the like.

FIG. 68 is a diagram illustrating a specific multimedia system in accordance with an embodiment of the present invention. In FIG. 68, a sensory effect representing method according to provision of advertisement moving picture contents.

As illustrated in FIG. 68, advertisement moving picture contents 6300 include advertisement contents produced by an advertisement producer and SEM. In order to maximize the effect of a completed advertisement, information on a primary color representation (color correction) effect, a main illumination and peripheral illumination (LED) effect, a wind effect and a temperature effect are included in the SEM.

In Tables 30 to 34, the SEM produced by the advertisement producer is shown in an XML instance form. Specifically, Tables 30 to 34 show SEM metadata for describing parameters for original color correction intended by the advertisement producer, correction information (range and changed position) on a color correction object, an illumination effect, a temperature effect, a wind effect, and the like. Tables 30 to 34 are shown in the consecutive XML instance form.

TABLE 30

```
<?xml version="1.0" encoding="UTF-8"?>
<SEM
 xmlns:xsi=http://www.w3.org/2001/XMLSchema-instance
 xmlns="urn:mpeg:mpeg-v:2010:01-SEDL-NS"
 xmlns:sev="urn:mpeg:mpeg-v:2010:01-SEV-NS"
 xmlns:mpeg7="urn:mpeg:mpeg7:schema:2004"
 xmlns:si="urn:mpeg:mpeg21:2003:01-DIA-XSI-NS"
 xsi:schemaLocation="urn:mpeg:mpeg-v:2010:01-SEV-NS
 MPEG-V-SEV.xsd
 urn:mpeg:mpeg21:2003:01-DIA-XSI-NS
          http://standards.iso.org/ittf/PubliclyAvailableStandards/MPEG-
21_schema_files/dia-2nd/XSI-2nd.xsd
 urn:mpeg:mpeg21:2003:01-DIA-NS
          http://standards.iso.org/ittf/PubliclyAvailableStandards/MPEG-
21_schema_files/dia-2nd/UED-2nd.xsd
 urn:mpeg:mpeg7:schema:2004
          http://standards.iso.org/ittf/PubliclyAvailableStandards/MPEG-
7_schema_files/mpeg7-v2.xsd"
 si:absTimeScheme="mp7t"          si:puMode="ancestorsDescendants"
si:timeScale="90000">
```

TABLE 31

```
<Declarations>
    <Parameter xsi:type="ColorCorrectionParameterType">
      <ToneReproductionCurves>
        <DAC_Value>0</DAC_Value>
        <RGB_Value>0.0000 0.0000 0.0000</RGB_Value>
        <DAC_Value>16</DAC_Value>
```

TABLE 31-continued

```
            <RGB_Value>0.0093 0.0087 0.0076</RGB_Value>
            <DAC_Value>32</DAC_Value>
            <RGB_Value>0.0304 0.0312 0.0274</RGB_Value>
            <DAC_Value>48</DAC_Value>
            <RGB_Value>0.0595 0.0633 0.0557</RGB_Value>
            <DAC_Value>64</DAC_Value>
            <RGB_Value>0.0947 0.1026 0.0957</RGB_Value>
            <DAC_Value>80</DAC_Value>
            <RGB_Value>0.1391 0.1486 0.1388</RGB_Value>
            <DAC_Value>96</DAC_Value>
            <RGB_Value>0.1864 0.1974 0.1863</RGB_Value>
            <DAC_Value>112</DAC_Value>
            <RGB_Value>0.2400 0.2555 0.2426</RGB_Value>
            <DAC_Value>125</DAC_Value>
            <RGB_Value>0.2907 0.3082 0.2960</RGB_Value>
            <DAC_Value>144</DAC_Value>
            <RGB_Value>0.3759 0.3951 0.3841</RGB_Value>
            <DAC_Value>160</DAC_Value>
            <RGB_Value>0.4582 0.4778 0.4673</RGB_Value>
            <DAC_Value>176</DAC_Value>
            <RGB_Value>0.5491 0.5666 0.5576</RGB_Value>
            <DAC_Value>192</DAC_Value>
            <RGB_Value>0.6510 0.6653 0.6528</RGB_Value>
            <DAC_Value>208</DAC_Value>
            <RGB_Value>0.7503 0.7644 0.7635</RGB_Value>
            <DAC_Value>224</DAC_Value>
            <RGB_Value>0.8483 0.8644 0.8654</RGB_Value>
            <DAC_Value>240</DAC_Value>
            <RGB_Value>0.9445 0.9546 0.9438</RGB_Value>
            <DAC_Value>255</DAC_Value>
            <RGB_Value>1.0000 1.0000 1.0000</RGB_Value>
```

TABLE 32

```
      </ToneReproductionCurves>
      <ConversionLUT>
         <RGB_XYZ_LUT mpeg7:dim="3 3">
            86.6000 67.6000 38.0000
            46.0000 137.0000 16.5000
            2.3650 19.4100 203.9000
         </RGB_XYZ_LUT>
         <RGBScalar_Max>0.9910 0.9860 0.9820</RGBScalar_Max>
         <Offset_Value>0.2150 0.2050 0.4250</Offset_Value>
         <Gain_Offset_Gamma mpeg7:dim="3 3">
            1.0228 −0.0228 1.6222
            1.0242 −0.0242 1.5624
            1.0220 −0.0220 1.6180
         </Gain_Offset_Gamma>
         <InverseLUT mpeg7:dim="3 3">
            0.0155 −0.0073 −0.0023
            −0.0052 0.0099 0.0002
            0.0003 −0.0009 0.0049
         </InverseLUT>
      </ConversionLUT>
      <ColorTemperature>
         <Daylight>D65</Daylight>
         <xy_Value x="0.3127" y="0.3290"/>
         <Y_Value>100</Y_Value>
      </ColorTemperature>
      <InputDeviceColorGamut>
         <IDCG_Type>NTSC</IDCG_Type>
         <IDCG_Value mpeg7:dim="2 3">
            0.6700 0.3300
            0.2100 0.7100
            0.1400 0.0800
         </IDCG_Value>
      </InputDeviceColorGamut>
      <IlluminanceOfSurround>180</IlluminanceOfSurround>
   </Parameter>
</Declarations>
```

TABLE 33

```
<Effect xsi:type="sev:ColorCorrectionType" activate="true" duration="28" si:pts="0">
   <sev:SpatioTemporalLocator>
      <mpeg7:FigureTrajectory type="rectangle">
         <mpeg7:MediaTime>
            <mpeg7:MediaTimePoint>T00:00:00</mpeg7:MediaTimePoint>
            <mpeg7:MediaDuration>PT28S</mpeg7:MediaDuration>
         </mpeg7:MediaTime>
         <!-- Vertex 1 -->
         <mpeg7:Vertex>
            <mpeg7:KeyTimePoint>
               <mpeg7:MediaTimePoint>T00:00:00
               </mpeg7:MediaTimePoint>
               <mpeg7:MediaTimePoint>T00:00:28
               </mpeg7:MediaTimePoint>
            </mpeg7:KeyTimePoint>
            <!-- x coordinate -->
            <mpeg7:InterpolationFunctions>
               <mpeg7:KeyValue type="startPoint">18.6
               </mpeg7:KeyValue>
               <mpeg7:KeyValue type="secondOrder" param="1.1">55.5</mpeg7:KeyValue>
            </mpeg7:InterpolationFunctions>
            <!-- y coordinate -->
            <mpeg7:InterpolationFunctions>
               <mpeg7:KeyValue>15.7</mpeg7:KeyValue>
               <mpeg7:KeyValue>34.4</mpeg7:KeyValue>
            </mpeg7:InterpolationFunctions>
         </mpeg7:Vertex>
         <!-- Vertex 2 -->
         <mpeg7:Vertex>
            <mpeg7:KeyTimePoint>
               <mpeg7:MediaTimePoint>T00:00:00
               </mpeg7:MediaTimePoint>
               <mpeg7:MediaTimePoint>T00:00:28
               </mpeg7:MediaTimePoint>
            </mpeg7:KeyTimePoint>
            <!-- x coordinate -->
            <mpeg7:InterpolationFunctions>
               <mpeg7:KeyValue type="startPoint">22.3
               </mpeg7:KeyValue>
               <mpeg7:KeyValue type="secondOrder" param="1.5">33.5</mpeg7:KeyValue>
            </mpeg7:InterpolationFunctions>
            <!-- y coordinate -->
            <mpeg7:InterpolationFunctions>
               <mpeg7:KeyValue>11.2</mpeg7:KeyValue>
               <mpeg7:KeyValue>24.3</mpeg7:KeyValue>
            </mpeg7:InterpolationFunctions>
         </mpeg7:Vertex>
```

TABLE 34

```
         <!-- Vertex 3 -->
         <mpeg7:Vertex>
            <mpeg7:KeyTimePoint>
               <mpeg7:MediaTimePoint>T00:00:00</
               mpeg7:MediaTimePoint>
               <mpeg7:MediaTimePoint>T00:00:28</
               mpeg7:MediaTimePoint>
            </mpeg7:KeyTimePoint>
            <!-- x coordinate -->
            <mpeg7:InterpolationFunctions>
               <mpeg7:KeyValue type="startPoint">44.7</
               mpeg7:KeyValue>
               <mpeg7:KeyValue type="secondOrder" param="1.3">99.2</mpeg7:KeyValue>
            </mpeg7:InterpolationFunctions>
            <!-- y coordinate -->
            <mpeg7:InterpolationFunctions>
               <mpeg7:KeyValue>53.7</mpeg7:KeyValue>
               <mpeg7:KeyValue>121.3</mpeg7:KeyValue>
            </mpeg7:InterpolationFunctions>
         </mpeg7:Vertex>
      </mpeg7:FigureTrajectory>
   </sev:SpatioTemporalLocator>
</Effect>
```

TABLE 34-continued

```
    <Effect xsi:type="sev:TemperatureType" activate="true"
fade-in="5" fade-out="5"
    intensity="10" duration="28" si:pts="0"/>
        <Effect xsi:type="sev:LightType" activate="true"
intensity="10" color="Yellow"
    duration="28" si:pts="0"/>
        <Effect xsi:type="sev:WindType" activate="true" fade-in="3"
            intensity="50"
duration="8"
    position="urn:mpeg:mpeg-v:01-SI-PositionCS-NS:left:middle:middle"
si:pts="0"/>
        <Effect xsi:type="sev:WindType" fade-in="2" intensity="80"
            duration="7"
    position="urn:mpeg:mpeg-v:01-SI-PositionCS-NS:left:middle:middle"
si:pts="720000"/>
        <Effect xsi:type="sev:WindType" fade-out="3" intensity="50"
            duration="10"
    position="urn:mpeg:mpeg-v:01-SI-PositionCS-NS:left:middle:middle"
si:pts="1350000"/>
        <Effect xsi:type="sev:WindType" activate="false" fade-out="3"
    position="urn:mpeg:mpeg-v:01-SI-PositionCS-NS:left:middle:middle"
si:pts="2250000"/>
</SEM>
```

The advertisement contents and the advertisement moving picture contents 6300 may be generated in the form of a multimedia application format (MAF). The generated advertisement moving picture contents 6300, i.e., media are transmitted to the sensory reproduction apparatus engine unit 109, and a consumer of the advertisement moving picture contents 6300 can see that there exists a sensory effect for the advertisement contents.

Thus, the consumer selects whether or not to apply the sensory effect for the transmitted advertisement moving picture contents 6300. That is, the consumer may select the presence of preference for the sensory effect using a graphic user interface (GUI) of the sensory reproduction apparatus 113. Accordingly, the generated USP metadata is transmitted to the sensory production apparatus engine unit 109.

In Table 35, the USP metadata showing preference of the sensory effect for the advertisement moving picture contents 6300 is represented in an XML instance form. That is, Table 35 shows the USP metadata for describing sensory effect reference information of the consumer. Here, the USP metadata use all the original picture color correction effect, the main illumination effect, the peripheral illumination effect, the temperature effect and the wind effect, and describe a degree of the reproduction effect of illumination, temperature and wind control.

TABLE 35

```
<?xml version="1.0" encoding="UTF-8"?>
<USP
  xmlns:xsi=http://www.w3.org/2001/XMLSchema-instance
  xmlns="urn:mpeg:mpeg-v:2010:01-USP-NS"
  xmlns:mpeg7="urn:mpeg:mpeg7:schema:2004"
  xsi:schemaLocation="urn:mpeg:mpeg-v:2010:01-USP-NS
  MPEG-V-USP.xsd
  urn:mpeg:mpeg7:schema:2004
http://standards.iso.org/ittf/PubliclyAvailableStandards/MPEG-
7_schema_files/mpeg7-v2.xsd">
    <User>
      <mpeg7:Name>
        <mpeg7:GivenName>Yong Soo</mpeg7:GivenName>
        <mpeg7:FamilyName>Joo</mpeg7:FamilyName>
      </mpeg7:Name>
    </User>
    <Preference xsi:type="ColorCorrectionType" activate="true"/>
    <Preference xsi:type="LightType" activate="true"
    maxIntensity="100"/>
```

TABLE 35-continued

```
    <Preference xsi:type="WindType" activate="true"
    maxIntensity="100"/>
        <Preference xsi:type="TemperatureType" activate="true"
maxIntensity="100"/>
</USP>
```

The sensory reproduction apparatus engine unit 109 receives the SEM 200 for reproducing the sensory effect of the advertisement moving picture contents 6300, the SDCap metadata 4300 of a peripheral device (a main illumination and peripheral illumination (LED), an air conditioner or the like) connected to the sensory reproduction apparatus control unit 111, and the USP metadata 3400 that are sensory effect reproduction preference information of the consumer so as to generate the SDCmd metadata 5200.

In Table 36, the SDCap metadata 4300 generated from the sensory reproduction apparatus control unit 111 is shown in an XML instance form. Table 36 describes the reproduction capability range of a main illumination device (dimmer), a peripheral illumination device (LED), and a temperature and wind control device (air-conditioner).

TABLE 36

```
<?xml version="1.0" encoding="UTF-8"?>
<SDCap
  xmlns:xsi=http://www.w3.org/2001/XMLSchema-instance
  xmlns="urn:mpeg:mpeg-v:2010:01-SDCap-NS"
  xmlns:mpeg7="urn:mpeg:mpeg7:schema:2004"
  xsi:schemaLocation="urn:mpeg:mpeg-v:2010:01-SDCap-NS
  MPEG-V-SDCap.xsd
  urn:mpeg:mpeg7:schema:2004
http://standards.iso.org/ittf/PubliclyAvailableStandards/MPEG-
7_schema_files/mpeg7-v2.xsd">
    <DeviceCapability xsi:type="ColorCorrectionType" id="CC-1"/>
    <DeviceCapability xsi:type="LightType" id="LIGHT-1"
  position="urn:mpeg:mpeg-v:01-SI-PositionCS-NS:center:top:front"/>
    <DeviceCapability xsi:type="LightType" id="LED-1"
  position="urn:mpeg:mpeg-v:01-SI-PositionCS-
  NS:center:middle:front"/>
    <DeviceCapability xsi:type="WindType" id="FAN-1"
  position="urn:mpeg:mpeg-v:01-SI-PositionCS-NS:left:middle:middle"
maxIntensity="3"/>
    <DeviceCapability xsi:type="TemperatureType" id="AIRCON-1"
  position="urn:mpeg:mpeg-v:01-SI-PositionCS-NS:rightmiddle:middle"
maxIntensity="30"/>
</SDCap>
```

While the advertisement contents are reproduced, the sensory reproduction apparatus engine unit 109 analyzes the SEM 200 and the SDCap metadata 4300 and decides a currently available sensory reproduction apparatus in the sensory effect intended by the contents provider. Then, the sensory reproduction apparatus engine unit 109 finally analyzes consumer preference information based on the USP metadata of the consumer and transmits the generated SDCmd metadata 5200 to the sensory reproduction apparatus control unit 111.

In Tables 37 to 39, the SDCmd metadata 5200 generated from the sensory reproduction apparatus engine unit 109 is shown in an XML instance form. Tables 37 to 39 show the SDCmd metadata 5200 including control information on a sensory effect, controlled based on the USP metadata 3400 of the consumer, and describe control information on the original color correction effect, the main illumination and peripheral illumination (LED) effect, and the temperature and wind control effect. Tables 37 to 39 are shown in a consecutive XML instance form.

TABLE 37

```
<?xml version="1.0" encoding="UTF-8"?>
<SDCmd
  xmlns:xsi=http://www.w3.org/2001/XMLSchema-instance
  xmlns="urn:mpeg:mpegS:2010:01-SDCmd-NS"
  xmlns:mpeg7="urn:mpeg:mpeg7:schema:2004"
  xmlns:si="urn:mpeg:mpeg21:2003:01-DIA-XSI-NS"
  xsi:schemaLocation="urn:mpeg:mpegS:2010:01-SDCmd-NS
  MPEG-V-SDCmd.xsd
  urn:mpeg:mpeg21:2003:01-DIA-XSI-NS
  http://standards.iso.org/ittf/PubliclyAvailableStandards/MPEG-
  21_schema_files/dia-2nd/XSI-2nd.xsd
  urn:mpeg:mpeg7:schema:2004
  http://standards.iso.org/ittf/PubliclyAvailableStandards/MPEG-
  7_schema_files/mpeg7-v2.xsd"
  si:absTimeScheme="mp7t"        si:puMode="ancestorsDescendants"
  si:timeScale="90000">
    <!-- 0초 -->
    <GroupOfCommands si:pts="0">
      <DeviceCommand    xsi:type="ColorCorrectionType"   id="CC-1"
activate="true">
        <sev:SpatioTemporalLocator>
          <mpeg7:FigureTrajectory type="rectangle">
            <mpeg7:MediaTime>
              <mpeg7:MediaTimePoint>T00:00:00</mpeg7:
              MediaTimePoint>
              <mpeg7:MediaDuration>PT28S</mpeg7:MediaDuration>
            </mpeg7:MediaTime>
            <!-- Vertex 1 -->
            <mpeg7:Vertex>
              <mpeg7:KeyTimePoint>
                <mpeg7:MediaTimePoint>T00:00:00</mpeg7:
                MediaTimePoint>
                <mpeg7:MediaTimePoint>T00:00:28</mpeg7:
                MediaTimePoint>
              </mpeg7:KeyTimePoint>
              <!-- x coordinate -->
              <mpeg7:InterpolationFunctions>
                <mpeg7:KeyValue type="startPoint">18.6</mpeg7:
                KeyValue>
                <mpeg7:KeyValue           type="secondOrder"
param="1.1">55.5</mpeg7:KeyValue>
              </mpeg7:InterpolationFunctions>
              <!-- y coordinate -->
              <mpeg7:InterpolationFunctions>
                <mpeg7:KeyValue>15.7</mpeg7:KeyValue>
                <mpeg7:KeyValue>34.4</mpeg7:KeyValue>
              </mpeg7:InterpolationFunctions>
            </mpeg7:Vertex>
```

TABLE 38

```
            <!-- Vertex 2 -->
            <mpeg7:Vertex>
              <mpeg7:KeyTimePoint>
                <mpeg7:MediaTimePoint>T00:00:00</mpeg7:
                MediaTimePoint>
                <mpeg7:MediaTimePoint>T00:00:28</mpeg7:
                MediaTimePoint>
              </mpeg7:KeyTimePoint>
              <!-- x coordinate -->
              <mpeg7:InterpolationFunctions>
                <mpeg7:KeyValue type="startPoint">22.3</mpeg7:
                KeyValue>
                <mpeg7:KeyValue           type="secondOrder"
param="1.5">33.5</mpeg7:KeyValue>
              </mpeg7:InterpolationFunctions>
              <!-- y coordinate -->
              <mpeg7:InterpolationFunctions>
                <mpeg7:KeyValue>11.2</mpeg7:KeyValue>
                <mpeg7:KeyValue>24.3</mpeg7:KeyValue>
              </mpeg7:InterpolationFunctions>
            </mpeg7:Vertex>
            <!-- Vertex 3 -->
            <mpeg7:Vertex>
              <mpeg7:KeyTimePoint>
                <mpeg7:MediaTimePoint>T00:00:00</mpeg7:
                MediaTimePoint>
                <mpeg7:MediaTimePoint>T00:00:28</mpeg7:
                MediaTimePoint>
              </mpeg7:KeyTimePoint>
              <!-- x coordinate -->
              <mpeg7:InterpolationFunctions>
                <mpeg7:KeyValue type="startPoint">44.7</mpeg7:
                KeyValue>
                <mpeg7:KeyValue           type="secondOrder"
param="1.3">99.2</mpeg7:KeyValue>
              </mpeg7:InterpolationFunctions>
              <!-- y coordinate -->
              <mpeg7:InterpolationFunctions>
                <mpeg7:KeyValue>53.7</mpeg7:KeyValue>
                <mpeg7:KeyValue>121.3</mpeg7:KeyValue>
              </mpeg7:InterpolationFunctions>
            </mpeg7:Vertex>
          </mpeg7:FigureTrajectory>
        </sev:SpatioTemporalLocator>
```

TABLE 39

```
      </DeviceCommand>
      <DeviceCommand   xsi:type="LightType"   id="LIGHT-1"   activate="true"
intensity="50"
        color="white"/>
      <DeviceCommand   xsi:type="LightType"   id="LED-1"   activate="true"
intensity="10"
        color="blue"/>
      <DeviceCommand       xsi:type="TemperatureType"       id="AIRCON-1"
activate="true"
        intensity="10"/>
      <DeviceCommand   xsi:type="WindType"   id="FAN-1"   activate="true"
intensity="1"/>
    </GroupOfCommands>
    <!-- 2초 -->
    <DeviceCommand    xsi:type="WindType"    idref="FAN-1"    intensity="2"
si:pts="180000"/>
    <!-- 9초 -->
    <DeviceCommand    xsi:type="WindType"    idref="FAN-1"    intensity="3"
si:pts="810000"/>
    <!-- 16초 -->
    <DeviceCommand    xsi:type="WindType"    idref="FAN-1"    intensity="2"
si:pts="1440000"/>
    <!-- 26초 -->
    <DeviceCommand    xsi:type="WindType"    idref="FAN-1"    intensity="1"
```

TABLE 39-continued

```
si:pts="2340000"/>
    <!-- 28 초 -->
    <GroupOfCommands si:pts="2520000">
      <DeviceCommand    xsi:type="ColorCorrectionType"    idref="CC-1"
activate="false"/>
      <DeviceCommand xsi:type="LightType" idref="LIGHT-1" activate="false"/>
      <DeviceCommand xsi:type="LightType" idref="LED-1" activate="false"/>
      <DeviceCommand    xsi:type="TemperatureType"    idref="AIRCON-1"
activate="false"/>
      <DeviceCommand xsi:type="WindType" idref="FAN-1" activate="false"/>
    </GroupOfCommands>
</SDCmd>
```

The sensory reproduction apparatus control unit 111 transmits a control signal to each of the sensory reproduction apparatuses based on the SDCmd metadata 5200. The sensory reproduction apparatus 113 that receives the control signal reproduces (represents) the sensory effect intended by the advertisement producer to the consumer in response to the control signal.

For example, a beer advertisement will be described as advertisement contents. In a case where pictures of cool sea under intense sunlight are reproduced, a specific range or the original color sense of an object (beer or sea) or all the pictures is displayed as an advertisement producer intends. Further, illumination may be intensely spotlighted, and a peripheral LED (peripheral illumination) may emit blue light. Furthermore, cool wind of an air-conditioner may be blown from the back of a consumer. The consumer may feel the urge to purchase an advertisement product while watching such advertisement media.

In a case where the consumer does not prefer a sensory effect, pictures without a color correction effect intended by the contents provider are displayed in a display device. That is, pictures according to color characteristic of the consumer's display device are displayed in the display device, and the advertisement effect for the consumer may be reduced.

In Table 40, the USP metadata when a consumer does not prefer a sensory effect is shown in an XML instance form. Table 40 describes that the original color correction effect, the main illumination and peripheral illumination (LED) effect, and the temperature and wind control effect are not used.

TABLE 40

```
<?xml version="1.0" encoding="UTF-8"?>
<USP
  xmlns:xsi=http://www.w3.org/2001/XMLSchema-instance
  xmlns="urn:mpeg:mpeg-v:2010:01-USP-NS"
  xmlns:mpeg7="urn:mpeg:mpeg7:schema:2004"
  xsi:schemaLocation="urn:mpeg:mpeg-v:2010:01-USP-NS
  MPEG-V-USP.xsd
  urn:mpeg:mpeg7:schema:2004
  http://standards.iso.org/ittf/PubliclyAvailableStandards/MPEG-
  7_schema_files/mpeg7-v2.xsd">
    <User>
      <mpeg7:Name>
        <mpeg7:GivenName>Yong Soo</mpeg7:GivenName>
        <mpeg7:FamilyName>Joo</mpeg7:FamilyName>
      </mpeg7:Name>
    </User>
    <Preference xsi:type="ColorCorrectionType" activate="false"/>
    <Preference xsi:type="LightType" activate="false"/>
    <Preference xsi:type="WindType" activate="false"/>
    <Preference xsi:type="TemperatureType" activate="false"/>
</USP>
```

As described above, the method for providing metadata for a sensory effect and the method for reproducing the sensory effect in accordance with the present invention can be written using computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

A computer-readable medium in accordance with an embodiment of the present invention includes SEM including sensory effect information on contents. The sensory effect information includes color correction effect information on the contents.

A computer-readable medium in accordance with another embodiment of the present invention includes USP metadata including consumer preference information on a sensory effect. The preference information includes preference information on a color correction effect of contents.

A computer-readable medium in accordance with another embodiment of the present invention includes SDCap metadata including reproduction capability information on a sensory effect of a sensory reproduction apparatus. The reproduction capability information includes reproduction capability information on a color correction effect of contents.

A computer-readable medium in accordance with another embodiment of the present invention includes SDCmd metadata including control information on a sensory effect of a sensory reproduction apparatus. The control information on the sensory effect includes control information on a color correction effect of contents.

Hereinafter, an apparatus and method for implementing sensory effect metadata using binary representation of the sensory effect metadata will be described. The present invention provides a method for encoding/decoding the metadata in a binary representation form. In other words, each of the SEM, the USP metadata, the SDCap metadata and the SDCmd metadata may be generated using binary representation syntax.

<Control Information>

The control information describes base types of SDCap metadata and USP metadata, base attributes and binary representation syntax. Particularly, the control information describes binary representation syntax of color correction.

1. Sensory Device Capability Base Type
A. Syntax

TABLE 41

```
<!-- ################################################ -->
<!-- Sensory Device capability base type           -->
<!-- ################################################ -->
<complexType name="SensoryDeviceCapabilityBaseType" abstract="true">
    <complexContent>
        <extension base="dia:TerminalCapabilityBaseType">
            <attributeGroup
              ref="cidl:sensoryDeviceCapabilityAttributes"/>
        </extension>
    </complexContent>
</complexType>
```

B. Binary Representation Syntax

| SensoryDeviceCapabilityBaseType{ | Number of bits | Mnemonic |
|---|---|---|
| sensoryDeviceCapabilityAttributes | | sensoryDeviceCapabilityAttributes |
| TerminalCapabilityBase | | dia:TerminalCapabilityBaseType |
| } | | |

C. Semantics of the SensoryDeviceCapabilityBaseType

TABLE 43

| Name | Definition |
|---|---|
| SensoryDeviceCapabilityBaseType | SensoryDeviceCapabilityBaseType extends dia:TeminalCapabilityBaseType and provides a base abstract type for a subset of types defined as part of the sensory device capability metadata types. For details of dia:TerminalCapabilityBaseType, refer to the Part 7 of ISO/IEC 21000. |
| sensoryDeviceCapabilityAttributes | Describes a group of attributes for the device capabilities. |
| TerminalCapabilityBase | Describes a base type of a terminal capability. |

2. Sensory Device Capability Base Attributes
A. Syntax

TABLE 44

```
<!-- ################################################ -->
<!-- Definition of Sensory Device Capability Attributes -->
<!-- ################################################ -->
<attributeGroup name="sensoryDeviceCapabilityAttributes">
    <attribute name="zerothOrderDelayTime"
type="nonNegativeInteger" use="optional"/>
    <attribute name="firstOrderDelayTime" type="nonNegativeInteger"
use="optional"/>
    <attribute    name="location"    type="mpeg7:termReferenceType"
use="optional"/>
</attributeGroup>
```

B. Binary Representation Syntax

TABLE 45

| sensoryDeviceCapabilityAttributes{ | Number of bits | Mnemonic |
|---|---|---|
| zerothOrderDelayTimeFlag | 1 | bslbf |
| firstOrderDelayTimeFlag | 1 | bslbf |
| locationDefined | 1 | bslbf |
| if(zerothOrderDelayTimeFlag){ | | |
|   zerothOrderDelayTime | 32 | uimsbf |
| } | | |
| if(firstOrderDelayTimeFlag){ | | |
|   firstOrderDelayTime | 32 | uimsbf |
| } | | |
| if(locationDefined){ | | |
|   location | 7 | bslbf |
| } | | |
| } | | |

C. SEMANTICS of the SensoryDeviceCapabilityBaseType

TABLE 46

| Name | Definition |
|---|---|
| sensoryDeviceCapabilityAttributes | Describes a group of attributes for the sensory device capabilities. |
| zerothOrderDelayTime | Describes required preparation time of a sensory device to be activated since it receives a command in the unit of millisecond (ms). |
| firstOrderDelayTime | Describes the delay time for a device to reach the target intensity since it receives a command and is activated in the unit of millisecond (ms). |
| Location | Describes the position of the device from the user's perspective according to the x-, y-, and z-axis as a reference to the LocationCS as defined in Annex 2.3 of ISO/IEC 23005-6. The location attribute is defined in mpeg7:termReferenceType and is defined in Part 5 of ISO/IEC 15938. |

In the binary description of "Location" described in FIG. 46, the following mapping table is used.

TABLE 47

| location | term of location |
|---|---|
| 0000000 | *:*:* |
| 0000001 | left:*:* |
| 0000010 | centerleft:*:* |
| 0000011 | center:*:* |
| 0000100 | centerright:*:* |
| 0000101 | right:*:* |
| 0000110 | *:bottom:* |
| 0000111 | *:middle:* |
| 0001000 | *:top:* |
| 0001001 | *:*:back |
| 0001010 | *:*:midway |
| 0001011 | *:*:front |
| 0001100 | left:bottom:* |
| 0001101 | centerleft:bottom:* |
| 0001110 | center:bottom:* |
| 0001111 | centerright:bottom:* |

TABLE 47-continued

| location | term of location |
|---|---|
| 0010000 | right:bottom:* |
| 0010001 | left:middle:* |
| 0010010 | centerleft:middle:* |
| 0010011 | center:middle:* |
| 0010100 | centerright:middle:* |
| 0010101 | right:middle:* |
| 0010110 | left:top:* |
| 0010111 | centerleft:top:* |
| 0011000 | center:top:* |
| 0011001 | centerright:top:* |
| 0011010 | right:top:* |
| 0011011 | left:*:back |
| 0011100 | centerleft:*:back |
| 0011101 | center:*:back |
| 0011110 | centerright:*:back |
| 0011111 | right:*:back |
| 0100000 | left:*:midway |
| 0100001 | centerleft:*:midway |
| 0100010 | center:*:midway |
| 0100011 | centerright:*:midway |
| 0100100 | right:*:midway |
| 0100101 | left:*:front |
| 0100110 | centerleft:*:front |
| 0100111 | center:*:front |
| 0101000 | centerright:*:front |
| 0101001 | right:*:front |
| 0101010 | *:bottom:back |
| 0101011 | *:middle:back |
| 0101100 | *:top:back |
| 0101101 | *:bottom:midway |
| 0101110 | *:middle:midway |
| 0101111 | *:top:midway |
| 0110000 | *:bottom:front |
| 0110001 | *:middle:front |
| 0110010 | *:top:front |
| 0110011 | left:bottom:back |
| 0110100 | centerleft:bottom:back |
| 0110101 | center:bottom:back |
| 0110110 | centerright:bottom:back |
| 0110111 | right:bottom:back |
| 0111000 | left:middle:back |
| 0111001 | centerleft:middle:back |
| 0111010 | center:middle:back |
| 0111011 | centerright:middle:back |
| 0111100 | right:middle:back |
| 0111101 | left:top:back |
| 0111110 | centerleft:top:back |
| 0111111 | center:top:back |
| 1000000 | centerright:top:back |
| 1000001 | right:top:back |
| 1000010 | left:bottom:midway |
| 1000011 | centerleft:bottom:midway |
| 1000100 | center:bottom:midway |
| 1000101 | centerright:bottom:midway |
| 1000110 | right:bottom:midway |
| 1000111 | left:middle:midway |
| 1001000 | centerleft:middle:midway |
| 1001001 | center:middle:midway |
| 1001010 | centerright:middle:midway |
| 1001011 | right:middle:midway |
| 1001100 | left:top:midway |
| 1001101 | centerleft:top:midway |
| 1001110 | center:top:midway |
| 1001111 | centerright:top:midway |
| 1010000 | right:top:midway |
| 1010001 | left:bottom:midway |
| 1010010 | centerleft:bottom:midway |
| 1010011 | center:bottom:midway |
| 1010100 | centerright:bottom:midway |
| 1010101 | right:bottom:midway |
| 1010110 | left:middle:midway |
| 1010111 | centerleft:middle:midway |
| 1011000 | center:middle:midway |
| 1011001 | centerright:middle:midway |
| 1011010 | right:middle:midway |
| 1011011 | left:top:midway |
| 1011100 | centerleft:top:midway |
| 1011101 | center:top:midway |
| 1011110 | centerright:top:midway |
| 1011111 | right:top:midway |
| 1100000~1111111 | Reserved |

3. Color Correction Capability Type

A. Syntax

TABLE 48

```
<!-- ################################################### -->
<!-- Definition of Color Correction Type         -->
<!-- ################################################### -->
<complexType name="ColorCorrectionCapabilityType">
    <complexContent>
        <extension base="cidl:SensoryDeviceCapabilityBaseType">
            <attribute name="flag" type="boolean" use="required"/>
        </extension>
    </complexContent>
</complexType>
```

B. Binary Representation Syntax

TABLE 49

| ColorCorrectionCapabilityType{ | Number of bits | Mnemonic |
|---|---|---|
| flag | 1 | bslbf |
| SensoryDeviceCapabilityBase<br>} | | SensoryDeviceCapabilityBaseType |

C. Semantics

TABLE 50

| Name | Definition |
|---|---|
| ColorCorrectionCapabilityType | Tool for describing if the given device has a color correction capability. |

TABLE 50-continued

| Name | Definition |
|---|---|
| flag | Describes the existence of the color correction capability of the given device in terms of "true" and "false". |
| SensoryDeviceCapabilityBase | Describes a base type of a sensory device capability |

4. UserSensoryPreference Base Type
A. Syntax

TABLE 51

```
<!-- ################################################## -->
<!-- UserSensory Preference base type                  -->
<!-- ################################################## -->
<complexType name="UserSensoryPreferenceBaseType" abstract="true">
    <complexContent>
        <extension base="dia:UserCharacteristicBaseType">
            <attributeGroup ref="cidl:userSensoryPrefBaseAttributes"/>
        </extension>
    </complexContent>
</complexType>
```

B. Binary Representation Syntax

TABLE 52

| UserSensoryPreferenceBaseType{ | Number of bits | Mnemonic |
|---|---|---|
| userSensoryPrefBaseAttributes | | userSensoryPrefBaseAttributes |
| UserCharacteristicBase | | dia:UserCharacteristicBaseType |
| } | | |

C. Semantics of the UserSensoryPreferenceBaseType

TABLE 53

| Name | Definition |
|---|---|
| UserSensoryPreferenceBaseType | UserSensoryPreferenceBaseType extends dia:UserCharacteristicBaseType as defined in Part 7 of ISO/IEC 21000 and provides a base abstract type for a subset of types defined as part of the sensory device capability metadata types. |
| userSensoryPrefBaseAttributes | Describes a group of common attributes for the describing user preferences on sensory experience. |
| UserCharacteristicBase | Describes a base type of a user characteristic |

5. User Sensory Preference Base Attributes
A. Syntax

TABLE 54

```
<!-- ################################################## -->
<!-- User Sensory Preference Base Attributes            -->
<!-- ################################################## -->
<attributeGroup name="userSensoryPrefBaseAttributes">
    <attribute name="adaptationMode" type="cidl:adaptationModeType" use="optional"/>
    <attribute name="activate" type="boolean" use="optional"/>
</attributeGroup>
```

TABLE 54-continued

```
<!-- User Preference of Adaptation Mode Types           -->
<simpleType name="adaptationModeType">
    <restriction base="string">
        <enumeration value="strict"/>
        <enumeration value="scalable"/>
    </restriction>
</simpleType>
```

B. Binary Representation Syntax

TABLE 55

| userSensoryPrefBaseAttributes{ | Number of bits | Mnemonic |
|---|---|---|
| adaptationModeDefined | 1 | bslbf |
| activateFlag | 1 | bslbf |
| if(adaptationModeDefined){ | | |
| adaptationMode | 2 | bslbf |
| } | | |
| if(activateFlag){ | | |
| activate | 1 | bslbf |
| } | | |
| } | | |

C. Semantics

TABLE 56

| Name | Definition |
|---|---|
| userSensoryPrefBaseAttributes | Describes a group of common attributes for the describing user preferences on sensory experience. |
| adaptationMode | Describes the user's preference on the adaptation method for the sensory effect. EXAMPLE The value "strict" means the user prefer to render sensory effect exactly as described. Otherwise the value "scalable" means to render sensory effect with scaled intensity according to the device capacity. |
| activate | Describes whether the effect shall be activated. A value of true means the effect shall be activated and false means the effect shall be deactivated. |
| adaptationModeDefined | This field, which is only present in the binary representation, indicates the presence of the adaptationMode attribute. If it is 1 then the adaptationMode attribute is present, otherwise the adaptationMode attribute is not present |
| activateFlag | This field, which is only present in the binary representation, indicates the presence of the activate attribute. If it is 1 then the activate attribute is present, otherwise the activate attribute is not present |
| adaptationModeType | Tool for describing the adaptation mode with enumeration set. When its value is strict, it means that when the input value is out of range, the output should be equal to the maximum value that the device is able to operate. When its value is scalable, it means that the output shall be linearly |

TABLE 56-continued

| Name | Definition |
|---|---|
| | scaled into the range that the device can operate. |

6. Color Correction Preference Type
A. Syntax

TABLE 57

```
<!-- ############################################### -->
<!-- Definition of Color Correction Preference Type -->
<!-- ############################################### -->
<complexType name="ColorCorrectionPrefType">
    <complexContent>
        <extension base="cidl:UserSensoryPreferenceBaseType"/>
    </complexContent>
</complexType>
```

B. Binary Representation Syntax

TABLE 58

| ColorCorrectionPrefType{ | Number of bits | Mnemonic |
|---|---|---|
| activate | 1 | bslbf |
| } | | |

C. Semantics

TABLE 59

| Name | Definition |
|---|---|
| ColorCorrectionPrefType | Specifies whether the user prefers to use color correction functionality of the device or not by using activate attribute. Any information given by other attributes is ignored. |
| activate | This field, which is only present in the binary representation, describes whether the color correction effect shall be activated. A value of true (1) means the effect shall be activated and false (0) means the effect shall be deactivated. |

The sensory information describes attributes, base type, effect base type, parameter base type, color correction parameter base type and color correction effect with respect to SEM. Particularly, the sensory information describes binary representation syntax.

1. SEM Base Attributes
A. XML Representation Syntax

TABLE 60

```
<!-- ############################################### -->
<!-- SEM Base Attributes -->
<!-- ############################################### -->
<attributeGroup name="SEMBaseAttributes">
    <attribute name="activate" type="boolean" use="optional" />
    <attribute name="duration" type="positiveInteger" use="optional" />
    <attribute name="fade" type="positiveInteger" use="optional" />
    <attribute name="alt" type="anyURI" use="optional" />
    <attribute name="priority" type="positiveInteger" use="optional" />
    <attribute name="location" type="mpeg7:termReferenceType"
        use="optional"/>
    <attributeGroup ref="sedl:SEMAdaptabilityAttributes"/>
</attributeGroup>
```

TABLE 60-continued

```
<simpleType name="intensityValueType">
    <restriction base="float"/>
</simpleType>
<simpleType name="intensityRangeType">
    <restriction>
        <simpleType>
            <list itemType="float"/>
        </simpleType>
        <length value="2" fixed="true"/>
    </restriction>
</simpleType>
<!-- ############################################### -->
<!-- SEM Adaptability Attributes -->
<!-- ############################################### -->
<attributeGroup name="SEMAdaptabilityAttributes">
    <attribute name="adaptType" type="sedl:adaptTypeType"
        use="optional"/>
    <attribute name="adaptRange" type="sedl:adaptRangeType"
        default="10"
            use="optional"/>
</attributeGroup>
<simpleType name="adaptTypeType">
    <restriction base="NMTOKEN">
        <enumeration value="Strict"/>
        <enumeration value="Under"/>
        <enumeration value="Over"/>
        <enumeration value="Both"/>
    </restriction>
</simpleType>
<simpleType name="adaptRangeType">
    <restriction base="unsignedInt">
        <minInclusive value="0"/>
        <maxInclusive value="100"/>
    </restriction>
</simpleType>
```

B. Binary Representation Syntax

TABLE 61

| SEMBaseAttributes{ | Number of bits | Mnemonic |
|---|---|---|
| activateDefined | 1 | bslbf |
| durationDefined | 1 | bslbf |
| fadeDefined | 1 | bslbf |
| altDefined | 1 | bslbf |
| priorityDefined | 1 | bslbf |
| locationDefined | 1 | bslbf |
| if(activateDefined) { | | |
|   activate | 1 | bslbf |
| } | | |
| if(durationDefined) { | | |
|   duration | 32 | uimsbf |
| } | | |
| if(fadeDefined) { | | |
|   fade | 32 | uimsbf |
| } | | |
| if(altDefined) { | | |
|   altLength | | vluimsbf5 |
|   alt | 8 * altLength | bslbf |
| } | | |
| if(priorityDefined) { | | |
|   priority | 8 | uimsbf |
| } | | |
| if(locationDefined) { | | |
|   location | 7 | bslbf |
| } | | |
| SEMAdaptabilityAttributes | | SEMAdaptabilityAttributes |
| } | | |

TABLE 62

| SEMAdaptabilityAttributes{ | | |
|---|---|---|
| adaptTypeDefined | 1 | bslbf |
| adaptRangeDefined | 1 | bslbf |
| if(adaptTypeDefined) { | | |
| adaptType | 3 | bslbf |
| } | | |
| if(adaptRangeDefined) { | | |
| adaptRange | 7 | uimsbf |
| } | | |
| } | | |

C. Semantics

Semantics of the SEMBaseAttributes

TABLE 62

| Names | Description |
|---|---|
| activateDefined | This field, which is only present in the binary representation, indicates the presence of the activation attribute. If it is 1 then the activation attribute is present, otherwise the activation attribute is not present. |
| durationDefined | This field, which is only present in the binary representation, indicates the presence of the duration attribute. If it is 1 then the duration attribute is present, otherwise the duration attribute is not present. |
| fadeDefined | This field, which is only present in the binary representation, indicates the presence of the fade attribute. If it is 1 then the fade attribute is present, otherwise the fade attribute is not present. |
| altDefined | This field, which is only present in the binary representation, indicates the presence of the alt attribute. If it is 1 then the alt attribute is present, otherwise the alt attribute is not present. |
| priorityDefined | This field, which is only present in the binary representation, indicates the presence of the priority attribute. If it is 1 then the priority attribute is present, otherwise the priority attribute is not present. |
| locationDefined | This field, which is only present in the binary representation, indicates the presence of the location attribute. If it is 1 then the location attribute is present, otherwise the location attribute is not present. |
| activate | Describes whether the effect shall be activated. A value of true (=1) means the effect shall be activated and false (=0) means the effect shall be deactivated. |
| duration | Describes the duration according to the time scheme used. The time scheme used shall be identified by means of the si:absTimeScheme and si:timeScale attributes respectively. |
| fade | Describes the fade time according to the time scheme used within which the defined intensity shall be reached. The time scheme used shall be identified by means of the si:absTimeScheme and si:timeScale attributes respectively. |
| altLength | This field, which is only present in the binary representation, specifies the length of each altLength instance in bytes. The value of this element is the size of the largest altLength instance, aligned to a byte boundary by bit stuffing using 0-7 '1' bits. |
| alt | Describes an alternative effect identified by URI. NOTE 1 The alternative might point to an effect - or list of effects - within the same description or an external description. NOTE 2 The alternative might be used in case the original effect cannot be processed. |

TABLE 62-continued

| Names | Description |
|---|---|
| | EXAMPLE 1 The alternative effect is chosen because the original intended effect cannot be processed due to lack of devices supporting this effect. |
| priority | Describes the priority for effects with respect to other effects in the same group of effects sharing the same point in time when they should become available for consumption. A value of one indicates the highest priority and larger values indicate lower priorities. NOTE 3 The priority might by used to process effects - defined within a group of effects - according to the capabilities of the adaptation VR. EXAMPLE 2 The adaptation VR processes the individual effects of a group of effects according to their priority in descending order due to its limited capabilities. That is, effects with low priority might get lost. |
| location | Describes the location from where the effect is expected to be received from the user's perspective according to the x-, y-, and z-axis A classification scheme that may be used for this purpose is the LocationCS. The terms from the LocationCS shall be concatenated with the ":" sign in order of the x-, y-, and z-axis to uniquely define a location within the three-dimensional space. For referring to a group of locations, a wild card mechanism may be employed using the "*" sign. EXAMPLE 4 urn:mpeg:mpeg-v:01-SI-LocationCS-NS:center:middle:front defines the location as follows: center on the x-axis, middle on the y-axis, and front on the z-axis. That is, it describes all effects at the center, middle, front side of the user. EXAMPLE 5 urn:mpeg:mpeg-v:01-SI-LocationCS-NS:left:*:midway defines the location as follows: left on the x-axis, any location on the y-axis, and midway on the z-axis. That is, it describes all effects at the left, midway side of the user. EXAMPLE 6 urn:mpeg:mpeg-v:01-SI-LocationCS-NS:*:*:back defines the location as follows: any location on the x-axis, any location on the y-axis, and back on the z-axis. That is, it describes all effects at the back of the user. |
| SEMAdaptabilityAttributes | Describes a group of attributes for the adaptability attributes of effects. |

In the binary description of "Location" described in FIG. 63, the following mapping table is used.

TABLE 64

| location | term of location |
|---|---|
| 0000000 | *:*:* |
| 0000001 | left:*:* |
| 0000010 | centerleft:*:* |
| 0000011 | center:*:* |
| 0000100 | centerright:*:* |
| 0000101 | right:*:* |
| 0000110 | *:bottom:* |
| 0000111 | *:middle:* |
| 0001000 | *:top:* |
| 0001001 | *:*:back |
| 0001010 | *:*:midway |
| 0001011 | *:*:front |
| 0001100 | left:bottom:* |
| 0001101 | centerleft:bottom:* |
| 0001110 | center:bottom:* |
| 0001111 | centerright:bottom:* |
| 0010000 | right:bottom:* |

TABLE 64-continued

| location | term of location |
|---|---|
| 0010001 | left:middle:* |
| 0010010 | centerleft:middle:* |
| 0010011 | center:middle:* |
| 0010100 | centerright:middle:* |
| 0010101 | right:middle:* |
| 0010110 | left:top:* |
| 0010111 | centerleft:top:* |
| 0011000 | center:top:* |
| 0011001 | centerright:top:* |
| 0011010 | right:top:* |
| 0011011 | left:*:back |
| 0011100 | centerleft:*:back |
| 0011101 | center:*:back |
| 0011110 | centerright:*:back |
| 0011111 | right:*:back |
| 0100000 | left:*:midway |
| 0100001 | centerleft:*:midway |
| 0100010 | center:*:midway |
| 0100011 | centerright:*:midway |
| 0100100 | right:*:midway |
| 0100101 | left:*:front |
| 0100110 | centerleft:*:front |
| 0100111 | center:*:front |
| 0101000 | centerright:*:front |
| 0101001 | right:*:front |
| 0101010 | *:bottom:back |
| 0101011 | *:middle:back |
| 0101100 | *:top:back |
| 0101101 | *:bottom:midway |
| 0101110 | *:middle:midway |
| 0101111 | *:top:midway |
| 0110000 | *:bottom:front |
| 0110001 | *:middle:front |
| 0110010 | *:top:front |
| 0110011 | left:bottom:back |
| 0110100 | centerleft:bottom:back |
| 0110101 | center:bottom:back |
| 0110110 | centerright:bottom:back |
| 0110111 | right:bottom:back |
| 0111000 | left:middle:back |
| 0111001 | centerleft:middle:back |
| 0111010 | center:middle:back |
| 0111011 | centerright:middle:back |
| 0111100 | right:middle:back |
| 0111101 | left:top:back |
| 0111110 | centerleft:top:back |
| 0111111 | center:top:back |
| 1000000 | centerright:top:back |
| 1000001 | right:top:back |
| 1000010 | left:bottom:midway |
| 1000011 | centerleft:bottom:midway |
| 1000100 | center:bottom:midway |
| 1000101 | centerright:bottom:midway |
| 1000110 | right:bottom:midway |
| 1000111 | left:middle:midway |
| 1001000 | centerleft:middle:midway |
| 1001001 | center:middle:midway |
| 1001010 | centerright:middle:midway |
| 1001011 | right:middle:midway |
| 1001100 | left:top:midway |
| 1001101 | centerleft:top:midway |
| 1001110 | center:top:midway |
| 1001111 | centerright:top:midway |
| 1010000 | right:top:midway |
| 1010001 | left:bottom:midway |
| 1010010 | centerleft:bottom:midway |
| 1010011 | center:bottom:midway |
| 1010100 | centerright:bottom:midway |
| 1010101 | right:bottom:midway |
| 1010110 | left:middle:midway |
| 1010111 | centerleft:middle:midway |
| 1011000 | center:middle:midway |
| 1011001 | centerright:middle:midway |
| 1011010 | right:middle:midway |
| 1011011 | left:top:midway |
| 1011100 | centerleft:top:midway |
| 1011101 | center:top:midway |
| 1011110 | centerright:top:midway |
| 1011111 | right:top:midway |
| 1100000~1111111 | Reserved |

Semantics of the SEMAdaptabilityAttributes:

TABLE 65

| Names | Description |
|---|---|
| adaptTypeDefined | This field, which is only present in the binary representation, indicates the presence of the adaptType attribute. If it is 1 then the adaptType attribute is present, otherwise the adaptType attribute is not present. |
| adaptRangeDefined | This field, which is only present in the binary representation, indicates the presence of the adaptRange attribute. If it is 1 then the adaptRange attribute is present, otherwise the adaptRange attribute is not present. |
| adaptType | Describes the preferred type of adaptation with the following possible instantiations: Strict: An adaptation by approximation may not be performed. Under: An adaptation by approximation may be performed with a smaller effect value than the specified effect value. NOTE 1 (1 − adaptRange) × intensity ~ intensity. Over: An adaptation by approximation may be performed with a greater effect value than the specified effect value. NOTE 2 intensity ~ (1 + adaptRange) × intensity. Both: An adaptation by approximation may be performed between the upper and lower bound specified by adaptRange. NOTE 3 (1 − adaptRange) × intensity ~ (1 + adaptRange) × intensity. |
| adaptRange | Describes the upper and lower bound in percentage for the adaptType. If the adaptType is not present, adaptRange shall be ignored. |

In the binary description of "adaptType" described in FIG. 65, the following mapping table is used.

TABLE 66

| adaptType | adaptTypeType |
|---|---|
| 000 | Reserved |
| 001 | Strict |
| 010 | Under |
| 011 | Over |
| 100 | Both |
| 101~111 | Reserved |

2. SEM Base Type

A. XML Representation Syntax

TABLE 67

```
<!-- ############################################# -->
    <!-- SEM Base type                        -->
<!-- ############################################# -->
    <complexType name="SEMBaseType" abstract="true">
        <complexContent>
            <restriction base="anyType">
                <attribute name="id" type="ID" use="optional"/>
            </restriction>
        </complexContent>
    </complexType>
```

B. Binary Representation Syntax

TABLE 68

| SEMBaseType { | Number of bits | Mnemonic |
|---|---|---|
| idDefined | 1 | bslbf |
| if(idDefined) { | | |
|   idLength | | vluimsbf5 |
|   id | 8 * idLength | bslbf |
| } | | |
| anyAttribute | 320 | bslbf |
| } | | |

C. Semantics

Semantics of the SEMBaseType

TABLE 69

| Names | Description |
|---|---|
| idDefined | This field, which is only present in the binary representation, indicates the presence of the id attribute. If it is 1 then the id attribute is present, otherwise the id attribute is not present. |
| idLength | This field, which is only present in the binary representation, specifies the length of each idLength instance in bytes. The value of this element is the size of the largest idLength instance, aligned to a byte boundary by bit stuffing using 0-7 '1' bits. |
| id | Identifies the id of the SEMBaseType. |
| anyAttribute | This field, which is only present in the binary representation, is reserved for a future usage. |

3. EffectBaseType

A. XML Representation Syntax

TABLE 70

```
<!-- ################################################## -->
<!-- Effect base type                    -->
<!-- ################################################## -->
<complexType name="EffectBaseType" abstract="true">
  <complexContent>
```

TABLE 70-continued

```
    <extension base="sedl:SEMBaseType">
      <sequence minOccurs="0">
        <element name="SupplementalInformation" type="sedl:SupplementalInformationType" minOccurs="0"/>
      </sequence>
      <attribute name="autoExtraction" type="sedl:autoExtractionType"/>
      <attributeGroup ref="sedl:SEMBaseAttributes"/>
      <anyAttribute namespace="##other" processContents="lax"/>
    </extension>
  </complexContent>
</complexType>
<complexType name="SupplementalInformationType">
  <sequence>
    <element name="ReferenceRegion" type="mpeg7:SpatioTemporalLocatorType"/>
    <element name="Operator" type="sedl:OperatorType" minOccurs="0"/>
  </sequence>
</complexType>
<simpleType name="OperatorType">
  <restriction base="NMTOKEN">
    <enumeration value="Average"/>
    <enumeration value="Dominant"/>
  </restriction>
</simpleType>
```

TABLE 71

```
<simpleType name="autoExtractionType">
  <restriction base="string">
    <enumeration value="audio"/>
    <enumeration value="visual"/>
    <enumeration value="both"/>
  </restriction>
</simpleType>
```

B. Binary Representation Syntax

TABLE 72

| EffectBaseType{ | Number of bits | Mnemonic |
|---|---|---|
| supplimentalInfoDefined | 1 | bslbf |
| if(supplimentalInfoDefined) { | | |
|   SupplementalInformation | | SupplementalInformationType |
| } | | |
| autoExtraction | 3 | bslbf |
| SEMBaseAttributes | | SEMBaseAttributes |
| SEMBase | | SEMBaseType |
| anyAttribute | | siAttributeList |
| } | | |

TABLE 73

| SupplementalInformationType{ | Number of bits | Mnemonic |
|---|---|---|
| operatorDefined | 1 | bslbf |
| ReferenceRegion | | mpeg7:SpatioTemporalLocatorType |
| if(operatorDefined){ | | |

TABLE 73-continued

| SupplementalInformationType{ | Number of bits | Mnemonic |
|---|---|---|
|   Operator | 3 | bslbf |
|   } | | |
| } | | |

C. Semantics

Semantics of the EffectBaseType

TABLE 74

| Names | Description |
|---|---|
| EffectBaseType | EffectBaseType extends SEMBaseType and provides a base abstract type for a subset of types defined as part of the sensory effects metadata types. |
| SEMBaseAttributes | Describes a group of attributes for the effects. |
| anyAttribute | Provides an extension mechanism for including attributes from namespaces other than the target namespace. Attributes that shall be included are the XML streaming instructions as defined in ISO/IEC 21000-7 for the purpose of identifying process units and associating time information to them. EXAMPLE si:pts describes the point in time when the associated information shall become available to the application for processing. |
| supplimentalInfoDefined | This field, which is only present in the binary representation, indicates the presence of the SupplementalInformation element. If it is 1 then the SupplimentalInformation element is present, otherwise the SupplimentalInformation element is not present. |
| SEMBase | Describes a base type of a Sensory Effect Metadata. |
| autoExtraction | Describes whether an automatic extraction of sensory effects from the media resource, which is described by this sensory effect metadata, is preferable. The following values are available: audio: the automatic extraction of sensory effects from the audio part of the media resource, which is described by this sensory effect metadata, is preferable. visual: the automatic extraction of sensory effects from the visual part of the media resource, which is described by this sensory effect metadata, is preferable. both: the automatic extraction of sensory effects from both the audio and visual part of the media resource, which is described by this sensory effect metadata, is preferable. |
| reservedAttribute | |

In the binary description of "autoExtraction" described in FIG. 74, the following mapping table is used.

TABLE 75

| autoExtraction | autoExtractionType |
|---|---|
| 00 | audio |
| 01 | visual |
| 10 | both |
| 11 | Reserved |

Semantics of the SupplimentalInformationType

TABLE 76

| Names | Description |
|---|---|
| SupplimentalInformationType | |
| operatorDefined | This field, which is only present in the binary representation, indicates the presence of the operator element. If it is 1 then the operator element is present, otherwise the operator element is not present. |
| ReferenceRegion | Describes the reference region for automatic extraction from video. If the autoExtraction is not present or is not equal to video, this element shall be ignored. The localization scheme used is identified by means of the mpeg7:SpatioTemporalLocatorType that is defined in ISO/IEC 15938-5. |
| Operator | Describes the preferred type of operator for extracting sensory effects from the reference region of video with the following possible instantiations. Average: extracts sensory effects from the reference region by calculating average value. Dominant: extracts sensory effects from the reference region by calculating dominant value. |

In the binary description of "Operator" described in FIG. 76, the following mapping table is used.

TABLE 77

| Operator | Operator type |
|---|---|
| 000 | Reserved |
| 001 | Average |
| 010 | Dominant |
| 011~111 | Reserved |

4. Parameter Base Type

A. XML Representation Syntax

TABLE 78

```
<!-- ############################################## -->
    <!-- Parameter Base type                -->
    <!-- ############################################## -->
    <complexType name="ParameterBaseType" abstract="true">
        <complexContent>
            <extension base="sedl:SEMBaseType"/>
        </complexContent>
    </complexType>
```

B. Binary Representation Syntax

TABLE 79

| ParameterBaseType { | Number of bits | Mnemonic |
|---|---|---|
| SEMBase | | SEMBaseType |
| } | | |

C. Semantics of the ParameterBaseType

TABLE 80

| Names | Description |
|---|---|
| SEMBase | Describes a base type of a Sensory Effect Metadata. |

5. Color Correction Parameter Type
A. XML Representation Syntax

TABLE 81

```
<!-- ################################################ -->
<!-- Definition of Color Correction Parameter type -->
<!-- ################################################ -->
<complexType name="ColorCorrectionParameterType">
  <complexContent>
    <extension base="sedl:ParameterBaseType">
      <sequence>
        <element name="ToneReproductionCurves"
            type="sedl:ToneReproductionCurvesType"
            minOccurs="0"/>
        <element name="ConversionLUT" type=
            "sedl:ConversionLUTType"/>
<element name="ColorTemperature" type="sedl:IlluminantType"
minOccurs="0"/>
        <element name="InputDeviceColorGamut"
            type="sedl:InputDeviceColorGamutType"
            minOccurs="0"/>
```

TABLE 81-continued

```
        <element name="IlluminanceOfSurround" type=
            "mpeg7:unsigned12"
              minOccurs="0"/>
      </sequence>
    </extension>
  </complexContent>
</complexType>
<complexType name="ToneReproductionCurvesType">
  <sequence maxOccurs="256">
    <element name="DAC_Value" type="mpeg7:unsigned8"/>
    <element name="RGB_Value" type="mpeg7:doubleVector"/>
  </sequence>
</complexType>
<complexType name="ConversionLUTType">
  <sequence>
    <element name="RGB2XYZ_LUT" type=
        "mpeg7:DoubleMatrixType"/>
    <element name="RGBScalar_Max" type=
        "mpeg7:doubleVector"/>
    <element name="Offset_Value" type="mpeg7:doubleVector"/>
    <element name="Gain_Offset_Gamma" type=
        "mpeg7:DoubleMatrixType"/>
    <element name="InverseLUT" type=
        "mpeg7:DoubleMatrixType"/>
  </sequence>
</complexType>
<complexType name="IlluminantType">
  <choice>
    <sequence>
<element name="XY_Value" type="dia:ChromaticityType"/>
<element name="Y_Value" type="mpeg7:unsigned7"/>
    </sequence>
<element name="Correlated_CT" type="mpeg7:unsigned8"/>
  </choice>
</complexType>
<complexType name="InputDeviceColorGamutType">
  <sequence>
    <element name="IDCG_Type" type="string"/>
    <element name="IDCG_Value" type=
        "mpeg7:DoubleMatrixType"/>
  </sequence>
</complexType>
```

B. Binary Representation Syntax

TABLE 82

| ColorCorrectionParameterType{ | Number of bits | Mnemonic |
|---|---|---|
| ToneReproductionDefined | 1 | bslbf |
| ColorTemperatureDefined | 1 | bslbf |
| InputDeviceColorGamutDefined | 1 | bslbf |
| IlluminanceOfSurroundDefined | 1 | bslbf |
| if(ToneReproductionDefined) { | | |
|     ToneReproductionCurves | | ToneReproductionCurvesType |
| } | | |
| ConversionLUT | | ConversionLUTType |
| if(ColorTemperatureDefined) { | | |
|     ColorTemperature | | IlluminantType |
| } | | |
| if(InputDeviceColorGamutDefined) | | |
| { | | |

TABLE 82-continued

| ColorCorrectionParameterType{ | Number of bits | Mnemonic |
|---|---|---|
|     InputDeviceColorGamut | | InputDeviceColorGamutType |
| } | | |
| if(IlluminanceOfSurroundDefined){ | | |
|     IlluminanceOfSurround | 12 | uimsbf |
| } | | |
|     ParameterBase | | ParameterBaseType |
| } | | |

TABLE 83

| ToneReproductionCurvesType { | Number of bits | Mnemonic |
|---|---|---|
|   NumOfRecords | 8 | uimsbf |
|   for(i=0;i< NumOfRecords;i++){ | | |
|     DAC_Value | 8 | mpeg7:unsigned8 |
|     RGB_Value | 32 * 3 | mpeg7:doubleVector |
|   } | | |
| } | | |

TABLE 84

| ConversionLUTType { | Number of bits | Mnemonic |
|---|---|---|
|   RGB2XYZ_LUT | 32 * 3 * 3 | mpeg7:DoubleMatrixType |
|   RGBScalar_Max | 32 * 3 | mpeg7:doubleVector |
|   Offset_Value | 32 * 3 | mpeg7:doubleVector |
|   Gain_Offset_Gamma | 32 * 3 * 3 | mpeg7:DoubleMatrixType |
|   InverseLUT | 32 * 3 * 3 | mpeg7:DoubleMatrixType |
| } | | |

TABLE 85

| IlluminantType { | Number of bits | Mnemonic |
|---|---|---|
|   ElementType | 1 | bslbf |
|   if(ElementType==00){ | | |
|     XY_Value | 32 * 2 | fslbf |
|     Y_Value | 7 | uimsbf |
|   }else if(ElementType==01){ | | |
|     Correlated_CT | 8 | uimsbf |
|   } | | |
| } | | |

TABLE 86

| InputDeviceColorGamutType { | Number of bits | Mnemonic |
|---|---|---|
|   typeLength | | vluimsbf5 |
|   IDCG_Type | 8 * typeLength | bslbf |
|   IDCG_Value | 32 * 3 * 2 | mpeg7:DoubleMatrixType |
| } | | |

C. Semantics

Semantics of the ColorCorrectionParameterType

TABLE 87

| Names | Description |
|---|---|
| ParameterBase | Describes a base of parameter metadata. |
| ToneReproductionDefined | This field, which is only present in the binary representation, indicates the presence of the ToneReproductionCurves element. If it is 1 then the ToneReproductionCurves element is present, otherwise the ToneReproductionCurves element is not present. |
| ColorTemperatureDefined | This field, which is only present in the binary representation, indicates the presence of the ColorTemperature element. If it is 1 then the ColorTemperature element is present, otherwise the ColorTemperature element is not present. |
| InputDeviceColorGamutDefined | This field, which is only present in the binary representation, indicates the presence of the InputDeviceColorGamut element. If it is 1 then the InputDeviceColorGamut element is present, otherwise the InputDeviceColorGamut element is not present. |
| IlluminanceOfSurroundDefined | This field, which is only present in the binary representation, indicates the presence of the IlluminanceOfSurround element. If it is 1 then the IlluminanceOfSurround element is present, otherwise the IlluminanceOfSurround element is not present. |
| ToneReproductionCurves | This curve shows the characteristics (e.g., gamma curves for R, G and B channels) of the input display device. |
| ConversionLUT | A look-up table (matrix) converting an image between an image color space (e.g. RGB) and a standard connection space (e.g. CIE XYZ). |
| ColorTemperature | An element describing a white point setting (e.g., D65, D93) of the input display device. |
| InputDeviceColorGamut | An element describing an input display device color gamut, which is represented by chromaticity values of R, G, and B channels at maximum DAC values. |
| IlluminanceOfSurround | An element describing an illuminance level of viewing environment. The illuminance is represented by lux. |

Semantics of the ToneReproductionCurvesType

TABLE 88

| Names | Description |
|---|---|
| NumOfRecords | This field, which is only present in the binary representation, specifies the number of record (DAC and RGB value) instances accommodated in the ToneReproductionCurves. |
| DAC_Value | An element describing discrete DAC values of input device. |
| RGB_Value | An element describing normalized gamma curve values with respect to DAC values. The order of describing the RGB_Value is $R_n$, $G_n$, $B_n$. |

Semantics of the ConversionLUTType

TABLE 89

| Names | Description |
|---|---|
| RGB2XYZ_LUT | This look-up table (matrix) converts an image from RGB to CIE XYZ. The size of the conversion matrix is 3 × 3 such as $$\begin{bmatrix} R_x & G_x & B_x \\ R_y & G_y & B_y \\ R_z & G_z & B_z \end{bmatrix}.$$ The way of describing the values in the binary representation is in the order of $[R_x, G_x, B_x; R_y, G_y, B_y; R_z, G_z, B_z]$. |
| RGBScalar_Max | An element describing maximum RGB scalar values for GOG transformation. The order of describing the RGBScalar_Max is $R_{max}, G_{max}, B_{max}$. |
| Offset_Value | An element describing offset values of input display device when the DAC is 0. The value is described in CIE XYZ form. The order of describing the Offset_Value is X, Y, Z. |
| Gain_Offset_Gamma | An element describing the gain, offset, gamma of RGB channels for GOG transformation. The size of the Gain_Offset_Gamma matrix is 3 × 3 such as $$\begin{bmatrix} Gain_r & Gain_g & Gain_b \\ Offset_r & Offset_g & Offset_b \\ Gamma_r & Gamma_g & Gamma_b \end{bmatrix}.$$ The way of describing the values in the binary representation is in the order of $[Gain_r, Gain_g, Gain_b; Offset_r, Offset_g, Offset_b; Gamma_r, Gamma_g, Gamma_b]$. |
| InverseLUT | This look-up table (matrix) converts an image form CIE XYZ to RGB. The size of the conversion matrix is 3 × 3 such as $$\begin{bmatrix} R'_x & G'_x & B'_x \\ R'_y & G'_y & B'_y \\ R'_z & G'_z & B'_z \end{bmatrix}.$$ The way of describing the values in the binary representation is in the order of $[R'_x, G'_x, B'_x; R'_y, G'_y, B'_y; R'_z, G'_z, B'_z]$. |

Semantics of the IlluminantType

TABLE 90

| Names | Description |
|---|---|
| ElementType | This field, which is only present in the binary representation, describes which Illuminant scheme shall be used. |
| XY_Value | An element describing the chromaticity of the light source. The ChromaticityType is specified in ISO/IEC 21000-7. |
| Y_Value | An element describing the luminance of the light source between 0 and 100. |
| Correlated_CT | Indicates the correlated color temperature of the overall illumination. The value expression is obtained through quantizing the range [1667, 25000] into 28 bins in a non-uniform way as specified in ISO/IEC 15938-5. |

In the binary description of "ElementType" described in FIG. 90, the following mapping table is used.

TABLE 91

| Illuminant | IlluminantType |
|---|---|
| 00 | xy and Y value |
| 01 | Correlated_CT |

Semantics of the InputDeviceColorGamutType

TABLE 92

| Names | Description |
|---|---|
| typeLength | This field, which is only present in the binary representation, specifies the length of each IDCG_Type instance in bytes. The value of this element is the size of the largest IDCG_Type instance, aligned to a byte boundary by bit stuffing using 0-7 '1' bits. |
| IDCG_Type | An element describing the type of input device color gamut (e.g., NTSC, SMPTE). |
| IDCG_Value | An element describing the chromaticity values of RGB channels when the DAC values are maximum. The size of the IDCG_Value matrix is 3 × 2 such as $$\begin{bmatrix} x_r & y_r \\ x_g & y_g \\ x_b & y_b \end{bmatrix}.$$ The way of describing the values in the binary representation is in the order of $[x_r, y_r, x_g, y_g, x_b, y_b]$. |

6. Color Correction Effect

A. XML Representation Syntax

TABLE 93

```
<!-- ################################################### -->
<!-- Definition of Color Correction type          -->
<!-- ################################################### -->
<complexType name="ColorCorrectionType">
  <complexContent>
    <extension base="sedl:EffectBaseType">
      <choice minOccurs="0">
        <element name="SpatioTemporalLocator"
 type="mpeg7:SpatioTemporalLocatorType"/>
        <element name="SpatioTemporalMask"
 type="mpeg7:SpatioTemporalMaskType"/>
      </choice>
      <attribute name="intensity-value" type=
 "sedl:intensityValueType"
        use="optional"/>
      <attribute name="intensity-range" type=
 "sedl:intensityRangeType"
        use="optional" fixed="0 1"/>
    </extension>
  </complexContent>
</complexType>
```

B. Binary Representation Syntax

TABLE 94

| ColorCorrectionType{ | Number of bits | Mnemonic |
|---|---|---|
| intensityValueDefined | 1 | bslbf |
| intensityRangeDefined | 1 | bslbf |
| regionTypeSelect | 1 | bslbf |
| if(regionTypeSelect){ | | |
| SpatioTemporalLocator | | mpeg7:SpatioTemporalLocatorType |
| } | | |
| else{ | | |

TABLE 94-continued

| ColorCorrectionType{ | Number of bits | Mnemonic |
|---|---|---|
| SpatioTemporalMask | | mpeg7:SpatioTemporalMaskType |
| } | | |
| if(intensityValueDefined){ | | |
| Intensity-value | 32 | fsbf |
| } | | |
| if(intensityRangeDefined){ | | |
| Intensity-range | 64 | fsbf |
| } | | |
| EffectBase | | EffectBaseType |
| } | | |

C. Semantics
Semantics of the ColorCorrectionType

TABLE 95

| Names | Description |
|---|---|
| EffectBase | Describes a base type of an effect. |
| intensityValueDefined | This field, which is only present in the binary representation, indicates the presence of the intensityValue attribute. If it is 1 then the intensity-value attribute is present, otherwise the intensity-value attribute is not present. |
| intensityRangeDefined | This field, which is only present in the binary representation, indicates the presence of the intensityRange attribute. If it is 1 then the intensity-range attribute is present, otherwise the intensity-range attribute is not present. |
| regionTypeSelect | This field, which is only present in the binary representation, specifies the choice of the spatio-temporal region types. If it is 1 then the SpatioTemporalLocator is present, otherwise the SpatioTemporalMask is present. |
| intensity-value | Describes the intensity of the color correction effect in terms of "on" and "off" with respect to 1(on) and 0(off). |
| intensity-range | Describes the domain of the intensity value, i.e., 1 (on) and 0 (off). |
| SpatioTemporalLocator | Describes the spatio-temporal localization of the moving region using mpeg7:SpatioTemporalLocatorType (optional), which indicates the regions in a video segment where the color correction effect is applied. The mpeg7:SpatioTemporalLocatorType is defined in ISO/IEC 15938-5. |
| SpatioTemporalMask | Describes a spatio-temporal mask that defines the spatio-temporal composition of the moving region (optional), which indicates the masks in a video segment where the color correction effect is applied. The mpeg7:SpatioTemporalMaskType is defined in ISO/IEC 15938-5. |

<Mnemonics>
The following mnemonics are defined to describe another data type used in an encoded bit stream.

TABLE 96

| bslbf | Bit string, left bit first, where "left" is the order in which bits are written in ISO/IEC 15938-3. Bit strings are generally written as a string of 1s and 0s within single quote marks, e.g. '1000 0001'. Blanks within a bit string are for ease of reading and have no significance. For convenience, large strings are occasionally written in hexadecimal, in which case conversion to a binary in the conventional manner will yield the value of the bit string. Thus, the left-most hexadecimal digit is first and in each hexadecimal digit the most significant of the four digits is first. |
|---|---|
| UTF-8 | Binary string encoding defined in ISO 10646/IETF RFC 2279. |
| vluimsbf5 | Variable length unsigned integer most significant bit first representation consisting of two parts. The first part defines the number n of 4-bit bit fields used for the value representation, encoded by a sequence of n − 1 "1" bits, followed by a "0" bit signaling its end. The second part contains the value of the integer encoded using the number of bit fields specified in the first part. |
| uimsbf | Unsigned integer, most significant bit first. |
| fsbf | Float (32 bit), sign bit first. The semantics of the bits within a float are specified in the IEEE Standard for Binary Floating Point Arithmetic (ANSI/IEEE Std 754-1985). |

<Data Formats for Device Information>
Here, a data format for interaction between apparatuses is described.

1. Device Command Base Type

A. Syntax

TABLE 97

```
<!-- ################################################## -->
<!-- Device command base type                          -->
<!-- ################################################## -->
<complexType name="DeviceCommandBaseType" abstract="true">
  <sequence>
    <element name="TimeStamp" type="mpegvct:TimeStampType"/>
  </sequence>
  <attributeGroup ref="iidl:DeviceCmdBaseAttributes"/>
</complexType>
```

B. Binary Representation Syntax

TABLE 98

| DeviceCommandBaseType{ | Number of bits | Mnemonic |
|---|---|---|
| TimeStamp | | MPEG-VCT:TimeStampType |
| DeviceCmdBaseAttributes | | DeviceCmdBaseAttributes |
| } | | |

C. Semantics
Semantics of the DeviceCommandBaseType

TABLE 99

| Name | Definition |
|---|---|
| DeviceCommandBaseType | Provides the topmost type of the base type hierarchy which each individual device command can inherit. |
| TimeStamp | Provides the timing information for the device command to be executed. As defined in Part 6 of ISO/IEC 23005, there is a choice of selection among three timing schemes, which are absolute time, clocktick time, and delta of clock tick time. |
| DeviceCmdBaseAttributes | Describes a group of attributes for the commands. |

2. Device Command Base Attributes

A. Syntax

TABLE 100

```
<!-- ##################################################### -->
<!-- Definition of Device Command Base Attributes    -->
<!-- ##################################################### -->
<attributeGroup name="DeviceCmdBaseAttributes">
    <attribute name="id" type="ID" use="optional"/>
    <attribute name="deviceIdRef" type="anyURI" use="optional"/>
    <attribute name="activate" type="boolean" use="optional"
    default="true"/>
</attributeGroup>
```

B. Binary Representation Syntax

TABLE 101

| DeviceCmdBaseAttributes{ | Number of bits | Mnemonic |
|---|---|---|
| idFlag | 1 | bslbf |
| deviceIdRefFlag | 1 | bslbf |
| activate | 1 | bslbf |
| if(idFlag){ | | |
|   idLength | | vluimsbf5 |
|   id | 8 * idLength | bslbf |
| } | | |
| If(deviceIdRefFlag){ | | |
|   deviceIdRefLength | | vluimsbf5 |
|   deviceIdRef | 8 * deviceIdRefLength | bslbf |
| } | | |
| } | | |

C. Semantics

Semantics of the DeviceCmBaseAttributes

TABLE 102

| Name | Definition |
|---|---|
| DeviceCmdBaseAttributes | Specifies the common attributes for any type inherits from the DeviceCommandBaseType. |
| id | To be used to identify each individual device command. |
| deviceIdRef | To specify an individual device to which the command is associated. |
| activate | Describes whether the effect shall be activated. A value of true means the device shall be activated (switch on) and false means the device shall be deactivated (switch off). |
| idLength | This field, which is only present in the binary representation, specifies the length of each idLength instance in bytes. The value of this element is the size of the largest idLength instance, aligned to a byte boundary by bit stuffing using 0-7 '1' bits. |
| deviceIdRefLength | This field, which is only present in the binary representation, specifies the length of each deviceIdRefLength instance in bytes. The value of this element is the size of the largest deviceIdRefLength instance, aligned to a byte boundary by bit stuffing using 0-7 '1' bits. |

3. Color Correction Type

A. Syntax

TABLE 103

```
<!-- ##################################################### -->
<!-- Definition of DCV Color Correction Type    -->
<!-- ##################################################### -->
<complexType name="ColorCorrectionType">
    <complexContent>
        <extension base="iidl:DeviceCommandBaseType">
            <sequence minOccurs="0" maxOccurs="unbounded">
                <element name="SpatialLocator" type="mpeg7:RegionLocatorType"/>
            </sequence>
        </extension>
    </complexContent>
</complexType>
```

B. Binary Representation Syntax

TABLE 104

| ColorCorrectionType{ | Number of bits | Mnemonic |
|---|---|---|
| regionExist | 1 | bslbf |
| if(regionExist){ | | |
|   NumOfRegions | 8 | uimsbf |
| for(i=0;i<NumOfRegions;i++){ | | |
|   SpatialLocator[i] | | mpeg7:SpatialLocatorType |
| } | | |
| } | | |
| DeviceCommandBase | | DeviceCommandBaseType |
| } | | |

C. Semantics

Semantics of the ColorCorrectionType

TABLE 105

| Name | Definition |
|---|---|
| ColorCorrectionType | Tool for commanding a display device to perform color correction. |
| SpatialLocator | Describes the spatial localization of the still region using SpatialLocatorType (optional), which indicates the regions in a video segment where the color correction effect is applied. The SpatialLocatorType is defined in ISO/IEC 15938-5. |
| activate | Describes whether the color correction effect should be used or not. |
| DeviceCommandBase | Describes a base type of a device command |
| regionExist | This field, which is only present in the binary representation, indicates the presence of the spatial regions applying the color correction effect. If it is 1 then the spatial regions are present, otherwise the spatial regions are not present |

4. Initialize Color Correction Parameter Type

This command transmits a parameter for supporting a color correction effect of a sensory reproduction apparatus.

A. Syntax

TABLE 106

```
<!-- ##################################################### -->
<!-- Definition of SDCmd Initialize Color Correction Parameter Type -->
<!-- ##################################################### -->
```

TABLE 106-continued

```
<complexType name="InitializeColorCorrectionParameterType">
  <complexContent>
    <extension base="iidl:DeviceCommandBaseType">
      <sequence>
        <element                    name="ToneReproductionCurves"
type="mpegvct:ToneReproductionCurvesType" minOccurs="0"/>
        <element name="ConversionLUT" type= "mpegvct:
ConversionLUTType"/>
        <element name="ColorTemperature" type="mpegvct:Illuminant-
                                        Type"
minOccurs="0"/>
        <element                name="InputDeviceColorGamut"
type="mpegvct:InputDeviceColorGamutType" minOccurs="0"/>
        <element name="IlluminanceOfSurround" type="mpeg7:unsigned12"
minOccurs="0"/>
      </sequence>
    </extension>
  </complexContent>
</complexType>
```

B. Binary Representation Syntax

TABLE 107

| InitializeColorCorrectionParameterType{ | Number of bits | Mnemonic |
|---|---|---|
| ToneReproductionDefined | 1 | bslbf |
| ColorTemperatureDefined | 1 | bslbf |
| InputDeviceColorGamutDefined | 1 | bslbf |
| IlluminanceOfSurroundDefined | 1 | bslbf |
| if(ToneReproductionDefined){ | | |
|   ToneReproductionCurves | | MPEG-VCT:ToneReproductionCurvesType |
| } | | |
| ConversionLUT | | MPEG-VCT:ConversionLUTType |
| if(ColorTemperatureDefined){ | | |
|   ColorTemperature | | MPEG-VCT:IlluminantType |
| } | | |
| if(InputDeviceColorGamutDefined){ | | |
|   InputDeviceColorGamut | | MPEG-VCT:InputDeviceColorGamutType |
| } | | |
| if(IlluminanceOfSurroundDefined){ | | |
|   IlluminanceOfSurround | 12 | uimsbf |
| } | | |
| DeviceCommandBase | | DeviceCommandBaseType |
| } | | |

C. Semantics
Semantics of the ColorCorrectionType

TABLE 108

| Name | Definition |
|---|---|
| InitializeColorCorrection ParameterType | Tool for describing an initialize color correction parameter command. |
| DeviceCommandBase | Describes a base type of a device command |
| ToneReproductionDefined | This field, which is only present in the binary representation, indicates the presence of the ToneReproductionCurves element. If it is 1 then the ToneReproductionCurves element is present, otherwise the ToneReproductionCurves element is not present. |
| ColorTemperatureDefined | This field, which is only present in the binary representation, indicates the presence of the ColorTemperature element. If it is 1 then the ColorTemperature element is present, otherwise the ColorTemperature element is not present. |
| InputDeviceColorGamutDefined | This field, which is only present in the binary representation, indicates the presence of the InputDeviceColorGamut element. If it is 1 then the InputDeviceColorGamut element is present, otherwise the InputDeviceColorGamut element is not present. |
| IlluminanceOfSurroundDefined | This field, which is only present in the binary representation, indicates the presence of the IlluminanceOfSurround element. If it is 1 then the IlluminanceOfSurround element is present, otherwise the IlluminanceOfSurround element is not present. |
| ToneReproductionCurves | This curve shows the characteristics (e.g., gamma curves for R, G and B channels) of the input display device. The type is defined in Part 6 of ISO/IEC 23005. |
| ConversionLUT | A look-up table (matrix) converting an image between an image color space (e.g. RGB) and a standard connection space (e.g. CIE XYZ). The type is defined in Part 6 of ISO/IEC 23005. |
| ColorTemperature | An element describing a white point setting (e.g., D65, D93) of the input display device. The type is defined in Part 6 of ISO/IEC 23005. |
| InputDeviceColorGamut | An element describing an input display device color gamut, which is represented by chromaticity values of R, G, and B channels at maximum DAC values. The type is defined in Part 6 of ISO/IEC 23005. |
| IlluminanceOfSurround | An element describing an illuminance level of viewing environment. The illuminance is represented by lux. |

<Common Types>

A. Syntax

TABLE 109

```
<complexType name="ToneReproductionCurvesType">
  <sequence maxOccurs="256">
    <element name="DAC_Value" type="mpeg7:unsigned8"/>
    <element name="RGB_Value" type="mpeg7:doubleVector"/>
  </sequence>
</complexType>
<complexType name="ConversionLUTType">
  <sequence>
    <element name="RGB2XYZ_LUT" type=
      "mpeg7:DoubleMatrixType"/>
    <element name="RGBScalar_Max" type="mpeg7:doubleVector"/>
    <element name="Offset_Value" type="mpeg7:doubleVector"/>
    <element            name="Gain_Offset_Gamma"
      type="mpeg7:DoubleMatrixType"/>
    <element name="InverseLUT" type="mpeg7:DoubleMatrixType"/>
  </sequence>
</complexType>
<complexType name="IlluminantType">
  <choice>
    <sequence>
      <element name="xy_Value" type="mpegvct:ChromaticityType"/>
      <element name="Y_Value" type="mpeg7:unsigned7"/>
    </sequence>
    <element name="Correlated_CT" type="mpeg7:unsigned8"/>
  </choice>
</complexType>
<complexType name="InputDeviceColorGamutType">
  <sequence>
    <element name="IDCG_Type" type="string"/>
    <element name="IDCG_Value" type="mpeg7:DoubleMatrixType"/>
  </sequence>
</complexType>
<complexType name="ChromaticityType">
  <attribute name="x" type="mpeg7:zeroToOneType" use="required"/>
  <attribute name="y" type="mpeg7:zeroToOneType" use="required"/>
</complexType>
```

B. Binary Representation Syntax

TABLE 110

| ToneReproductionCurvesType { | Number of bits | Mnemonic |
|---|---|---|
| NumOfRecords | 8 | uimsbf |
| for(i=0;i< | | |
| NumOfRecords;i++){ | | |
| DAC_Value | 8 | mpeg7:unsigned8 |
| RGB_Value | 32 * 3 | mpeg7:doubleVector |
| } | | |
| } | | |

TABLE 111

| ConversionLUTType { | Number of bits | Mnemonic |
|---|---|---|
| RGB2XYZ_LUT | 32 * 3 * 3 | mpeg7:DoubleMatrixType |
| RGBScalar_Max | 32 * 3 | mpeg7:doubleVector |
| Offset_Value | 32 * 3 | mpeg7:doubleVector |
| Gain_Offset_Gamma | 32 * 3 * 3 | mpeg7:DoubleMatrixType |
| InverseLUT | 32 * 3 * 3 | mpeg7:DoubleMatrixType |
| } | | |

TABLE 112

| IlluminantType { | Number of bits | Mnemonic |
|---|---|---|
| ElementType | 1 | bslbf |
| if(ElementType==00){ | | |
| XY_Value | 32 * 2 | fslbf |
| Y_Value | 7 | uimsbf |
| }else if(ElementType==01){ | | |
| Correlated_CT | 8 | uimsbf |
| } | | |
| } | | |

TABLE 113

| InputDeviceColorGamutType { | Number of bits | Mnemonic |
|---|---|---|
| typeLength | | vluimsbf5 |
| IDCG_Type | 8 * typeLength | bslbf |
| IDCG_Value | 32 * 3 * 2 | mpeg7:DoubleMatrix-Type |
| } | | |

C. Semantics

Semantics of the Basic Datatypes

TABLE 114

| Name | Definition |
|---|---|
| ToneReproductionCurvesType | A type defining the schema of the Tone Reproduction Curves. |
| DAC_Value | An element describing discrete DAC values of input device. |
| RGB_Value | An element describing normalized gamma curve values with respect to DAC values. The order of describing the RGB_Value is $R_n$, $G_n$, $B_n$. |
| ConversionLUTType | A type of defining the schema of the conversion look-up table (matrix). The size of the conversion matrix is 3 × 3 such as $$\begin{bmatrix} R_x & G_x & B_x \\ R_y & G_y & B_y \\ R_z & G_z & B_z \end{bmatrix}.$$ The way of describing the values in the binary representation is in the order of [$R_x$, $G_x$, $B_x$; $R_y$, $G_y$, $B_y$; $R_z$, $G_z$, $B_z$]. |
| RGB2XYZ_LUT | This look-up table (matrix) converts an image from RGB to CIE XYZ. |
| RGBScalar_Max | An element describing maximum RGB scalar values for GOG transformation. The order of describing the RGBScalar_Max is $R_{max}$, $G_{max}$, $B_{max}$. |
| Offset_Value | An element describing offset values of input display device when the DAC is 0. The value is described in CIE XYZ form. The order of describing the Offset_Value is X, Y, Z. |
| Gain_Offset_Gamma | An element describing the gain, offset, gamma of RGB channels for GOG transformation. The size of the Gain_Offset_Gamma matrix is 3 × 3 such as $$\begin{bmatrix} Gain_r & Gain_g & Gain_b \\ Offset_r & Offset_g & Offset_b \\ Gamma_r & Gamma_g & Gamma_b \end{bmatrix}.$$ The way of describing the values in the binary representation is in the order of [$Gain_r$, $Gain_g$, $Gain_b$; $Offset_r$, $Offset_g$, $Offset_b$; $Gamma_r$, $Gamma_g$, $Gamma_b$]. |

TABLE 114-continued

| Name | Definition |
|---|---|
| InverseLUT | This look-up table (matrix) converts an image form CIE XYZ to RGB. The size of the conversion matrix is 3 × 3 such as $$\begin{bmatrix} R'_x & G'_x & B'_x \\ R'_y & G'_y & B'_y \\ R'_z & G'_z & B'_z \end{bmatrix}.$$ The way of describing the values in the binary representation is in the order of $[R'_x, G'_x, B'_x; R'_y, G'_y, B'_y; R'_z, G'_z, B'_z]$. |
| IlluminantType | A type defining the schema of the white point setting (e.g. D65, D93) of the input display device. |
| xy_Value | An element describing the chromaticity of the light source. The Chromaticity Type is specified in ISO/IEC 21000-7. |
| Y_Value | An element describing the luminance of the light source between 0 and 100. |
| Correlated_CT | Indicates the correlated color temperature of the overall illumination. The value expression is obtained through quantizing the range [1667, 25000] into 28 bins in a non-uniform way as specified in ISO/IEC 15938-5. |
| InputDeviceColorGamutType | A type defining the schema of the Input device color gamut. |
| IDCG_Type | An element describing the type of input device color gamut (e.g., NTSC, SMPTE). |
| IDCG_Value | An element describing the chromaticity values of RGB channels when the DAC values are maximum. The size of the IDCG_Value matrix is 3 × 2 such as $$\begin{bmatrix} x_r & y_r \\ x_g & y_g \\ x_b & y_b \end{bmatrix}.$$ The way of describing the values in the binary representation is in the order of $[x_r, y_r, x_g, y_g, x_b, y_b]$. |
| ChromaticityType | Tool that describes the chromaticity. |
| X | Describes the x-value of chromaticity. |
| Y | Describes the y-value of chromaticity. |

While the present invention has been described with respect to the specific embodiments, it will be apparent to those skilled in the art that various changes and modifications may be made without departing from the spirit and scope of the invention as defined in the following claims.

What is claimed is:

1. A method for providing metadata for a sensory effect, comprising:
generating Sensory Effect Metadata (SEM) comprising sensory effect information on contents using binary representation syntax; and
analyzing the SEM and transmitting the SEM to a sensory reproduction apparatus engine unit that generates control information on a sensory reproduction apparatus,
wherein the sensory effect information comprises color correction effect information on the contents.

2. The method of claim 1, wherein the color correction effect information comprises at least one of a Spatio Temporal Locator and a Spatio Temporal Mask with respect to a color correction range.

3. The method of claim 1, wherein the sensory effect information further comprises color correction parameter information referred to the color correction.

4. The method of claim 3, wherein the color correction parameter comprises at least one of:
Tone Reproduction Curves information showing characteristics of an original picture display device with respect to original pictures of the contents;
Conversion information for conversion from a color space of the original pictures to a standard color space;
Color Temperature information of an illuminant, used in a production space of the original pictures;
Input Device Color Gamut information for the original picture display device; and
Illuminance Of Surround information for a consumer reproduction device that reproduces the contents.

5. The method of claim 4, wherein the Tone Reproduction Curves information comprises:
an output Digital to Analog Conversion (DAC) value for an RGB channel of the original picture display device; and
an RGB value of the RGB channel according to the output DAC value.

6. The method of claim 4, wherein the Conversion information comprises:
RGB_XYZ_LUT information for converting an RGB color space into an XYZ color space;
Parameter information for describing gain, offset and gamma values of the original picture display device for Gain Offset Gamma (GOG) conversion and an RGB scalar maximum value for the RGB channel; and
Inverse LUT information for inverse-converting the XYZ color space into the RGB color space.

7. The method of claim 4, wherein the Color Temperature information comprises information on the type of the illuminant, a white point chromaticity value according to the type of the illuminant and a brightness value of the illuminant, or comprises Correlated Color Temperature information of the illuminant.

8. The method of claim 4, wherein the Input Device Color Gamut information comprises:
information on the kind of the original picture display device; and
an input device color gamut value according to the output DAC value of the original picture display device.

9. A method for providing metadata for a sensory effect, comprising:
generating User Sensory Preference (USP) metadata comprising consumer preference information on a sensory effect using binary representation syntax; and
analyzing the USP metadata and transmitting the USP metadata to a sensory reproduction apparatus engine unit that generates control information on a sensory reproduction apparatus,
wherein the preference information comprises preference information on a color correction effect of contents.

10. The method of claim 9, wherein the color correction effect is applied in the sensory reproduction apparatus based on color correction effect information comprising at least one of a Spatio Temporal Locator and a Spatio Temporal Mask with respect to a color correction range.

11. A method for providing metadata for a sensory effect, comprising:
generating Sensory Device Capabilities (SDCap) metadata comprising reproduction capability information on a sensory effect of a sensory reproduction apparatus using binary representation syntax; and
analyzing the SDCap metadata and transmitting the SDCap metadata to a sensory reproduction apparatus engine unit that generates control information on the sensory reproduction apparatus, wherein the reproduction capability information comprises reproduction capability information on a color correction effect of contents.

12. A method for providing metadata for a sensory effect, comprising:

receiving SEM comprising sensory effect information;

analyzing the SEM and generating Sensory Device Commands (SDCmd) metadata comprising control information on a sensory effect of a sensory reproduction apparatus; and transmitting the SDCmd metadata to a control device that controls the sensory reproduction apparatus, wherein the SEM are generated using binary representation syntax, and the sensory effect information comprises color correction effect information on contents.

13. The method of claim 12, wherein the color correction effect information comprises at least one of a Spatio Temporal Locator and a Spatio Temporal Mask so as to trace and interpolate a range (or object) subjected to color correction depending on a color correction range and a change in position for the purpose of applying partial color correction.

14. The method of claim 12, further comprising receiving USP metadata comprising consumer preference information on the color correction effect, wherein said generating of the SDCmd metadata comprises additionally analyzing the USP metadata and generating the SDCmd metadata, and the USP metadata are generated using the binary representation syntax.

15. The method of claim 12, further comprising receiving SDCap metadata comprising reproduction capability information on the color correction effect of the sensory reproduction apparatus, wherein said generating of the SDCmd metadata comprises additionally analyzing the SDCap metadata and generating the SDCmd metadata, and the SDCmd metadata are generated using the binary representation syntax.

* * * * *